US007280530B2

(12) United States Patent
Chang et al.

(10) Patent No.: US 7,280,530 B2
(45) Date of Patent: Oct. 9, 2007

(54) APPARATUS AND METHOD FOR INTEGRATED VOICE GATEWAY

(75) Inventors: Gordon K. Chang, San Jose, CA (US); Robert W. Harbison, Sausalito, CA (US); Richard J. Barry, Los Altos, CA (US); Ming C. Lo, San Jose, CA (US); Stephen R. Raab, Mill Valley, CA (US)

(73) Assignee: Starvox Communications Inc., San Jose, CA (US)

( * ) Notice: Subject to any disclaimer, the term of this patent is extended or adjusted under 35 U.S.C. 154(b) by 951 days.

(21) Appl. No.: 10/086,262

(22) Filed: Mar. 4, 2002

(65) Prior Publication Data

US 2003/0095541 A1    May 22, 2003

Related U.S. Application Data

(62) Division of application No. 09/061,802, filed on Apr. 17, 1998, now abandoned.

(51) Int. Cl.
*H04L 12/66* (2006.01)
*H04M 3/42* (2006.01)

(52) U.S. Cl. ............... 370/352; 379/900; 379/201.01; 379/209.01; 379/210.01

(58) Field of Classification Search ........ 370/351–356, 370/401; 379/265.02, 88.17, 900, 142.07, 379/210.01, 225, 231, 265.09
See application file for complete search history.

(56) References Cited

U.S. PATENT DOCUMENTS 3,769,462 A    10/1973    Russell et al.
(Continued)

FOREIGN PATENT DOCUMENTS

| WO | WO/9620553 | 4/1996 |
|----|-----------|--------|
| WO | WO/9723078 | 6/1997 |
| WO | WO/9732427 | 9/1997 |

OTHER PUBLICATIONS

Yang, "INET Phone", RFC 1789, pp. 1-6.

*Primary Examiner*—Steven HD Nguyen

(74) *Attorney, Agent, or Firm*—Beyer Weaver LLP

(57) ABSTRACT

An integrated voice gateway system for use within a company which can route a voice telephone call between parties at two different locations over an IP network or over the PST NETWORK. The system can route a voice telephone call from a first location within the system to a second location within the system via the IP network, and then from the second location to a third location via the PST NETWORK. The integrated voice gateway system includes a gateway server which serves as an intranet/Internet telephony gateway. The gateway server routes intra-company voice or facsimile (fax) calls, over the company's intranet or the public Internet. The gateway server provides an alternate voice network to the PST NETWORK for a company. This alternate network is provided at a much lower cost. The gateway server is a combination of hardware and software components which reside on a PC server platform. The gateway server is coupled to a customer premise telephone system, i.e. a PBX via a T1 or E1 trunk for larger systems, or an analog trunk for smaller systems. The gateway server is coupled to the company's intranet via industry standard connections. The gateway servers in a multi-site company are coupled together via the company's intranet or wide area network (WAN) into a gateway network. The gateway server uses PBX call status links to provide many unique and useful features which are otherwise unavailable. The gateway server uses T1 inband ANI, PRI, QSIG or industry standard CTI applications programming interfaces (API) and works with any PBX which supports any of these call status links. The gateway server is equipped with a database of user and gateway objects and attributes, and provides many unique features including caller's name based on caller phone number, address translation, gateway network routing information, user authentication, etc. This database can be integrated with industry standard enterprise directory services systems including any directory which supports the Lightweight Directory Access Protocol (X.500) (LDAP) interface.

1 Claim, 21 Drawing Sheets

U.S. PATENT DOCUMENTS

| | | |
|---|---|---|
| 3,925,621 A | 12/1975 | Collins et al. |
| 4,313,036 A | 1/1982 | Jabara et al. |
| 4,317,197 A | 2/1982 | Ulug |
| 4,334,306 A | 6/1982 | Ulug |
| 4,348,554 A | 9/1982 | Asmuth |
| 4,442,321 A | 4/1984 | Stehman |
| 4,488,289 A | 12/1984 | Turner |
| 4,494,230 A | 1/1985 | Turner |
| 4,567,323 A | 1/1986 | Lottes et al. |
| 4,587,651 A | 5/1986 | Nelson et al. |
| 4,597,073 A | 6/1986 | Staples |
| 4,707,827 A | 11/1987 | Bione et al. |
| 4,747,127 A | 5/1988 | Hansen et al. |
| 4,764,919 A | 8/1988 | Hunter et al. |
| 4,782,517 A | 11/1988 | Bernardis et al. |
| 4,787,082 A | 11/1988 | Delaney et al. |
| 4,803,720 A | 2/1989 | Newell et al. |
| 4,811,334 A | 3/1989 | Matt |
| 4,866,758 A | 9/1989 | Heinzelmann |
| 4,897,866 A | 1/1990 | Majmudar et al. |
| 4,901,312 A | 2/1990 | Hui et al. |
| 4,907,260 A | 3/1990 | Prohs et al. |
| 4,924,500 A | 5/1990 | Lewis et al. |
| 4,942,602 A | 7/1990 | Baker, Jr. et al. |
| 4,959,854 A | 9/1990 | Cave et al. |
| 4,970,722 A | 11/1990 | Preschutti |
| 4,982,421 A | 1/1991 | Kirsch et al. |
| 4,993,018 A | 2/1991 | Hajikano et al. |
| 5,031,211 A | 7/1991 | Nagai et al. |
| 5,097,528 A | 3/1992 | Gursahaney et al. |
| 5,107,493 A | 4/1992 | Eng et al. |
| 5,179,585 A | 1/1993 | MacMillan, Jr. et al. |
| 5,185,742 A | 2/1993 | Bales et al. |
| 5,185,786 A | 2/1993 | Zwick |
| 5,193,110 A | 3/1993 | Jones et al. |
| 5,212,691 A | 5/1993 | Hokari |
| 5,220,562 A | 6/1993 | Takada et al. |
| 5,222,125 A | 6/1993 | Creswell et al. |
| 5,303,290 A | 4/1994 | Redberg et al. |
| 5,311,572 A | 5/1994 | Friedes et al. |
| 5,311,577 A | 5/1994 | Madrid et al. |
| 5,313,465 A | 5/1994 | Perlman et al. |
| 5,315,646 A | 5/1994 | Babson et al. |
| 5,321,743 A | 6/1994 | Bogart et al. |
| 5,321,744 A | 6/1994 | Madonna et al. |
| 5,323,452 A | 6/1994 | Dickman et al. |
| 5,327,489 A | 7/1994 | Anderson et al. |
| 5,333,185 A | 7/1994 | Burke et al. |
| 5,337,352 A | 8/1994 | Kobayashi et al. |
| 5,345,502 A | 9/1994 | Rothenhofer |
| 5,365,520 A | 11/1994 | Wang et al. |
| 5,367,562 A | 11/1994 | Tourbah et al. |
| 5,371,735 A | 12/1994 | Denneau et al. |
| 5,377,186 A | 12/1994 | Wegner et al. |
| 5,377,261 A | 12/1994 | Baals et al. |
| 5,386,464 A | 1/1995 | Pruitt |
| 5,390,242 A | 2/1995 | Bales et al. |
| 5,404,396 A | 4/1995 | Brennan |
| 5,404,451 A | 4/1995 | Nemirovsky et al. |
| 5,404,565 A | 4/1995 | Gould et al. |
| 5,414,762 A | 5/1995 | Flisik et al. |
| 5,416,830 A | 5/1995 | MacMillan et al. |
| 5,418,844 A | 5/1995 | Morrisey et al. |
| 5,418,845 A | 5/1995 | Reeder |
| 5,420,916 A | 5/1995 | Sekiguchi |
| 5,422,941 A | 6/1995 | Hasenauer et al. |
| 5,428,679 A | 6/1995 | French |
| 5,436,957 A | 7/1995 | McConnell |
| 5,440,563 A | 8/1995 | Isidoro et al. |
| 5,440,624 A | 8/1995 | Schoof, II |
| 5,448,631 A | 9/1995 | Cain |
| 5,448,632 A | 9/1995 | Iyob et al. |
| 5,450,482 A | 9/1995 | Chen et al. |
| 5,452,292 A | 9/1995 | Okanoue et al. |
| 5,453,984 A | 9/1995 | Mueller |
| 5,463,684 A | 10/1995 | Morduch et al. |
| 5,465,294 A | 11/1995 | Chapman, Jr. et al. |
| 5,469,500 A | 11/1995 | Satter et al. |
| 5,473,679 A | 12/1995 | La Porta et al. |
| 5,475,746 A | 12/1995 | Miller et al. |
| 5,481,534 A | 1/1996 | Beachy et al. |
| 5,481,603 A | 1/1996 | Gutierrez et al. |
| 5,483,576 A | 1/1996 | Staples |
| 5,483,585 A | 1/1996 | Parker et al. |
| 5,487,110 A | 1/1996 | Bray et al. |
| 5,490,212 A | 2/1996 | Lautenschlager |
| 5,491,686 A | 2/1996 | Sato |
| 5,491,694 A | 2/1996 | Oliver et al. |
| 5,493,564 A | 2/1996 | Mullan |
| 5,495,479 A | 2/1996 | Galaand et al. |
| 5,495,484 A | 2/1996 | Self et al. |
| 5,497,368 A | 3/1996 | Reijnierse et al. |
| 5,502,757 A | 3/1996 | Bales et al. |
| 5,502,816 A | 3/1996 | Gawlick et al. |
| 5,509,058 A | 4/1996 | Sestak et al. |
| 5,509,065 A | 4/1996 | Fitzgerald |
| 5,515,429 A | 5/1996 | Kawada et al. |
| 5,517,562 A | 5/1996 | McConnell |
| 5,517,564 A | 5/1996 | Slater et al. |
| 5,519,770 A | 5/1996 | Stein |
| 5,519,772 A | 5/1996 | Akman et al. |
| 5,521,909 A | 5/1996 | Holloway et al. |
| 5,521,970 A | 5/1996 | Herrick et al. |
| 5,526,413 A | 6/1996 | Cheston, III et al. |
| 5,526,414 A | 6/1996 | Bedard et al. |
| 5,526,415 A | 6/1996 | Wakamoto |
| 5,526,416 A | 6/1996 | Dezonno et al. |
| 5,528,677 A | 6/1996 | Butlet et al. |
| 5,530,742 A | 6/1996 | Taylor et al. |
| 5,533,109 A | 7/1996 | Baker |
| 5,533,115 A | 7/1996 | Hollenbach |
| 5,533,116 A | 7/1996 | Vesterinen |
| 5,537,401 A | 7/1996 | Tadamura et al. |
| 5,537,461 A | 7/1996 | Bridges et al. |
| 5,537,466 A | 7/1996 | Taylor et al. |
| 5,537,611 A | 7/1996 | Rajagopal et al. |
| 5,539,816 A | 7/1996 | Pinard et al. |
| 5,539,817 A | 7/1996 | Wilkes |
| 5,546,452 A | 8/1996 | Andrews et al. |
| 5,546,574 A | 8/1996 | Grosskopf et al. |
| 5,550,802 A | 8/1996 | Worsley et al. |
| 5,550,906 A | 8/1996 | Chau et al. |
| 5,550,907 A | 8/1996 | Carlsen |
| 5,550,911 A | 8/1996 | Bhagat et al. |
| 5,550,913 A | 8/1996 | McMaster et al. |
| 5,550,914 A | 8/1996 | Clarke et al. |
| 5,551,066 A | 8/1996 | Stillman et al. |
| 5,555,244 A | 9/1996 | Gupta et al. |
| 5,557,745 A | 9/1996 | Perlman et al. |
| 5,559,877 A | 9/1996 | Ash et al. |
| 5,563,939 A | 10/1996 | La Porta et al. |
| 5,566,179 A | 10/1996 | Kobayashi et al. |
| 5,566,235 A | 10/1996 | Hetz |
| 5,566,236 A | 10/1996 | MeLampy et al. |
| 5,568,545 A | 10/1996 | Vesterinen |
| 5,572,581 A | 11/1996 | Sattar et al. |
| 5,572,583 A | 11/1996 | Wheeler, Jr. et al. |
| 5,577,028 A | 11/1996 | Chugo et al. |
| 5,579,384 A | 11/1996 | Seymour |
| 5,581,552 A | 12/1996 | Civanlar et al. |
| 5,581,608 A | 12/1996 | Jreij et al. |
| 5,583,864 A | 12/1996 | Lightfoot et al. |
| 5,583,926 A | 12/1996 | Venier et al. |
| 5,583,927 A | 12/1996 | Ely et al. |

| | | |
|---|---|---|
| 5,583,929 A | 12/1996 | Ardon |
| 5,586,121 A | 12/1996 | Moura et al. |
| 5,588,119 A | 12/1996 | Vincent et al. |
| 5,600,644 A | 2/1997 | Chang et al. |
| 5,602,843 A | 2/1997 | Gray |
| 5,602,851 A | 2/1997 | Terashita et al. |
| 5,602,909 A | 2/1997 | Carkner et al. |
| 5,604,737 A | 2/1997 | Iwami et al. |
| 5,606,600 A | 2/1997 | Elliott et al. |
| 5,608,721 A | 3/1997 | Natarajan et al. |
| 5,608,790 A | 3/1997 | Ardon |
| 5,608,871 A | 3/1997 | Murono |
| 5,610,910 A | 3/1997 | Focsaneanu et al. |
| 5,610,977 A | 3/1997 | Williams et al. |
| 5,621,728 A | 4/1997 | Lightfoot et al. |
| 5,623,605 A | 4/1997 | Keshav et al. |
| 5,633,924 A | 5/1997 | Kaish et al. |
| 5,636,216 A | 6/1997 | Fox et al. |
| 5,640,319 A | 6/1997 | Beuning et al. |
| 5,640,446 A | 6/1997 | Everett et al. |
| 5,640,449 A | 6/1997 | Worley et al. |
| 5,644,625 A | 7/1997 | Solot |
| 5,644,631 A | 7/1997 | Sattar et al. |
| 5,649,091 A | 7/1997 | Ould-Ali et al. |
| 5,649,195 A | 7/1997 | Scott et al. |
| 5,654,957 A | 8/1997 | Koyama |
| 5,657,446 A | 8/1997 | Pinard et al. |
| 5,675,637 A | 10/1997 | Szlam et al. |
| 5,689,555 A | 11/1997 | Sonnenberg |
| 5,696,816 A | 12/1997 | Sonnenberg |
| 5,703,942 A | 12/1997 | Pinard et al. |
| 5,712,907 A | 1/1998 | Wegner et al. |
| 5,717,748 A | 2/1998 | Sneed, Jr. et al. |
| 5,727,047 A | 3/1998 | Bentley et al. |
| 5,732,078 A | 3/1998 | Arango |
| 5,737,333 A | 4/1998 | Civanlar et al. |
| 5,742,596 A | 4/1998 | Baratz et al. |
| 5,745,556 A | 4/1998 | Ronen |
| 5,752,082 A | 5/1998 | Staples |
| 5,764,639 A | 6/1998 | Staples et al. |
| 5,825,868 A | 10/1998 | Diamond |
| 5,838,682 A | 11/1998 | Dekelbaum et al. |
| 5,841,780 A | 11/1998 | Bales et al. |
| 5,841,849 A | 11/1998 | Macor |
| 5,862,211 A | 1/1999 | Roush |
| 5,867,494 A | 2/1999 | Krishnaswamy et al. |
| 5,884,032 A | 3/1999 | Bateman et al. |
| 5,884,262 A | 3/1999 | Wise et al. |
| 5,907,548 A | 5/1999 | Bernstein |
| 5,940,479 A | 8/1999 | Guy et al. |
| 5,946,386 A * | 8/1999 | Rogers et al. ......... 379/265.09 |
| 5,953,350 A | 9/1999 | Higgins |
| 5,987,102 A * | 11/1999 | Elliott et al. ........... 379/265.09 |
| 6,016,343 A | 1/2000 | Hogan et al. |
| 6,026,087 A | 2/2000 | Mirashrafi et al. |
| 6,078,579 A | 6/2000 | Weingarten |
| 6,078,582 A | 6/2000 | Curry et al. |
| 6,141,345 A | 10/2000 | Goeddel et al. |
| 6,298,057 B1 | 10/2001 | Guy et al. |
| 6,310,873 B1 | 10/2001 | Rainis et al. |
| 6,430,282 B1 | 8/2002 | Bannister et al. |
| 6,463,051 B1 | 10/2002 | Ford |
| 6,584,094 B2 * | 6/2003 | Maroulis et al. ............. 370/352 |
| 6,909,708 B1 | 6/2005 | Krishnaswamy et al. |

* cited by examiner

APPARATUS AND METHOD FOR INTEGRATED VOICE GATEWAY

CROSS REFERENCE TO RELATED APPLICATIONS

This application is a divisional of application Ser. No. 09/061,802 filed on Apr. 17, 1998 now abandoned.

FIELD OF THE INVENTION

This invention relates to an integrated voice gateway system.

BACKGROUND OF THE INVENTION

The widespread popularity of the Internet has provided new means of rapid and comprehensive communication between users located in distant and diverse locations around the world. Methods of sending, finding and retrieving information, previously confined to the domain of government, academia and industry, are now available in business, in the community, and in the home. Formerly arcane technical terms such as telnet, electronic mail (e-mail), file transfer protocol (FTP), hypertext transfer protocol (HTTP) and world wide web (WWW or web) are now widely used.

Very soon after the popularity of the Internet became widespread, new applications of the underlying technology began to emerge. With the concomitant growth of multimedia, a predominately text-based medium quickly expanded to include graphics, imagery, motion pictures and sound. A natural extension of the capability to transmit recorded, digitized sound between personal computers (PC), was the advent of PC based telephony. Although the initial users of PC to PC telephone calls over the Internet were primarily computer hobbyists and the like, there was an early recognition of the fact that the Internet provided the potential for the average user to make a telephone call anywhere in the world for the cost of a local telephone call to an Internet service provider (ISP).

PC to PC telephone technology is limited by the need to be logged on to a PC and the Internet to place or receive a call. Software incorporating proprietary algorithms limit the ability to call to others having the same or similar software. The sound quality is often degraded because of packet loss and delays in forwarding packets from the sender to the receiver over the Internet, operation in a half-duplex mode, and the use of low quality PC speakers and microphones.

With the expectation of improved performance and reduced cost of telephone calls in the business environment, voice gateways have facilitated the interconnection of the private branch exchange (PBX) and the computer network. As used herein, PBX includes hybrid, key systems, and other such systems. Thus, through a PBX coupled to an Internet protocol (IP) network (e.g., intranet, wide area network (WAN), Internet), telephone calls between different sites within a company, or other institution, organization or enterprise (hereinafter referred to as "company"), or between companies, the company or companies having installations at two or more locations which locations may be geographically distant from each other, may be routed over the IP network rather than via the public switched telephone network (PST NETWORK). As used herein, the PST NETWORK includes both public and private networks. This can result in significant cost savings and can also help to improve communication within and between companies by providing a variety of related services which are not available via the PST NETWORK.

The level of integration achieved in current voice gateway systems is quite low, and such systems are limited in the services they can provide. In particular, current voice gateway systems are capable of only routing a nominal telephone call from a calling party at point A to a called party at point B. However, if, for example, the called party is not present, or if the called party's telephone is currently busy, current voice gateway systems do not provide important additional services to facilitate making a connection between the calling party and the called party at a later time or at another location or by an alternative method.

One of the reasons for the limitations is that current voice gateway systems are limited in their ability to obtain, store, update and retrieve necessary information about both the calling party and the called party in order to do anything other than simply attempt to make a straight forward connection between the two points. If the telephone system had sufficient information about both parties, then the system could facilitate making the connection at a later time, at another location or by an alternative method. However, in current voice gateway systems, there is no way to obtain the necessary call status and call control information, nor is there an accessible central data base in which to store and from which to retrieve this information. Current voice gateway systems have no real-time call control/call status information link with the PBX, nor do they have any storage of telephone user information. For example, current voice gateway networks have no information regarding the calling party's name, telephone number, or status of the called party, e.g., busy or idle. It is this information about the calling and called parties which is not readily available, but which is necessary to provide important additional services.

There is a need for a highly integrated voice gateway system for use within a company and between companies having installations at two or more locations which locations may be geographically distant from each other. The integrated voice gateway system should have the ability to route telephone calls between parties at two different locations over the IP network as well as the PST NETWORK, and to automatically select which of the IP network and PST NETWORK over which to route telephone calls. The integrated voice gateway system should have the means to obtain, store, update and retrieve information about calling and called parties. For example, in instances in which a calling party is unsuccessful in making a connection to a called party, the integrated voice gateway system should have the means to use information about the calling and called parties to provide services which facilitate making an alternate or subsequent connection between the calling party and the called party.

The following standards are incorporated herein by reference:
ITU-T Recommendation H.323—Packet-based multimedia communications systems;
ITU-T Recommendation X.500—Open systems interconnection—The directory: Overview of concepts, models and services; and
IPNS Forum QSIG Handbook.

SUMMARY OF THE INVENTION

We have now invented a highly integrated voice gateway system for use in a company or between companies having installations at two or more locations which locations may be geographically distant from each other.

As used herein, a voice telephone call from a caller telephone to a called telephone, the call carried via an IP network, is referred to as a VoIP call. As used herein, a fax call from a caller fax machine to a called fax machine, the call carried via an IP network, is referred to as an FoIP call.

Accordingly, it is an object of the invention to provide an integrated voice gateway system for use within a company which can route a voice telephone call between parties at two different locations over an IP network as well as the PST NETWORK and to automatically select which of the IP network and PST NETWORK over which to route the calls. It is a further object of the invention to provide a system which can route a voice telephone call between a calling party using a telephone at a first location within the system to a second location within the system via an IP network, and then from the second location to a called party at a third location via the PST NETWORK.

It is an object of the invention to provide an integrated voice gateway system which can place a telephone call over an IP network, and then if, during the telephone call, the quality of the telephone call falls below a predetermined quality level, to be able to reroute the telephone call over the PST NETWORK, and to do so in a manner which is transparent to both the calling and called parties.

It is an object of the invention to provide an integrated voice gateway system which can track any move, add or change to any telephone user in the enterprise in the integrated voice gateway system. It is a further object of the invention to provide an integrated voice gateway system which can integrate with an enterprise directory to allow single point of entry of moves, adds and changes to telephone users and to provide replication of these changes across all enterprise sites.

It is an object of the invention to provide an integrated voice gateway system in which the identification of the calling party (e.g. name, title, department, telephone number) is displayed on a computer screen (rather than on a telephone display) co-located with the called party's telephone, and that such information be displayed regardless of the vendor (s) supplying the telephone equipment used by the calling and called parties. It is a further object of the invention that such information be provided regardless of the desktop workstation or PC (workstation and PC are referred to interchangeably herein), or operating system used via a WWW browser interface.

It is an object of the invention to provide an integrated voice gateway system which can create a log of incoming telephone calls over an IP network which telephone calls are not answered by a called party, and identify the name of each calling party. It is a further object of the invention to provide a log of all incoming and outgoing calls whether the calls are on net (i.e., IP network) or off net (i.e, PST NETWORK or internal PBX).

It is an object of the invention to provide an integrated voice gateway system in which, when a called party's telephone is busy, the system can automatically set up a call between the calling party and the called party as soon as the called party hangs up. It is a further object of the invention to provide such a capability even when a called party has voice mail.

It is an object of the invention to provide an integrated voice gateway system in which, when a called party is busy, the calling party may send a computer message which will be immediately displayed on a computer screen co-located with the called party's telephone, for example to explain why the calling party needs to speak with the called party.

It is an object of the invention to provide an integrated voice gateway system in which, when a called party does not answer an incoming telephone call, the calling party may forward the call, for example from voice mail, to a receptionist or other designated party. It is a further object of the invention to provide the capability for a party at an answering station to send a computer message which will be immediately displayed on a computer screen co-located with the called party's telephone.

It is an object of the invention to provide an integrated voice gateway system in which a user of the system may set up the system to forward that user's telephone calls to a different telephone. It is a further object of the invention to forward calls to PST NETWORK telephones or PC-based IP telephones. It is a further object of the invention to provide the capability for a user to set up the system to forward that user's telephone calls to different telephones according to a time schedule predetermined by the user. It is a still further object of the invention to provide the capability for a user to set up the system to forward telephone calls originating only from one or more calling parties so designated by the user. It is a further object of the invention to provide the capability to setup call forwarding via a browser interface or interactive voice response (IVR).

It is an object of the invention to provide an integrated voice gateway system in which users can initiate telephone functions from the workstation, such functions including, without limitation, dialing a call, transferring a call, add-on conference, and forward a call to/from any white pages entry or personal telephone book entry. It is an object of the invention to provide an integrated voice gateway system which provides secure access to the system from telephones, including PC-based IP telephones, which are outside the system.

It is an object of the invention to provide an integrated voice gateway system which, when a call from a source to a first destination is transferred from the first destination to a second destination, can direct the path of the call directly from the source to the new destination and thereby maintain the quality of the call.

It is an object of the invention to provide an integrated voice gateway system with an operating system independent browser based client which therefor requires no client software installation. It is a further object of the invention to provide the desktop telephone users with a telephone white pages display of any entry in the enterprise directory services database.

In a first aspect, the invention provides a communication system comprising a public switched telephone (PST) network; an IP network; a PBX coupled to the PST network for routing a telephone call over the PST network; a telephone coupled to the PBX; a voice gateway coupled to the PBX through a call status-call control link and a trunk, and coupled to the IP network for routing a telephone call over the IP network; selection means for selecting which of the PST network or the IP network to route a telephone call; and call status means for the gateway server to monitor events associated with incoming calls to the telephone and outgoing calls from the telephone.

In a second aspect, the invention provides a communication system comprising a PST network; an IP network; a PBX coupled to the PST network for routing a telephone call over the PST network; a telephone coupled to the PBX; a voice gateway coupled to the PBX through a call status-call control link and a trunk, and coupled to the IP network for routing a telephone call over the IP network; a desktop workstation coupled to the voice gateway; selection means for selecting which of the PST network or the IP network to route a telephone call; and PC call control means for controlling the telephone from the desktop workstation.

In a third aspect, the invention provides, in a communication system comprising a PST network, an IP network, a plurality of PBXs at a plurality of locations, the PBXs coupled to the PST network for routing telephone calls over the PST network, coupled to each PBX a respective plurality of telephones, a plurality of voice gateways, each voice gateway coupled to a respective PBX and to the IP network for routing telephone calls over the IP network, and selection means for selecting which of the PST network or the IP network to route telephone calls, fallback to PST NETWORK means for rerouting a telephone call connected over the IP network to the PST network.

In a fourth aspect, the invention provides, in a communication system comprising a PST network, an IP network, a plurality of PBXs at a plurality of locations, the PBXs coupled to the PST network for routing telephone calls over the PST network, coupled to each PBX a respective plurality of telephones, a plurality of voice gateways, each voice gateway coupled to a respective PBX and to the IP network for routing telephone calls over the IP network, and selection means for selecting which of the PST network or the IP network to route telephone calls, a method of automatically rerouting an in process telephone call from the IP network to the PST network when the quality of the telephone call over the IP network falls below a predetermined quality level, the method comprising the steps of (a) establishing a connection for the telephone call over the PST network while the telephone call is still connected over the IP network; (b) switching the parties to telephone call over the PST network; and (c) breaking the connection for the telephone call over the IP network while maintaining the telephone call over the PST network.

In a fifth aspect, the invention provides, in a communication system comprising a PST network, an IP network, a plurality of private branch exchanges (PBX) at a plurality of locations, the PBXs coupled to the PST network for routing telephone calls over the PST network, coupled to each PBX a respective plurality of telephones, a plurality of voice gateways, each voice gateway coupled to a respective PBX and to the IP network for routing telephone calls over the IP network, and selection means for selecting which of the PST network or the IP network to route telephone calls, fallback during call setup means to automatically route a telephone call over the PST network if, during call setup, the telephone call cannot be setup over the IP network.

In a sixth aspect, the invention provides a method of configuring an enterprise directory for IP telephony, the method comprising the steps of (a) providing an X.500 compatible directory; and (b) including in the schema of the directory at least one of GateKeeper, Gateway, Multipoint Control Unit (MCU), GateKeeper Exchange, and a desktop user object and attribute.

In a seventh aspect, the invention provides a computer telephony integration (CTI) system comprising a PBX, a telephone coupled to the PBX, a local area network (LAN), a voice gateway coupled to the LAN, a CTI server coupled to the PBX and coupled to the LAN, a web server coupled to the LAN, a desktop workstation coupled to the LAN, the desktop workstation comprising a web browser. In an eighth aspect, the invention provides a communication system comprising a PST network, an IP network, a PBX coupled to the PST network for routing a telephone call over the PST network, a voice gateway coupled to the PBX and the IP network for routing a telephone call over the IP network, and selection means for selecting which of the PST network or the IP network to route a telephone call, and for a telephone call placed from a first telephone at a first location, over the IP network to a second telephone at a second location, path replacement means for transferring the telephone call from the second telephone at the second location to a third telephone at a third location, the path replacement means routing the telephone call from the first telephone at the first location over the IP network to the third telephone.

In a ninth aspect, the invention provides a communication system comprising a PST network, IP network, a plurality of PBXs at a plurality of locations, the PBXs coupled to the PST network for routing telephone calls over the PST network, coupled to each PBX a respective plurality of telephones, a plurality of voice gateways, each voice gateway coupled to a respective PBX through a call status and call control link and a trunk, and coupled to the IP network for routing telephone calls over the IP network, coupled to a plurality of voice gateways, selection means for selecting which of the PST network or the IP network to route telephone calls, and feature networking means for providing PBX features among the plurality of locations over the IP network.

The integrated voice gateway system includes a gateway server which serves as an Intranet/Internet telephony gateway. The gateway server routes intra-company voice or facsimile (fax) calls, made from user's desktop phones or fax machines/servers, over the company's intranet or the public Internet. The gateway server provides an alternate voice network to the PST NETWORK for a company. This alternate network carries voice and fax calls at a much lower cost. This is because an intranet is built to support bursty data traffic and the bandwidth is underutilized most of the time. The gateway server takes advantage of the underutilized bandwidth when such bandwidth is available to transmit voice.

The gateway server is a combination of hardware and software components which reside on a workstation server platform. The gateway server is coupled to a customer premise telephone system, i.e. a PBX via a T1 or E1 trunk for larger systems, or an analog trunk for smaller systems. The gateway server is coupled to the company's intranet via industry standard connections (e.g., ethernet, frame relay or asynchronous transfer mode (ATM)). Thus, the gateway server is a gateway between the PBX/PST NETWORK and the company's intranet. The gateway servers in a multi-site company are therefore coupled together via the company's intranet or wide area network (WAN) into a gateway network.

The gateway server uses call status and call control integration with the PBX to provide many unique and useful features which are otherwise unavailable. The gateway server supports a variety of call status/call control PBX links including T1 inband ANI, PRI, QSIG (global DSS1 based signaling system for corporate networks, not an acronym, known at the international level as Private Signaling System No. 1 (PSS1)) and CTI. Industry standard CTI applications programming interfaces (API) are supported, including the AT&T/Novell Telephony Services Application Programming Interface (TSAPI), the Microsoft Telephony Application Programming Interface (TAPI), and the European Computer Manufacturers Association (ECMA) Computer Supported Telephony Applications (CSTA) protocol. Hence the gateway server can provide enhanced features via a variety of call status/call control links with the level of enhanced features available depending on the type of link used.

The gateway server is also equipped with a database of user and gateway objects and attributes. This database provides many unique features including providing caller's name based on caller phone number, address translation, gateway network routing information, user authentication, etc. This database is stored in the server but can be integrated with industry standard enterprise directory services systems including Novell Directory Services (NDS), Microsoft Active Directory Services (ADS), Domain NT and any directory which supports the Lightweight Directory Access Protocol (X.500) (LDAP) interface. The integration provides the enterprise with a single point of entry for user adds, moves and changes, and provides replication throughout all corporate sites.

A gateway network in a company essentially connects a company's PBXs, which are often geographically dispersed, into a single intelligent virtual PBX (VPBX). A company-wide VPBX provides advanced end-user features across the company. These features would otherwise be available only within the scope of a single PBX, or would require expensive PBX features interworking products which require expensive PBX resident software and expensive data connections, e.g. dedicated voice tie lines between sites. By providing PBX features interworking via IP, call status-call control and a database of user and gateway objects and attributes, the gateway server offers PBX features interworking, at a lower cost, over a network of mixed PBXs from different vendors and over a single converged network (data tie line or data VPN).

The gateway server works with existing telephone systems, and with the mixed networks of telephone systems commonly found in large companies. The gateway server provides feature interworking using the combination of the desktop telephone and desktop workstation. Current PBX systems provide such internetworking capabilities only between desktop telephones. With the gateway server, however, a worker using a desktop telephone can be notified of an important call via the desktop workstation. The unique ability of the gateway server to control both the desktop telephone and the desktop workstation for calls between remote workers provides many new VPBX features not available with current PBX to PBX solutions, and provides an alternative method for current PBX networking features that is not limited to only sites with the same vendor PBX models. These consistent features across the network substantially improve communications and enhance productivity by making employees at multiple sites feel like they are part of a single community. In addition to end-user visible features, the gateway server also offers benefits such as intelligent routing (using automatic configuration) and increases network performance.

The gateway server supports routing of telephone and fax calls made from desktop telephones or stand alone fax machines, or workstation integrated fax servers over a company's intranet or the public Internet. By configuring a selection table in the server, the gateway server can route real-time fax calls over either the intranet or Internet to minimize the cost of the fax call. The gateway server supports computer-based fax as well as stand-alone fax machines.

By integrating CTI and enterprise directory service with IP telephony, the gateway server provides many more features in a user-friendly way than current Internet/intranet telephony to IP voice gateways. Current voice gateways connect only to a telephone system's voice lines, e.g., analog, ISDN BRI, ISDN PRI, or T1. This provides only for carrying voice or fax calls over IP. The gateway server is unique in that the server also provides a call control and call status link to the telephone system. Moreover, current voice gateways do not store user telephone information such as telephone number and associated user name. The gateway server is unique in that it stores extensive user telephone information and also integrates with industry standard enterprise directory services. The use of extensions to the enterprise directory services to implement IP telephony services is a new concept introduced by the gateway server of the invention.

The gateway server can route long distance calls among multiple company locations and do so in a manner which is transparent to the users, except perhaps for possible differences in the quality of voice transmission. However, the users dial the same way that they currently dial to make calls whether over public or private networks. The routing table of the PBX automatically routes designated calls to the voice gateway and the gateway then decides whether to route the call over the company's intranet or the Internet.

In addition to integrating CTI and enterprise directory service with IP telephony, the gateway server also provides many unique IP telephony features in addition to the VPBX features.

By constantly monitoring the quality of a voice call over the IP network, the gateway network of the invention can continue to maintain a call over the IP network as long as the quality of the call is above a predetermined quality level. If the quality of a voice call over the intranet or Internet falls below a predetermined quality level, e.g. due to network congestion, the gateway server can automatically "fall back" to the PST NETWORK. The gateway server can automatically set up a call over the PST NETWORK between the caller and called party's desktop telephones and switch the parties to the PST NETWORK call. The gateway server can then drop the IP portion of the call such that the caller and called party are then talking over the PST NETWORK. Current voice gateway systems cannot switch a call to the PST NETWORK once the call has been connected. Since data network congestion can change significantly at any time, e.g. a large graphics file is suddenly downloaded in the middle of an IP telephone call, the ability to switch to the PST NETWORK during an IP telephone call is a significant advantage to the calling parties. Current systems require the calling parties to hang up if the voice quality deteriorates during a call, and place a new call, which may encounter the same network congestion problem, unless the entire gateway is shut down.

Moreover, in current voice gateway systems, if one remote gateway is not accessible, the entire gateway must be shut down or callers to the non-accessible remote gateway would be forced to continually hang up and call again and again until the remote gateway is accessible, or dedicated ports would be required for each gateway segment. The integrated voice gateway system of the invention provides the capability to fallback to PST NETWORK during call setup in which only calls directed to a non-accessible gateway are routed over the PST NETWORK, while still allowing other calls to be routed via the gateway and IP network. If a remote gateway is not accessible, a voice call would not necessarily be rerouted over the PST NETWORK as would be done by current voice gateways.

DETAILED DESCRIPTION OF THE INVENTION

Figure 1:
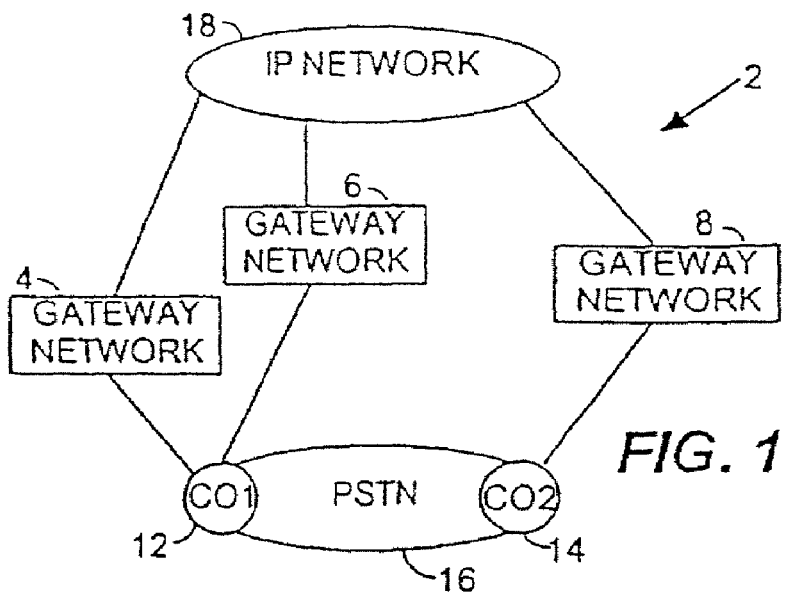
FIG. 1 is a block diagram of an overview of the top-level architecture of an embodiment of an integrated voice gateway system according to a first aspect of the invention.

FIG. 1 is a block diagram of an overview of the top-level architecture of an embodiment of an integrated voice gateway system 2 according to a first aspect of the invention. The block diagram depicts three gateway networks 4, 6, 8 of a multi-site company. In embodiments of the invention, such gateway networks may be located, e.g. in different buildings of a large plant, such as in an industrial park or campus setting, in different locations within the same city, or may be located at geographically distant locations, including worldwide. The gateway networks may also be located in different companies. In the particular example depicted in FIG. 1, first and second gateway networks 4, 6 may be within a large industrial park or at different locations within a city as they are both coupled to a first telephone company central office (CO) CO1 12. The third gateway network 8 is geographically distant from both the first and second gateway networks 4, 6 and is coupled to a second CO, CO2 14. CO1 12 and CO2 14 are part of a PST NETWORK 16. The PST NETWORK 16 may include many COs. Each of the gateway networks 4, 6, 8 is coupled to the company's IP network 18. The IP network 18 may include an intranet, the Internet, and the like.

Figure 2:
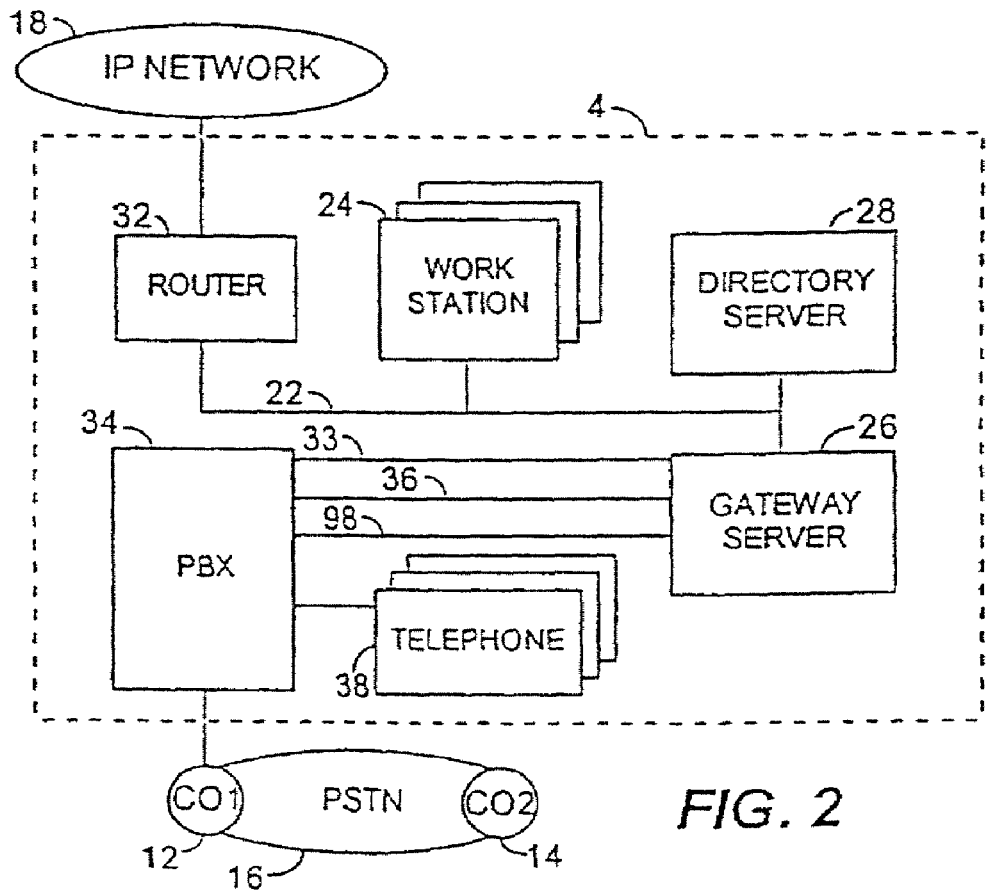
FIG. 2 is a block diagram of the top-level architecture of a gateway network according to a first aspect of the invention.

In the description of FIG. 2 and subsequent FIGS., a generic embodiment of a gateway network according to the invention will be described with reference to the first gateway network 4 depicted in FIG. 1.

FIG. 2 is a block diagram of the top-level architecture of an embodiment of a gateway network 4 (represented by the dashed box) according to a first aspect of the invention.

The gateway network 4 includes a local area network (LAN) 22. Coupled to the LAN 22 are one or more workstations 24, a gateway server 26, a directory server 28, and a router 32. The gateway server 26 is also coupled to the PBX 34 via a call status—call control link. The call status—call control link can comprise a CTI link 98, a PRI interface 36, a QSIG interface 36 or an analog driver 33. These interfaces are individually illustrated and described below in reference to FIG. 3.

The PBX 34 is coupled to CO1 12. One or more telephones 38 are coupled to the PBX 34. The telephones 38 may be any telephone device connecting to a PBX, e.g. analog (POTS), proprietary digital, or standards-based digital (ISDN BRI). Each telephone 38 may be logically associated with and may be co-located with a respective workstation 24. The gateway server 26 is also coupled to the PBX 34 via an industry standard telephone station interface 33.

The CTI interface 98 between the gateway server 26 and the PBX 34 uses an industry standard CTI API, e.g., TSAPI, TAPI and CT Connect. Both TSAPI and TAPI focus on call control. The CTI interfaces enable computer control of dialing, answering, transferring and conferencing, and provide status. In PBX environments, the CTI interfaces also support control of advanced features of digital telephones (TAPI) and the switches to which those station sets connect (TSAPI).

The directory server 28 may reside in separate hardware or may be co-located with the gateway server 26 in the same hardware.

Figure 3:
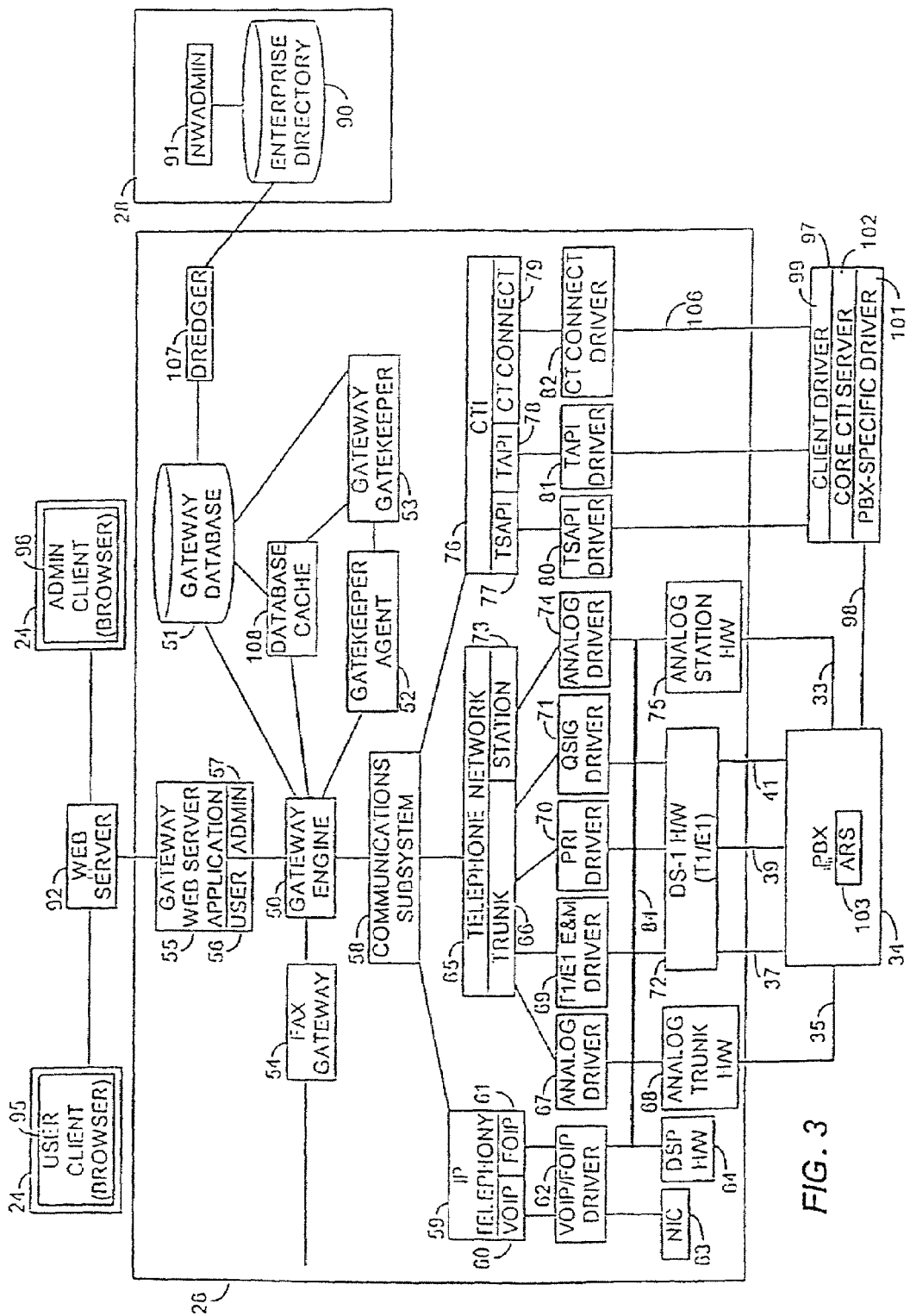
FIG. 3 is a block diagram illustrating major software and hardware components of an embodiment of a gateway network according to a first aspect of the invention.

FIG. 3 is a block diagram illustrating major software and hardware components of an embodiment of a gateway server 26 according to a first aspect of the invention. The gateway server 26 includes software modules which communicate among themselves and have interconnections to other components through either software drivers supporting interfacing hardware elements, or communication links to other components.

The gateway engine 50 is the central logic coordinating element of the gateway server 26. The gateway engine 50 directs and oversees the activities of the other components of the gateway server 26 and gateway network 4 (FIG. 2). As call processing occurs, the gateway engine 50 accesses routing information from a gateway gatekeeper 53 and directs a communication subsystem 58. The gateway engine 50 also contains the feature logic for VPBX capabilities. The gateway engine 50 also creates logging and statistical data.

The enterprise directory 90 is a company-wide general purpose directory or global database of named objects including users, network devices (e.g. routers, gateways), and network services (e.g. print servers), etc. The enterprise directory 90 is a distributed system with replication and synchronization among its nodes, and has an extensible object schema. The implementation of the enterprise directory 90 in the integrated voice gateway system of the invention includes the extension of the directory schema to support IP telephony.

In a preferred embodiment, the enterprise directory 90 is implemented using a general purpose directory such as NDS. The invention introduces schema extensions in NDS. The schema extensions enhance the NDS base schema so that it supports the Directory Services requirements for an H.323 Recommendation based IP telephony network. In addition to H.323 support, the schema extension enables the H.323 gatekeepers in an H.323 IP telephony network to automatically find each other. This capability is not currently specified and supported by the ITU H.323 Recommendation v.1. The schema extensions also enable the invention to provide many of its unique features, e.g. caller ID, follow me with call filtering, etc.

Figure 3A:
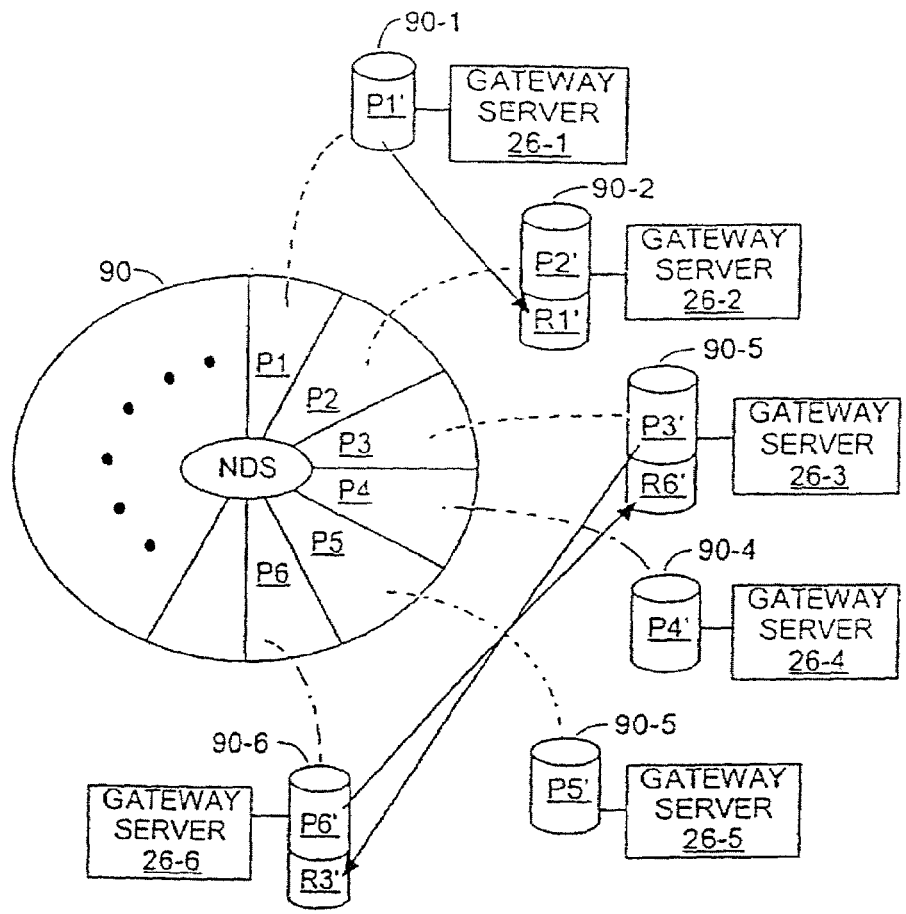
FIG. 3A illustrates the distributed architecture of the enterprise directory.

FIG. 3A illustrates the distributed architecture of the enterprise directory 90. In FIG. 3A, the logical organization of the enterprise directory 90 is illustrated by the large ellipse with NDS at its center and surrounded by a series of pie-shaped logical partitions P1, P2, P3, P4, P5, P6. The number of partitions illustrated in FIG. 3A is arbitrary, as the actual number of partitions in a particular gateway network will depend on the needs of the particular enterprise.

Also illustrated in FIG. 3A are a series of gateway servers 26-1, 26-2, 26-3, 26-4, 26-5, 26-6, each gateway server coupled to a respective physical partition P1', P2', P3', P4', P5', P6' of the enterprise directory 90. The dashed curved lines indicate the correspondence of the physical partitions P1', P2', P3', P4', P5', P6' wit the logical partitions P1, P2, P3, P4, P5, P6 of the enterprise directory 90. Each physical partition P1', P2', P3', P4', P5', P6' comprises the portion of the respective enterprise directory 90 applicable to the respective location served by a gateway server 26-1, 26-2, 26-3, 26-4, 26-5, 26-6 in the enterprise's gateway network.

In addition, the enterprise directory 90 at an individual location may include a replica of a partition from another location in the network. This can be done, for example, to facilitate set up of calls between locations which have a high volume of telephone calls. The arrows in FIG. 3A indicate the locations of replicas of partitions which are included in the enterprise directories at other locations. In the configuration illustrated in FIG. 3A, a replica of the partition P1' at the first location is included in the enterprise directory 90-2 at the second location. Also, both the third and sixth locations have replicas R3', R6' of each other's partitions. As indicated above, the replicas of the partitions are automatically synchronized, whereby changes to entries in a partition at one location, are sent to other locations having a replica of the respective partition.

Referring again to FIG. 3, the gateway database 51 is an open database connectivity (ODBC) compatible database. The gateway database 51 contains enterprise white pages, frequent contact information, gateway routing tables, individual user follow me records, and a call log. The gateway database 51 records are fully indexed to provide necessary real-time performance. The enterprise directory 90 is the source of the white pages, and frequent contact and raw routing tables. This information is separately maintained in the gateway database because commercially available implementations of an enterprise directory, e.g. NDS, are not indexed, and are therefore not easily searchable. The gateway database 51 is indexed to facilitate the availability of the data. The data is obtained from the enterprise directory 90 and passed to the gateway database 51 by the dredger 107. The gateway database 51 also includes an operational routing table, user follow me and call log data which are created within the gateway server 26.

The gateway database 51 runs on an ODBC compliant database application. Suitable database applications include, for example, Jet, which is included with Windows NT 4.0, and Oracle 8.

The preferred embodiment of the invention includes the X.500 compatible enterprise directory. However, in installations which do not have an X.500 compatible enterprise directory, the alternative embodiments of the gateway network of the invention may include other database configurations. For example, one alternate embodiment may be used in systems which have an SQL Server database. The schema extensions may be added to the existing data structures in the SQL database, or a new, comprehensive schema may be established.

In a second alternative embodiment, the enterprise directory includes a database designated the master database at a first location, and duplicate databases, designated slave databases at the remaining locations in the gateway network. In this master-slave configuration, all database administration is performed on the master database. Updates to the master database are exported to a file which is sent to the other locations and imported into the slave databases. The dredging and synchronization process would be the same as for an X.500 compatible enterprise directory. The database cache 108 is a repository of information contained in RAM in the gateway server 26. The database cache includes data duplicated from the gateway database 51 which data is required to be in RAM to support the performance of the gateway server, and also transient dynamically changing data, e.g. idle/busy status of users' telephones. Much of the data in the database cache 108 is indexed for rapid retrieval.

The gatekeeper agent 52 is the equivalent of an H.323 gatekeeper client. The gatekeeper agent 52 interacts with the gateway gatekeeper 53 for address translation, e.g. PST NETWORK telephone number to IP address of a remote destination gateway server or H.323 telephone.

The gateway gatekeeper 53 is an embedded equivalent of an H.323 gatekeeper. The gateway gatekeeper 53 services the request for address translation received from the gatekeeper agent 52. This module uses data within the gateway database 51 for performing address translations.

The fax gateway 54 sends and receives faxes to and from an external fax server (not illustrated). The fax gateway 54 also translates faxes into printable files and transfers the files to a print server (not illustrated) for printing.

The gateway web server application 55 supports the components of the web client server applications in the gateway network 4. A suitable web server application 55 is the Microsoft NT IIS server application which uses ActiveX server components and Active Server Pages technologies.

The user web server application 56 is a server application component which supports user clients by responding to HTTP user requests by the user clients. The administrator web server application 57 is a server application component which supports system administrator clients by responding to HTTP user requests by administrator clients.

In a preferred embodiment, the web server 92 is a Microsoft NT IIS Server. The web server 92 provides the client/server communication mechanism between browser-based clients, e.g. a user client 95 and an administrative client 96, and the gateway web server application 55, the user web application 56 and the administrator web application 57. The web server 92 may be co-located on the same server hardware as the gateway server 26 or may be on separate server hardware.

The user client 95 (also referred to herein as "browser") is a browser-based graphical user interface (GUI) application which resides in a desktop workstation 24. Java and HTML are used to provide the user interface. This application interface is used to deliver integrated gateway user features. The administrator client 96 is also a browser-based GUI application, which resides in a desktop workstation 24.

The communications subsystem 58 presents to the gateway engine 50 an abstract appearance of telephony capabilities and activities in the system. The communications system 58 merges information from separate modules (e.g., the telephone network 65 and CTI 76 modules) to present a single logical PBX representation. The communications subsystem 58 also allows calls to be managed in a similar manner by the higher systems, whether telephone network or IP telephony in nature during initiation, while active and at completion.

The IP telephony module 59 is an object oriented abstraction of IP telephony. This module permits hardware from different vendors to be used, thereby isolating their differences from the higher level components of the system. The VoIP submodule 60 is an object oriented abstraction of an H.323 implementation including H.323 call control and H.323 voice transmission over an IP network. The FoIP submodule 61 is an object oriented abstraction of T.IFAX2 implementation including the fax interaction and transmission protocol over an IP network. The VoIP/FoIP driver 62 is the software layer supplied with IP telephony hardware to support the gateway server 26 application. A network interface card (NIC) 63 connection (e.g., ethernet 10baseT) provides the IP connection to the data network (not illustrated) used to transmit and receive IP telephony communications. A digital signal processor (DSP) 64 includes a microprocessor which is specialized to manage real-time digitally encoded signals. For IP telephony, the DSP 64 may include coder/decoder (codec) algorithms to compress and decompress voice signals.

The telephone network module 65 is an object oriented abstraction of switched circuit telephone network connections. These connection types are the foundations of today's telephone network. Elements controlled in the telephone network module 65 include station interfaces 73, trunk interfaces 66, and resources to interact with the media stream (e.g. record and playback voices, detect and generate touch tones, etc.). The telephone network module 65 represents all the call processing information and call status.

The trunk interface submodule 66 is an object oriented abstraction of telephone network trunk connections. Several telephone trunk types may be supported including, e.g., analog trunks (Loop Start and Ground Start), T1/E1 E&M trunks, ISDN PRI trunks (T1/E1), and ISDN QSIG (T1/E1). The trunk interface submodule 66 can interface with a variety of hardware specific software drivers, e.g. analog driver 67, T1/E1 E&M driver 69, PRI driver 70, and QSIG driver 71.

The analog trunk hardware 68 supports connecting analog trunk lines 35. The analog trunk hardware 68 provides the physical connection of this trunk type to the gateway server 26 and, in some cases, provides a connection to an internal time division multiplexing (TDM) bus 84. Suitable analog trunk hardware 68 includes the QuickNet Technologies LineJack card.

The DC-1 hardware (T1/E1) 72 supports connecting DC-1 trunk lines (T1/E1 E&M) 37, (PRI) 39, (QSIG) 41. The DC-1 hardware 72 provides the physical connection of this trunk type to the server and, in some cases, provides a connection to the internal TDM bus 84. The DC-1 hardware 72 card may be a T1 card which supports 24 channels (domestic US) or an E1 card which supports 30 channels (European). A suitable DC-1 hardware 72 card is the Dialogic D240.SC card.

The analog station hardware 75 supports connecting analog station lines 33. The analog station hardware 75 provides the physical connection to the gateway server 26 and, in some cases, provides a connection to the internal TDM bus 84. A suitable analog station hardware 75 is the Dialogic DIALOG/4 card.

The TDM bus 84 is an internal bus which provides a switching matrix for circuit switched telephone connections. The TDM bus 84 is used to transport voice signals or other call content from one hardware device (e.g., analog trunk 68, DC-1 H/W (T1/E1) 72, and analog station H/W 75) to another within the system. The TDM bus 84 may exist both internal to a single card as well as providing a physical connection where multiple cards may be interconnected. Suitable implementations of a TDM bus 84 include the Dialogic SC-Bus and the Natural Microsystems MVIP bus.

The station interface submodule 73 is an object oriented abstraction of telephone network station connections. The interactions embodied in the station interface submodule 73 represent the operation of a telephone device connected to a telephone system PBX or public network. In the embodiment illustrated in FIG. 3, the station interface submodule 73 is implemented using analog station connections (POTS telephone), however the station interface submodule 73 may also be implemented using digital telephone connections, e.g. ISDN BRI emulation. The station interface submodule 73 interfaces with a variety of station hardware specific software drivers, illustrated in FIG. 3 as an analog station driver 74.

The CTI module 76 provides an object oriented abstraction of a CTI link connection to a PBX. The CTI module 76 supports the delivery of events received and the receipt of call control commands in an abstract sense for processing and subsequent handoff for delivery to the PBX 34 over the CTI link 98. The CTI module 76 can support the requirements of industry standard CTI links, e.g. TSAPI, TAPI and CT Connect. The TSAPI submodule 77 supports all communications with the TSAPI driver 80. The TSAPI submodule 77 normalizes any TSAPI differences which exist among various PBX implementations into a common TSAPI abstraction, and presents this abstraction to the CTI module 76. The TAPI submodule 78 supports all communications with the TAPI driver 81. The TAPI submodule 78 normalizes any TAPI differences which exist among the various PBX implementations into a common TAPI abstraction and presents this abstraction to the CTI module 76. The CT Connect submodule 79 supports all communications with the CT Connect driver 82. The CT Connect submodule 79 normalizes any CT Connect differences which exist among the various PBX implementations into a common CT Connect abstraction and presents this abstraction to the CTI module 76.

The CTI server 97 is a client/server application which controls the flow of information between the gateway server 26 and the PBX 34 over the PBX CTI link 98. The core CTI server module 102 provides the central logic for the application. The CTI client driver 99 manages logical link connectivity to client applications. The CTI client driver 99 also manages a communications link 106 to the CT Connect driver 82, and brokers the information flow to and from the CT Connect driver 82. The PBX-specific driver 101 interfaces with the CTI server core module 102, translates the CTI server's 97 standard messaging to/from the particular protocol used by the specific PBX 34, and delivers the information to/from the physical connection to the PBX 34. The physical connection to the PBX 34 may be an ethernet NIC, or a dedicated physical link with a protocol, e.g. X.25 or ISDN BRI. Suitable client/server CTI implementations include Novell TSAPI, Microsoft TAPI 2.1 and Dialogic CT Connect. The CTI server 97 may be a stand alone application on separate server hardware or may reside in the same server hardware as the gateway server 26.

The gateway server 26 integrates with telecommunications customer premises equipment (CPE), in particular PBXs for large sites and hybrid/key systems at smaller locations. The term PBX is used herein interchangeably to refer to all such systems.

The automatic route selection (ARS) 103 is a functional capability that the PBX 34 employs to select the preferred trunk for placing a call. PBXs may have a variety of trunks attached, including local lines, direct lines to a long distance provider, private leased lines interconnecting with other company PBXs, and virtual private networks. The ARS 103, sometimes also called least cost routing (LCR), reviews the number dialed, and identifies a preferred trunk. If the preferred trunk is busy, the ARS 103 will proceed to a subsequent choice. The ARS 103 then adds or deletes digits to condition the number dialed and transmit the call over the selected line. This feature is also available on some hybrid/key systems. In a preferred embodiment of the invention, the ARS 103 is configured to route calls destined across the gateway network to the gateway server as the preferred first choice. The PBX 34 uses trunks to connect to the PST NETWORK CO and to interconnect to other PBXs. Various types of trunks may be used, including analog, T1, E1, ISDN PRI, and QSIG. In a preferred embodiment, the gateway server 26 can support all the trunk types listed.

A PBX station line is a connection for a telephone device. PBXs may support several types of telephone devices, including analog (POTS), proprietary digital stations, and ISDN terminals. The gateway server 26 may use analog station lines 33 to interface with the PBX.

Enterprise Directory Schema Extensions

The integrated computer telephone system introduces schema extensions in industry standard enterprise directory services systems to support IP telephony. While the description of the schema extensions will be presented in terms of NDS, it is understood that the schema extensions are applicable to other industry standard directory systems.

The schema extensions enhance the NDS base schema so that the schema supports the Directory Services requirement for an ITU H.323 Recommendation based IP telephony network. In addition to H.323 support, the schema extensions enable the H.323 gatekeepers in an H.323 IP telephony network to automatically find each other. This capability is not currently specified and supported by ITU H.323 Recommendation v.1. The schema extensions also enable the gateway server to provide additional features, e.g. caller ID and call filtering.

The schema extension includes additional NDS objects and additional NDS attributes. The schema enhancement defines the relationships among the additional NDS objects and attributes. The additional NDS objects for H.323 include H.323 Gateway, H.323 Gatekeeper, and H.323 Multipoint Control Unit (MCU). The additional NDS attributes are applicable to the additional H.323 objects and existing NDS objects.

Table 1 lists the attributes which are included in the NDS enterprise directory schema extensions in a preferred embodiment of the invention. Table 1 includes the name of each attribute added to the schema, a brief definition of each attribute, and an indication as to whether the attribute is added to support the use of the enterprise directory to support IP telephony or to support the advanced features

TABLE 1

New Attributes Included in the Enterprise Directory Schema Extension

| Attribute | Definition | Supports |
|---|---|---|
| Attendant Number | Specifies the telephone number for a gateway server for Finder activation/deactivation, Hop On from PST NETWORK, etc. | Advanced Features |
| Auto Attendant Prefix | Specifies the dialing string for the auto attendant preceding the extension number (null value if no autoattendant and Direct Inward Dialing is available for the PBX). | Advanced Features |
| CallAlert Timeout | Specifies the time-out period, in seconds, for Call Alert inaction for a gateway server. | Advanced Features |

TABLE 1-continued

New Attributes Included in the Enterprise Directory Schema Extension

| Attribute | Definition | Supports |
|---|---|---|
| Call Log Configuration | Specifies the duration, in days, of the call log parameters for a gateway server, including Call Log Duration, Call Log Type 1, Call Log Type 2, . . . (where Call Log Type i specifies the event logging level for a gateway server. There can be multiple event logging levels.). | Advanced Features |
| WhitePages Subtree | Specifies the scope of the whirte pages in the context of the enterprise directory. The gateway server catalog contains WhitePages and other information derived from the enterprise directory. This attribute establishes the directory contents that the WhitePages contain. | Advanced Features |
| Cellular Phone | Specifies the user's cellular phone number. | Advanced Features |
| CTI | Specifies the CTI link between the gateway server and the PBX, including CTI Type, Link Name, and Server Name. | Advanced Features |
| CTN Access Code | Specifies the special trunk access code to the Corporate Telephony Network, e.g. "8" (null value if the PBX does not support CTN dialing). | Advanced Features |
| CTN Location ID | Specifies the location ID(s) for the gateway network in the Corporate Telephony Network numbering plan. | Advanced Features |
| CTN Numbers Table | Specifies the Corporate Telephony Network numbers (or number patterns) represented by the gateway network for its PBX and its satellite PBXs (i.e. PBXs connected to the gateway server indirectly through another PBX, and which use the gateway server to get on to the IP network), including Location ID, Extension Range, PST NETWORK pattern, and Comments (for the system administrator). | Advanced Features |
| CTN Trunk Translation | Specifies the translation table for converting from the PBX numbering format to CTN canonical format, including Trunk Group ID, Trunk ID Range, Number of Digits to Delete, Digit to Prepend, and Trunk Card ID, and Comments. | Advanced Features |
| FallBack Number | Specifies the fallback number for a gateway server. This is the PST NETWORK number that the gateway servers use to call each other for fallback to PST NETWORK. | Advanced Features |
| GateKeeper | Specifies the default GateKeeper with which an entity such as Gateway and H.323 Terminal should register. Entities are allowed to register with GateKeeper for the H.323 Zone to which the entity belongs. | IP Telephony |
| GatekKeeper Exchange | Identifies the GateKeeper Exchange with which a GateKeeper is associated. | IP Telephony |
| Gateway | Specifies the gateway associated with a gateway network entity, e.g. a user. | IP Telephony |
| Gateway List | Specifies the gateway servers associated with a GateKeeper. | IP Telephony |
| Home Phone | Specifies the user's home phone number. | Advanced Features |
| HopOff Enabled | Specifies whether Hop-Off to PST NETWORK is enabled for a gateway server. | Advanced Features |
| HopOff PST NETWORK Patterns | Specifies the PST NETWORK number patterns for hop-off to PST NETWORK for the gateway server. Only PST NETWORK numbers which match these patterns can be reached via hop-off from this gateway server. This attribute facilitates the automatic routing configuration for the gateway network. | Advanced Features |
| HopOn Enabled | Specifies whether Hop-On from PST NETWORK is enabled for a gateway server. | Advanced Features |
| HopOn for OffNet Call List | Specifies the list of users, groups, or containers authorized to access Hop-On for Off-Net calls.. | Advanced Features |
| License | Contains the license data for a gateway network, including Serial Number and License Count. | Advanced Features |
| Manual Fallback Code | Specifies code (a combination of multiple telephone keypad keys) for fallback to PST NETWORK (null value if manual fallback is disabled). | Advanced Features |
| Maximum CallBacks per User | Specifies the maximum number of outstanding Callback on Busy requests for each user of a gateway server (zero if callbacks are not allowed, no value if no limit on the number of callback requests). | Advanced Features |
| Office Fax | Identifies the user's office fax number. | Advanced Features |
| Office Phone | Identifies the user's office telephone number. It is used for providing Caller ID, including CTN On-Net Number and PST NETWORK Number. | Advanced Features |
| Pager | Identifies the user's pager number. | Advanced Features |
| Passcode | Specifies user passcode for the gateway finder activation/deactivation user authentication from a telephone. | Advanced Features |
| PBX Information | Specifies the PBX configuration information which is used by the gateway server, including PBX Type, Station to CO Trunk Access Code, Station to Gateway Server Trunk Access Code, Gateway Server to Local Trunk Access Code, Gateway Server to Toll Trunk Access Code, and DISA Access Code. | Advanced Features |
| PBX Station Interface | Specifies the Station Line interface between the gateway server and the PBX, including Card ID, Card Name, Port Number, For Attendant Yes/No, and Fallback Yes/No. | Advanced Features |
| PBX Trunk Interface | Specifies the Trunk Line interface between the gateway server and the PBX, including Trunk Card ID, Trunk Type, Trunk Protocol, and Trunk Card Name.. | Advanced Features |
| PST NETWORK Codes | Specifies the PST NETWORK codes for a gateway server, including E164 Country Code, E164 Area Code, International Access Code, and Long Distance Access Code. | Advanced Features |
| Desktop CTI License Count | Specifies the number of licenses installed for users who are authorized to access this class of service, i.e. provided with access to CTI capabilities from the desktop browser. (This value may be for reference only.) | Advanced Features |
| Desktop CTI License List | Specifies the list of users, groups or containers who are authorized this class of service, i.e. provided with access to CTI capabilities from the desktop browser. | Advanced Features |
| Finder Acceptance Code | Specifies the acceptance code for answering a redirected call using this class of service. | Advanced Features |
| Finder License Count | Specifies the number of licenses installed for users who are authorized to access this class of service, i.e. who may have calls forwarded to alternate telephone numbers. (This value may be for reference only.) | Advanced Features |
| Finder License List | Specifies the list of users, groups or containers who are authorized this class of service, i.e. who are authorized to have calls forwarded to alternate telephone numbers. | Advanced Features |
| Mobile License Count | Specifies the number of licenses installed for users who are authorized this class of service, i.e. who may operate a portable computer as a virtual desktop from a remote telephone. (This value may be for reference only.) | Advanced Features |
| Mobile License List | Specifies the list of users, groups, or containers who are authorized this class of service, i.e. authorized operate a portable computer as a virtual desktop from a remote telephone. | Advanced Features |

TABLE 1-continued

New Attributes Included in the Enterprise Directory Schema Extension

| Attribute | Definition | Supports |
|---|---|---|
| UEP Domain | Specifies the gateway network Uniform Extension Plan domain. | Advanced Features |
| UEP Domain List | Contains a list of all the UEP domains in the Corporate Telephony Network. | Advanced Features |
| User Preferences | Specifies the user preferences for the gateway network, including Screen Pops On/Off, Screen Pops Audible On/Off, Screen Pops Size Large/Small, and Number of Call Log Entries. | Advanced Features |
| VoIP Address Parameters | Specifies the address parameters associated with the VoIP subsystem in the gateway server, including VoIP Internet Address, VoIP Intranet Address, and VoIP Port Number. | Advanced Features |
| VoIP Encoding | Specifies the VoIP encoding parameters, including TxCoder (voice CODEC for transmitting), RxCoder (voice CODEC for receiving), volume (AGC for VoIP transmission), frame size (in milliseconds), and frames per packet (number of VoIP frames per UDP packet). | IP Telephony |
| VoIP Hardware | Specifies the hardware that is installed in the gateway server, including Card Type, Card ID, and Card Name. | IP Telephony |
| VoIP QOS Parameters | Specifies the QoS parameters for VoIP, including VoIP QoS Detection (interval for checking VoIP QoS) and VoIP QoS Threshold (threshold based on which the gateway server triggers fallback to PST NETWORK, including Lost Packets, Packets Out Of Order, and Round Trip Delay). | IP Telephony |
| H.323 Zone | Identifies a human readable H.323 Zone name with which a GateKeeper is associated. | IP Telephony |

Table 2 lists object classes which are included in the NDS enterprise directory schema extensions in a preferred embodiment of the invention. Table 2 includes the name of each object class added to the schema, a brief definition of each object class, a list of the attributes listed in Table 1 which, in a preferred embodiment of the invention, may be associated with the respective object classes, and an indication as to whether the object class is added to support the use of the enterprise directory to support IP telephony or to support the advanced features.

TABLE 2

New Object Classes Included in the Enterprise Directory Schema Extension

| Object Class | Definition | Schema Extension Attributes | Supports |
|---|---|---|---|
| Gate Keeper | The GateKeeper class represents an H.323 GateKeeper entity. There may be multiple GateKeepers in a gateway network. | License WhitePages Subtree H.323 Zone GateKeeper Exchange Gateway List | IP Telephony and Advanced Features |
| Gateway | The Gateway class represents an H.323 Gateway entity. A Gateway is associated with only one GateKeeper. The Gateway object also contains the routing information for this Gateway. | License CTN Location ID CTN Numbers Table CTN Access Code Auto Attendant Prefix CTN Trunk Translation UEP Domain HopOff PST NETWORK Pattern VoIP Address Parameter VoIP Encoding VoIP QoS Parameters VoIP Hardware GateKeeper PST NETWORK Codes Fall Back Number Attendant Number Call Log Configuration Call Alert Timeout Maximum CallBacks Per User Manual Fallback Code Finder Acceptance Code Hop On Enabled Hop Off Enabled PBX Trunk Interface PBX Station Interface CTI PBX Information HopON for OffNet Call List | IP Telephony and Advanced Features |
| MCUU | The MCU class represents an H.323 MCU entity. An MCU is associated with only one GateKeeper. | License Gatekeeper | IP Telehony |
| Gate Keeper Exchange | The GateKeeper Exchange object contains a list of all GateKeepers in the NDS Tree. There can be only a single GateKeeper Exchange object in the entire NDS Tree. The Distinguished Name of this object is administrator defined when the very first GateKeeper is installed in the NDS Tree. Subsequently, the Distinguished Name of this object has to be specified when the GateKeepers are installed. | License Desktop CTI License Count Desktop CTI License List Finder License Count Finder License List Mobile License Count Mobile License List UEP Domain List | IP Telephony and Advanced Features |
| UEP Domain | Specifies the list of Gateways belonging to this domain. | GateKeeper Exchange | Advanced Features |
| User | The User object represents users of network services including the gateway network service. | GateKeeper Gateway Passcode Office Phone Cellular Phone Pager Home Phone | IP Telephony and Advanced Features |

Gatekeeper Catalog Description

The gatekeeper catalog is an important part of the gateway database 51. It supports many of the features which are unique in the integrated voice gateway system of the invention, e.g. follow me and white pages. The contents of the gatekeeper catalog tables are described in the following tables. In preferred embodiments, certain of the catalog tables, e.g. the Gateway Table (shown in Table 6 below), may be divided into a plurality of smaller tables to facilitate access to the information contained in the tables.

Custom Date Table

The Custom Date table contains a list of custom dates for a specific Follow Me rule. Table 3 describes the contents of the Custom Date table.

TABLE 3

Custom Date Table

| Attribute | Description |
|---|---|
| CustomDateID | Unique ID used to identify this record |
| FollowMeID | Link to FollowMe entry |
| Custom Date | A custom date value |

Follow Me Table

The Follow Me table contains a row for each Follow Me rule. A Follow Me rule is constructed by joining the Follow Me table with the Follow Me Filter table and the Custom Date table. Table 4 describes the contents of the Follow Me table.

TABLE 4

Follow Me Table

| Attribute | Description |
|---|---|
| FollowMeID | Unique ID used to identify this record |
| DN | User this FollowMe rule corresponds to |
| FollowMeType | DayOfWeek or Override |
| StartDate | Start date for this FollowMe rule |
| EndDate | End date for this FollowMe rule |
| StartTime | Start time for this FollowMe rule |
| EndTime | End time for this FollowMe rule |
| Monday | Yes/No field. True (Yes) indicates that this FollowMe rule applies to this day of the week |
| Tuesday | Yes/No field. True (Yes) indicates that this FollowMe rule applies to this day of the week |
| Wednesday | Yes/No field. True (Yes) indicates that this FollowMe rule applies to this day of the week |
| Thursday | Yes/No field. True (Yes) indicates that this FollowMe rule applies to this day of the week |
| Friday | Yes/No field. True (Yes) indicates that this FollowMe rule applies to this day of the week |
| Saturday | Yes/No field. True (Yes) indicates that this FollowMe rule applies to this day of the week |
| Sunday | Yes/No field. True (Yes) indicates that this FollowMe rule applies to this day of the week |
| DestinationType | Specifies the type of destination telephone number |
| DestinationTAddress | Specifies the destination telephony address to forward call to |
| DestinationDescription | User defined text |
| DestinationName | User defined text |
| FilterEnabled | Yes/No field. True (Yes) indicates that the source filter (if defined) should be used |

Follow Me Filter Table

The Follow Me Filter table specifies a source filter for a specific Follow Me record. Table 5 describes the contents of the Follow Me Filter table.

TABLE 5

Follow Me Filter Table

| Attribute | Description |
|---|---|
| FilterID | Unique ID used to identify this record |
| FollowMeID | Connects to the FollowMe table |
| IncludeItem | Indicates whether this item should be included in the source filter or not |
| TaddressType | Type of Telephony Address number string |
| Taddress | The calling Telephony Address |
| Name | User defined string |

Gateway Table

The Gateway table contains a record for each gateway server defined in the gateway network. The directory dredger searches the directory and populates this table. Table 6 describes the contents of the Gateway table.

TABLE 6

Gateway Table

| Attribute | Description |
|---|---|
| License | License data for a gateway network |
| CTN Location ID | Location ID for the gateway network in the Corporate Telephony Network numbering plan |
| CTN Numbers Table | Corporate Telephony Network numbers (or number patterns) represented by the gateway network for its PBX and its satellite PBXs |
| CTN Access Code | Trunk access code to the Corporate Telephony Network |
| Auto Attendant Prefix | Dialing string for the auto attendant preceding the extension number |
| CTN Trunk Translation | Translation table for converting from the PBX numbering format to CTN canonical format |
| UEP Domain | Gateway network Uniform Extension Plan domain. |
| HopOff PST NETWORK Patterns | PST NETWORK number patterns for hop-off to PST NETWORK for the gateway server |
| VoIP Address Parameter | Address parameter associated with the VoIP subsystem |
| VoIP Encoding | VoIP encoding parameters |
| VoIP QoS Parameters | QoS parameters for VoIP |
| VoIP Hardware | VoIP hardware installed in the gateway server |
| GateKeeper | Default GateKeeper with which the gateway should register |
| PST NETWORK Codes | PST NETWORK codes for the gateway server |
| Fall Back Number | Fallback number for the gateway server |
| Attendant Number | Telephone number for a gatewayserver for Finder activation/deactivation, Hop On from PST NETWORK, etc. |
| Call Log Configuration | Duration, in days, of the call log parameters |
| Call Alert Timeout | Time-out period for Call Alert inaction |
| Maximum CallBacks Per User | Maximum number of outstanding Callback on busy requests for each user |
| Manual Fallback Code | Code for fallback to PST NETWORK |
| Finder Acceptance Code | Acceptance code for answering a redirected call |
| Hop On Enabled | Whether Hop-On is enabled for the gatewayserver |

TABLE 6-continued

Gateway Table

| Attribute | Description |
| --- | --- |
| Hop Off Enabled | Whether Hop-Off to PST NETWORK is enabled |
| PBX Trunk Interface | Trunk line interface between the gateway server and the PBX |
| PBX Station Interface | Station line interface between the gateway server and the PBX |
| CTI | CTI link between the gateway server and the PBX |
| PBX Information | PBX configuration information |
| HopON for OffNet Call List | List of users, groups or containers authorized to access Hop-On for Off-Net calls |

Frequent Contacts Table

The Frequent Contacts table contains the frequent contacts for each of the users in the User table. Table 7 describes the contents of the Frequent Contacts table.

TABLE 7

Frequent Contacts Table

| Attribute | Description |
| --- | --- |
| FrequentContactsID | Unique ID used to identify this record |
| DestinationDN | The DN that this Frequent Contact refers to |
| FeDN | Owner of this Frequent Contact record |
| Description | User defined text describing this Frequent Contact entry |

Routing Table

The Routing table contains supported numbers by gateway server. This table along with the Gateway table is used to build a routing table. Table 8 describes the contents of the Routing table.

TABLE 8

Routing Table

| Attribute | Description |
| --- | --- |
| ID | Unique ID used to identify this record |
| DN | Associated Gateway distinguished name |
| CTNLocationID | CTN number identifying the Gateway |
| RangeType | CTN or HopOff |
| FromRange | Beginning range of the local segment of the E164 Phone Number or the extension number |
| ToRange | Ending range of the local segment of the E164 Phone Number or the extension number |
| From PST NETWORKRange | Beginning range of the Corresponding PST NETWORK address for the extension |
| ToPST NETWORKRange | Ending range of the Corresponding PST NETWORK address for the extension |
| HopOffAreaCode | When range type is 'HopOff', the area code of the E164 number |
| HopOffCountryCode | When range type is 'HopOff', the country code of the E164 number |
| Comment | User comment |

White Pages

The White Pages contains a record for each user in a specified Zone. It is also possible for this table to contain all users in the gateway network. This table can be used as an enterprise wide white pages. Table 9 describes the contents of the White Pages.

TABLE 9

White Pages

| Attribute | Description |
| --- | --- |
| ID | Unique ID used to identify this record |
| DN | User distinguished name |
| CN | User common name |
| EmployeeNumber | User's employee number |
| DepartmentName | User's department |
| FirstName | First name of user |
| MiddleName | Middle initial |
| LastName | User last name |
| OfficeExtensionNumber | User office telephone extension number |
| Office PST NETWORK Number | User office PST NETWORK telephone number |
| Office Fax Number | User office fax number |
| CellularPhoneNumber | User cellular telephone number |
| HomePhoneNumber | User home telephone number |
| Pager | User pager number |
| Title | User title |
| EmailAddress | User email address |
| PostalAddress | User postal address |
| City | User city |
| StateOrProvince | User state or province |
| PostalCode | User zip/post code |
| Country | User country |
| Location | User location |
| DepartmentID | User department |
| GatewayName | Gateway corresponding for this user |
| DefaultGatekeeper | Default Gatekeeper for this user |
| Passcode | User passcode |
| Preferences | User preferences |
| FollowMeEnabled | Yes/No field. True (Yes) implies that follow me is enabled for this user |

Private Contacts

The Private Contacts table contains records of contacts users want to track, but who are not listed in the White Pages. The formats in the fields of the Private Contacts table are identical to those of the fields in the White Pages.

Temporary Contacts

When a user wishes to view the user's frequent contacts, a temporary table is built which contains only the user's frequent contact information. This table is constructed from the White Pages and Private Contacts table. The formats of the fields of the Temporary Contacts table are identical to those of the fields in the White Pages.

Numbering Plan

The numbering plan is the equivalent of addressing for telephone numbers. In a company's voice network, there are various mechanisms for addressing a call to another party, e.g. a PST NETWORK number and an extension number. There are also various access mechanisms for the respective addressing schemes.

Current large PBXs are flexible in their numbering plans, and can support numerous types of dialing methods. In Uniform Numbering Plans (UNP), telephones at any of a number of sites may be dialed simply by dialing an extension number. Such uniform numbering plans may allow for extensions of different lengths (i.e., number of digits). In an Enterprise Telephone Number (ETN) plan, telephones at other sites in the company may be dialed using an access code, commonly an "8", followed by a location code (typically 3 digits), followed by the extension. In a PST NETWORK Numbering plan, telephones at other sites may be dialed by dialing the public telephone number (per the ITU E.164 specification). In a trunk group access numbering plan, telephones at a particular remote site may be dialed by dialing an access code for a group of trunks, followed by the extension number.

The UNP and ETN methods are commonly limited to single vendor PBX solutions. Key systems are far more limited in their numbering plan capabilities. Key systems typically support PST NETWORK dialing and perhaps Tie Trunks, but do not support UNP or ETN methods.

The gateway server facilitates a transparent installation with respect to the enterprise's existing numbering plan. The gateway network permits users to continue dialing according to the same numbering plan they use with the PBX alone. the ARS/Numbering Plan routing and digit manipulation tables are reconfigured to deliver calls to remote locations to the gateway server. Thus, the gateway server does not require that the numbering plan be changed.

In a voice gateway system, as illustrated in FIG. 1, the gateway servers can support UNP and ETN methods, and can support these methods in multi-vendor environments which include PBXs and/or hybrid/key systems over an IP network.

The gateway network classifies telephone numbers as PST NETWORK (E.164), ETN (Location+Extension) and UNP (Extension). The three plans are merged into a single numbering scheme for the enterprise by adding configurable prefixes to the PST NETWORK and ETN numbers. For a PST NETWORK number, the PST NETWORK prefix (typically "9") is appended to the PST NETWORK number. For ETN numbers, the ETN prefix (typically "8") is appended to the telephone number.

The telephone numbers may undergo pre- and postprocessing as they traverse the gateway network depending on the capabilities of the PBXs and the preferences of system administrators. For example, if a caller PBX has the capability, and the system administrator chooses to configure the PBX such that all calls are delivered to the gateway server with the telephone number in the gateway network format, the call can be compared directly against the routing tables for routing to the destination. If a PBX does not have the capability, or if the system administrator chooses not to configure the tables in the PBX, then the caller gateway server can perform incoming digit translation. The preprocessing can be set up to apply the same rules to all trunks, or can apply, e.g. PST NETWORK translation to calls on trunks 1–8, and ETN translation to calls on trunks 9–16. The preprocessed numbers can then be compared against the routing tables for routing to the destination.

At the destination, if the called PBX has the capability, and the system administrator chooses to configure the PBX to receive call with the telephone number in the gateway network format, then the gateway server delivers the calls without the need for postprocessing the telephone numbers. If the PBX does not have the capability to receive call with the telephone number in the gateway network format, or if the system administrator chooses not to so configure the PBX, then the called gateway server can perform outgoing digit translation. The called telephone number associated with each call received may be formatted to deliver an extension, and ETN number or a PST NETWORK number, with appropriate prefixes, for the particular PBX.

Hybrid/key systems with analog trunks typically have an automated attendant unit which answers calls and prompts the caller to enter an extension to reach a called telephone. This is known as a two stage dialing scheme, and is commonly used in smaller office environments. The gateway server permits the caller to directly dial a called telephone without having to deal with an automated attendant. The caller may start the call either by dialing an ETN number (8+LOCATION+Extension), a UNP number (extension) or place the call from the white pages directory via the browser interface. The called gateway may be configured to deliver the call directly to the called telephone. When the call arrives at the gateway server, the gateway server alerts the analog trunk. When the call is answered by the PBX, the gateway server plays the configured prefix string followed by the extension number. The call will then alert directly at the called telephone. The caller will hear normal ringing throughout the process until the called telephone is answered. The net effect is that the invention reduces two-stage dialing into a one-stage addressing method.

In the following descriptions of several functions of the integrated voice gateway system of the invention, reference will be had to FIGS. 4–47 and 50–58 which illustrate the configuration of the gateway networks and the components which support the functions described. In the interest of simplifying the FIGS., only those components which are necessary to describe the respective functions are depicted in the corresponding FIGS. For example, the telephone network software and hardware (FIG. 3) will be represented by the respective software drivers (e.g., analog driver 67 representing the trunk 66, analog driver 67 and analog trunk hardware 68).

In certain instances in which signals are depicted, although connections between components are not explicitly depicted, reference numerals coupled to the signals are understood to be referring to the described interface (e.g., station analog port, trunk, etc.). In the descriptions of the functions, a telephone which is coupled to a PBX in a company's gateway network will be referred to as a gateway telephone, and a telephone which is outside the company and is coupled to the PST NETWORK will be referred to as a PST NETWORK telephone. The gateway network and its components at the calling party's end will generally be referred to as the "caller" components, e.g. "caller gateway server". The gateway network and its components at the called party's end will generally be referred to as the "called" components, e.g. "called gateway server".

In the description of the operation of an integrated voice gateway system of the invention in FIGS. 4–47 and 50–58, in general components comprising the gateway network at the caller end of a telephone call are identified by their respective reference numerals shown in FIGS. 2–3 (e.g. caller gateway server 26) and components comprising the gateway network at the called end of a telephone call will have as their reference numerals 100 plus the respective reference numeral of the corresponding component of gateway network at the caller end (e.g. called gateway server 126). Additional components outside both the caller gateway network and the called gateway network will have as their reference numerals 200, 300, 400, etc., plus the respective reference numeral of the corresponding component of gateway network at the caller end (e.g. PST NETWORK telephone 238).

In FIGS. 4–47 and 50–58, unless otherwise specified in a particular method or scenario, the interface between the PBX and the gateway server may be illustrated as an analog trunk interface and the telephone drivers in the gateway servers may be illustrated as analog drivers. However, as illustrated in FIG. 3 and described in reference to FIG. 3 and elsewhere herein, the interface between the PBX and the gateway server may include analog trunk, DC-1 (T1/E1, PRI, QSIG) and/or analog station lines, with each interface supported by a corresponding telephone driver. Therefore, the illustration of the interface between the PBX and the gateway server as an analog trunk and the telephone drivers in the gateway as analog drivers is by way of illustration, and in no way limits the respective described operations to the particular interface illustrated in the examples.

In FIGS. depicting methods or scenarios in which a call hops-on to or hops-off from a gateway network, a third telephone company central office will be identified as CO3 13.

Figure 4:
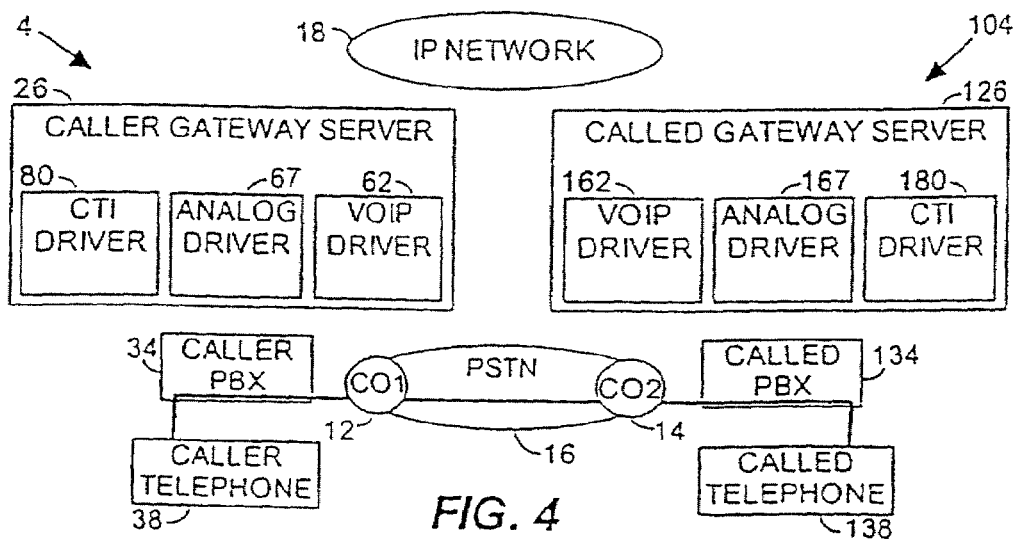
FIG. 4 illustrates the operation of an embodiment of an integrated voice gateway system of the invention in setting up a basic PST NETWORK call.
Figure 58:
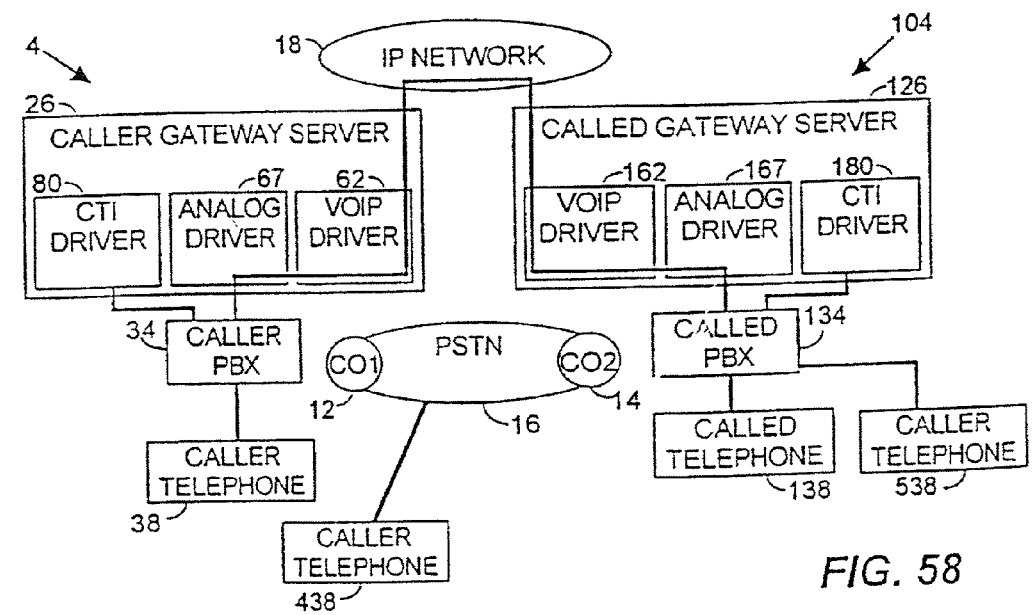

In the description of the operation of an embodiment of an integrated voice gateway system of the invention with respect to FIGS. 4-58, telephone calls are generally described as being initiated by a caller lifting a handset and dialing a telephone number. Likewise, the connection is generally described as being made when a called party lifts the handset and answers the call. The integrated computer telephone system of the invention provides the user with an integrated, comprehensive, and easy to use PC Call Control capability via a web browser interface. The PC Call Control capability is described below. It is understood that all of the methods and scenarios of operation illustrated by the FIGS., and described herein, may be controlled by the user from the telephone via DTMF buttons or from the desktop workstation via the web browser interface. The PC Call Control features of the integrated voice gateway system of the invention are described below.

Basic PST NETWORK Call

In a preferred embodiment, the integrated computer telephone system of the invention provides the capability to place a telephone call from a caller gateway telephone to a called gateway telephone via the PST NETWORK. Referring to FIG. 4, a caller (not illustrated) initiates a call by picking up the handset on the caller telephone 38 and dialing an ARS code, e.g. 9, plus a PST NETWORK telephone number or other digit string. The caller PBX 34 reviews the dialed number against the information in the ARS tables to select a trunk group. It may then modify the digit string, deleting and inserting digits for proper addressing. The caller PBX 34 delivers the call to CO1 12. CO1 12 routes the telephone call through the PST NETWORK 16 to CO2 14. CO2 14 delivers the call to the called PBX 134 via an available trunk and may transmit a subset of the called telephone number. The called telephone 138 rings and is answered by the called party (not illustrated).

Basic VoIP Call

In a preferred embodiment, the gateway network provides the capability to place a telephone call from a caller gateway telephone to a called gateway telephone via an IP network. This is referred to herein as a VoIP call. It is also referred to as "Inter-PBX Toll Bypass," because, as the term indicates, a long distance toll between remote PBXs is avoided by using the IP network.

Figure 5:
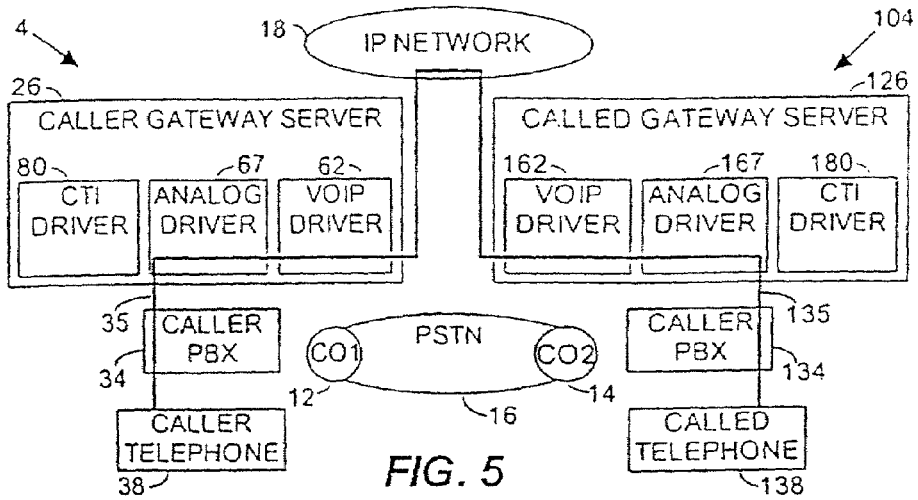
FIG. 5 illustrates the operation of an embodiment of an integrated voice gateway system of the invention in setting up a basic VoIP call.

Referring to FIG. 5, a caller (not illustrated) initiates a call by picking up the handset on the caller telephone 38 and dialing an ARS code, e.g. "9" for an off-net call or "8" for an on-net call, plus a PST NETWORK telephone number or other digit string. The caller PBX 34 reviews the digital number against the information in the ARS tables and selects a trunk group 35 coupled to the caller gateway server 26. The caller PBX 34 may modify the dialed digit string, deleting and inserting digits for proper addressing on a trunk in that group. The caller gateway analog driver 67 receives the call. The caller gateway server 26 performs internal operations to determine the IP address of the called gateway server 126. Referring again to FIG. 3, within the caller gateway server 26, the gateway engine 50 requests the gatekeeper agent 52 to get an address. The gatekeeper agent 52 places an H.323 compliant request to the gateway gatekeeper 53. The gateway gatekeeper 53 references tables in the gateway database 51 to determine the called gateway server 126 and its address. The caller gateway VoIP driver 62 transmits packets addressed to the IP address of the called gateway server 126 via the IP network 18. The caller gateway server 26 and called gateway server 126 communicate via the IP network 18 to initiate a duplex H.323 call. The called gateway server 126 then selects a telephone trunk 135 to deliver the call to the called PBX 134. The called gateway server 126 initiates the call, including the called telephone number, to the called PBX 134. The called PBX 134 interprets the received telephone number to select a called telephone 138 to ring. The called telephone 138 rings and when answered by the called party (not illustrated) the connection is made. The connection event may propagate through the system.

Hop-off to PST NETWORK Call

In a preferred embodiment, the gateway network provides the capability to place a telephone call to an outside-of-the-company PST NETWORK destination via the IP network. A user in the company can call a long distance PST NETWORK destination by dialing the telephone number as usual. The caller gateway network will set up the call to be carried via the IP network to a called gateway server within the company which is closest to the destination telephone, and make a PST NETWORK connection to "hop-off" to the PST NETWORK destination.

The system administrator for each gateway network determines which local hop-off destinations the gateway network will support and configures the gateway server accordingly. The system administrator also configures the gateway server to identify those gateway servers from which the local gateway server will accept hop-off calls. The gateway servers can be configured to support hop-off to local PST NETWORK calls and hop-off to long distance PST NETWORK calls. The ARS table of the PBX in the originating gateway network is configured accordingly for the hop-off calls to be routed to the gateway server.

In preferred embodiments of the invention, there are several different methods in which hop-off to PST NETWORK may be implemented. The different methods take into consideration variations in the configurations of gateway networks at different installations, e.g. PBX configuration and capability, CTI capabilities, additional hardware availability and voice channel capacity.

Table 10 identifies differences in the configuration for three hop-off to PST NETWORK methods in preferred embodiments of the invention.

TABLE 10

Hop-off to PST NETWORK Methods

| Method | Transparent | CTI support | T1 trunk channels per hop-off call (at destination) | Analog station ports per hop-off call (at destination) | PBX support |
|---|---|---|---|---|---|
| A | Transparent | No | 0 | 1 | None |
| B | Transparent | No | 1 | 1 (only during setup) | Trunk to trunk transfer |
| C | Transparent | No | 1 | 0 | Trunk to trunk call |

Hop-off to PST NETWORK will be described with respect to FIGS. 6–14. FIGS. 6–14 depict certain components of a caller gateway network 4 and a called gateway network 104 which support the respective hop-off to PST NETWORK methods. Connections between the components are not shown in order to simplify the FIGS. The set up of the hop-off and the resulting PST NETWORK call are depicted by a heavy solid line. An arrow head on a solid line indicates the direction of data flow or call flow, as appropriate. A solid line without an arrow head indicates the data or call flows in both directions.

Hop-off to PST NETWORK method "A", listed in Table 10, implements a transparent hop-off to PST NETWORK. One analog station port is used at the destination end of the call during hop-off to PST NETWORK and for the remainder of the call. No T1 trunk channels are required for the hop-off. Method "A" does not use CTI support.

Figure 6:
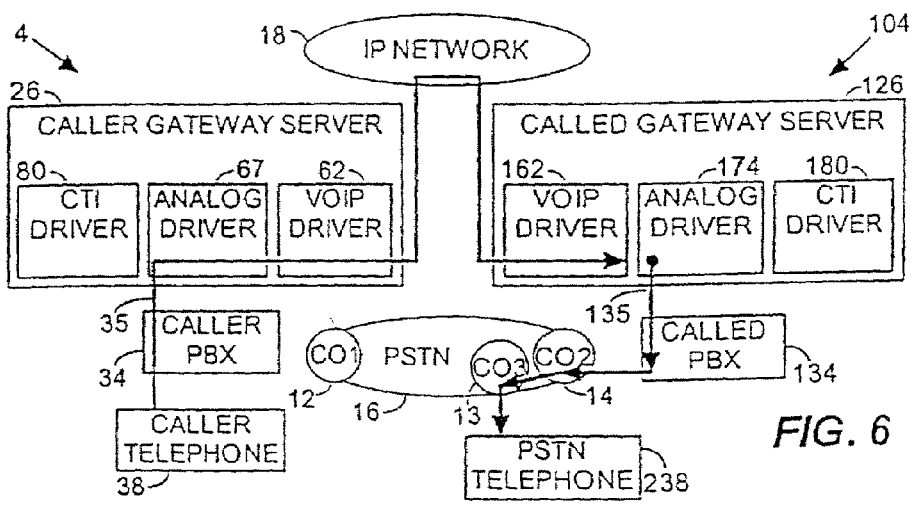
FIGS. 6–7 illustrate the operation of an embodiment of an integrated voice gateway system of the invention in a first method for setting up a hop-off to PST NETWORK call.
Figure 7:
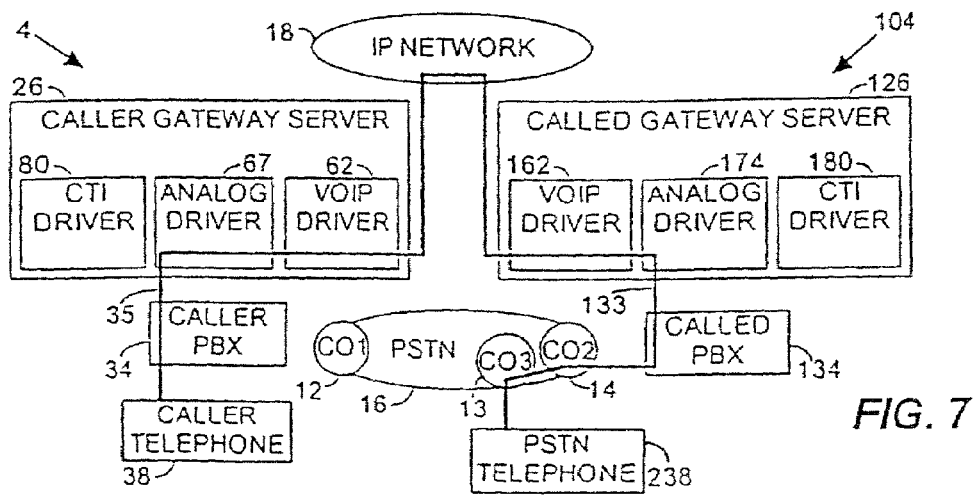

Hop-off to PST method "A" will be described with reference to FIGS. 6–7. All steps described below are at the called gateway network 104. Referring to FIG. 6, upon receiving a VoIP call from the caller gateway server 26, the analog station driver 174 in the called gateway server 126 places a call from an analog station 175 (75 in FIG. 3) to the hop-off destination called PST NETWORK telephone 238. Referring to FIG. 7, the called gateway server 126 then connects the TDM bus 84 (FIG. 3) time slot of the new PST NETWORK call with that of the incoming VoIP call, completing the hop-off to PST NETWORK call.

Hop-off to PST NETWORK method "B", listed in Table 10, implements a transparent hop-off to PST NETWORK. One analog station port is used at the destination end of the call only during setup of the hop-off to PST NETWORK. One T1 trunk channel is used during setup of the hop-off and for the remainder of the call. The PBX includes trunk-to-trunk transfer capability. Method "B" does not use CTI support.

Figure 8:
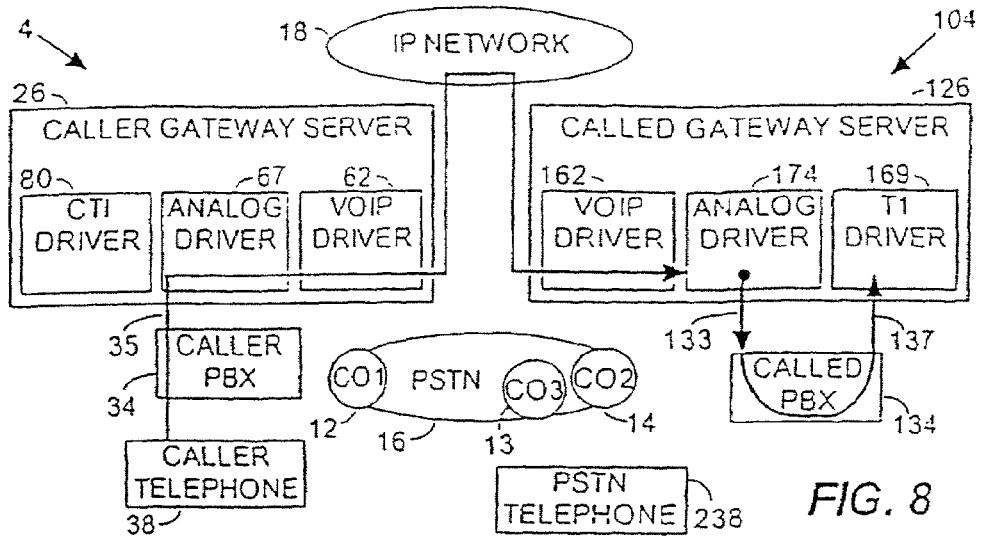
FIGS. 8–12 illustrate the operation of an embodiment of an integrated voice gateway system of the invention in a second method for setting up a hop-off to PST NETWORK call.
Figure 9:
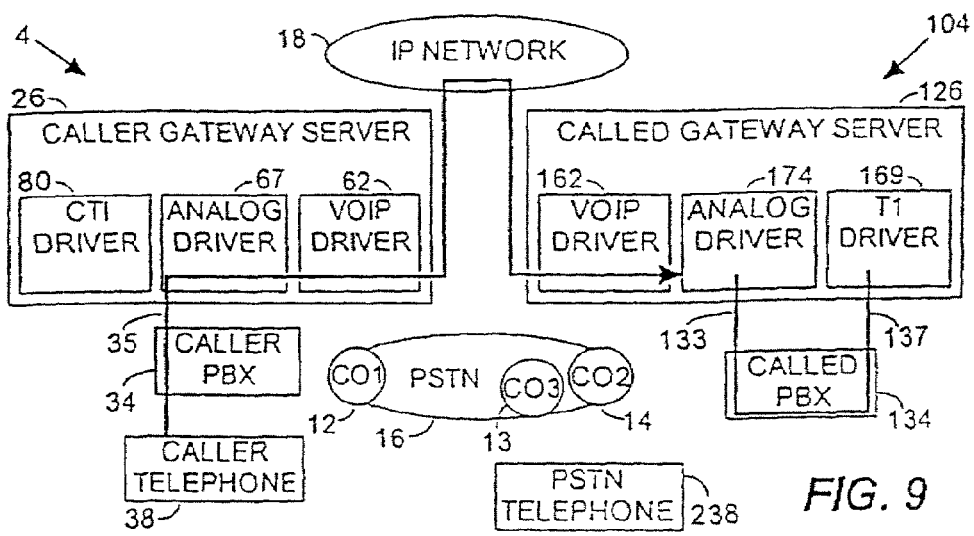
Figure 10:
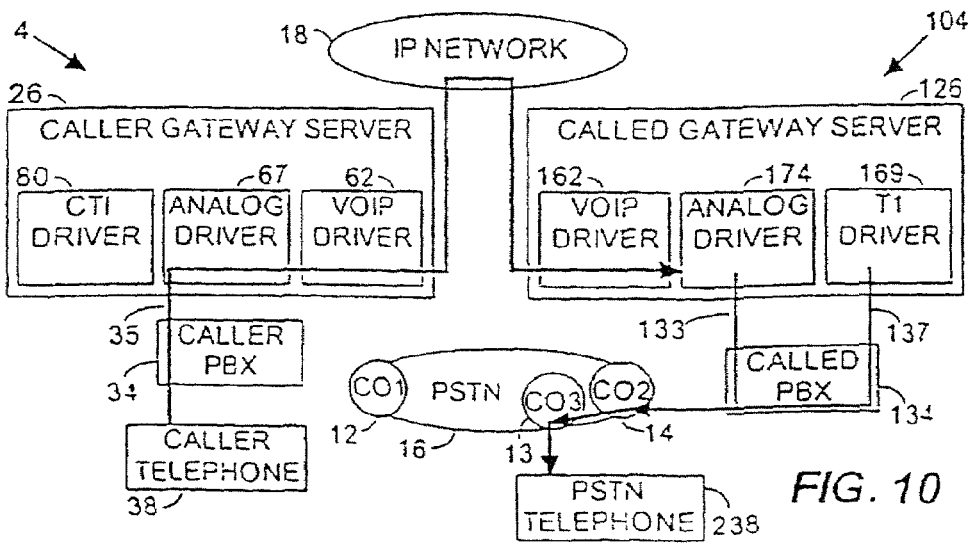
Figure 11:
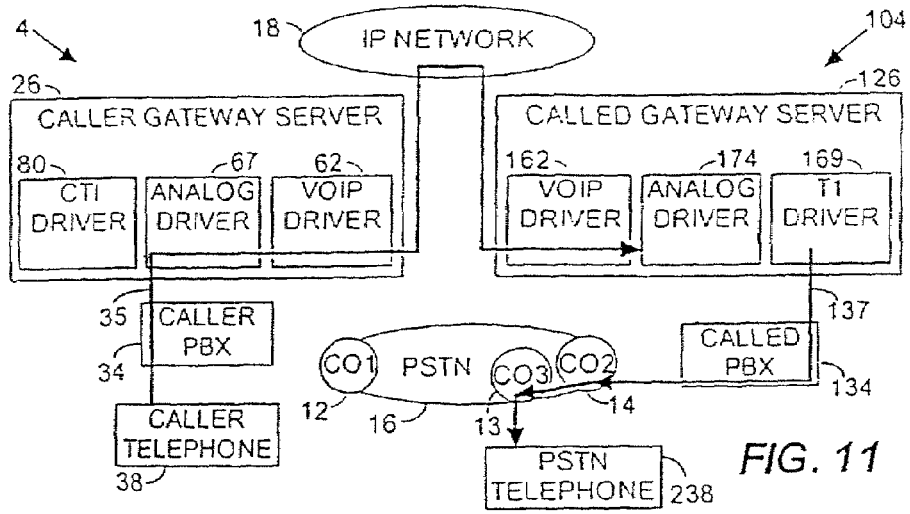
Figure 12:
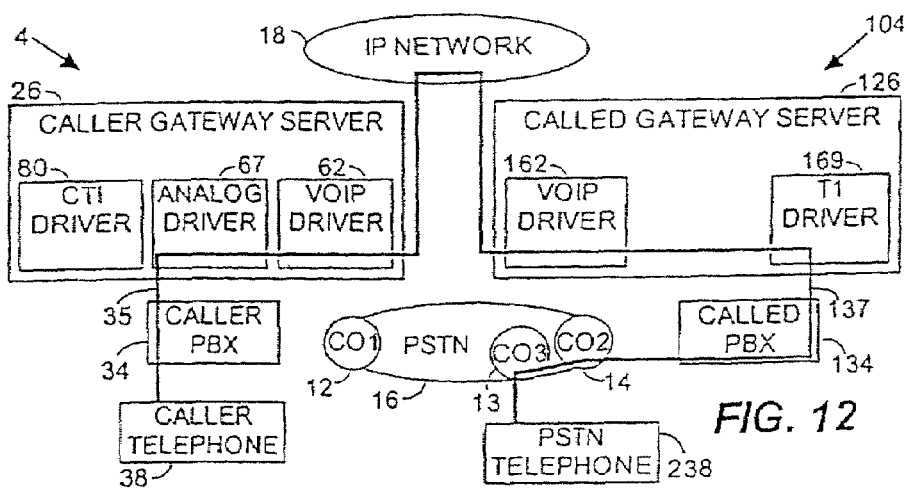

Hop-off to PST NETWORK method "B" will be described with reference to FIGS. 8–12. Referring to FIG. 8, upon receiving a call from the caller gateway server 26, the called gateway server 126 makes a call from an analog station 174 in the called gateway server 126 to a T1 trunk 137 in the called gateway network 104 by dialing a specified "hop-off to gateway trunk" telephone number. Referring to FIG. 9, the called gateway server 126 answers the call at the gateway trunk 137 and recognizes the call as a hop-off to PST NETWORK call. Referring to FIG. 10, the called gateway server 126 makes a hook-flash transfer to the hop-off destination telephone 238 number. Referring to FIG. 11, the called gateway server 126 hangs up the analog station 133. Referring to FIG. 12, the called gateway server 126 connects the TDM bus 84 (FIG. 3) time slot of the new hop-off call with the time slot of the incoming VoIP call.

Hop-off to PST NETWORK method "C", listed in Table 10, implements a transparent hop-off to PST NETWORK. One T1 trunk channel is used during setup of the hop-off and for the remainder of the call. No analog ports are used. The PBX includes trunk to trunk call, i.e. tie trunk to CO trunk, capability. Method "C" does not use CTI support.

Figure 13:
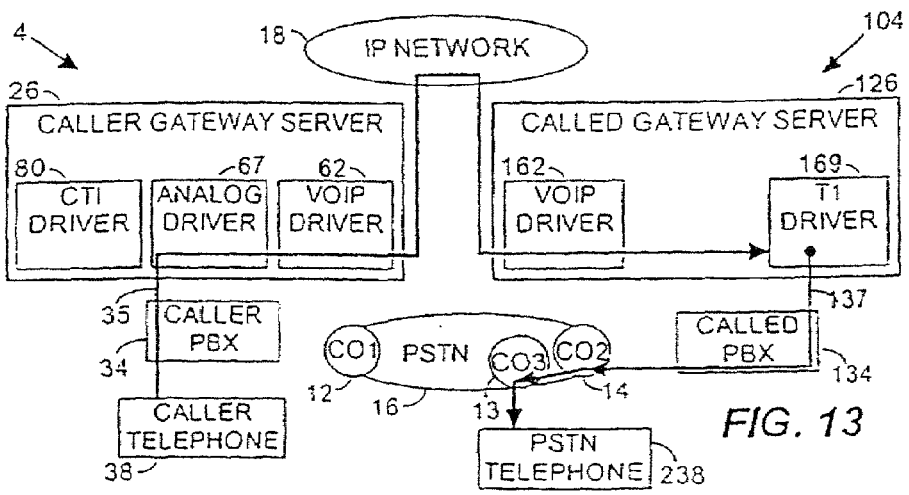
FIGS. 13–14 illustrate the operation of an embodiment of an integrated voice gateway system of the invention in a third method for setting up a hop-off to PST NETWORK call.
Figure 14:
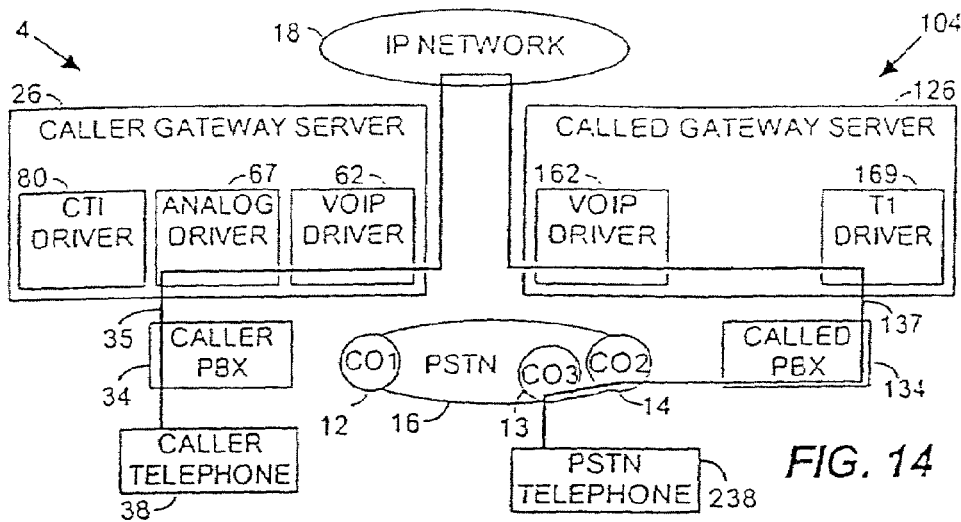

Hop-off to PST NETWORK method "C" will be described with reference to FIGS. 13–14. Referring to FIG. 13, upon receiving a call from the caller gateway server 26, the called gateway server 126 makes a call from a T1-tie-trunk channel to the called, i.e. hop-off, PST NETWORK number. Referring to FIG. 14, the called gateway server 126 connects the TDM bus 84 time slot of the new hop-off call with the time slot of the incoming VoIP call.

Hop-on to VoIP Call

In a preferred embodiment, the gateway network provides the capability to place a telephone call from a PST NETWORK telephone to a telephone on a distant gateway network via a VoIP call. This capability can be combined with the hop-off to PST NETWORK capability, described above, to enable a user to place a long distance call from a caller PST NETWORK telephone to a called PST NETWORK telephone by placing a local call to a local gateway network. The telephone call is then carried via a VoIP call between two gateway networks. Moreover, the destination gateway network for the VoIP call may be a remote gateway network or the local gateway which receives the call from the PST NETWORK telephone.

It will be seen below that in scenarios in which the called gateway is local to the caller telephone (scenarios C and D, below), the connection to the called telephone will not actually be a VoIP call. However, in such scenarios, the invention provides an access mechanism to the company's telephone system whereby a user must be identified and pass through a passcode security scheme. Calls placed by the user are identified by that user's caller ID (for all calls, local and remote). This feature allows companies to choose to employ hop-on whereby a toll free access number may be given to employees so that they may call into the company, and hop-off, and the billing for the call will be linked to the company's PBX rather than the user's calling card.

Table 11 identifies scenarios of hop-on to VoIP calls in preferred embodiments of the invention.

TABLE 11

Hop-on to VoIP Scenarios

| Scenario | Called Telephone | Called Gateway |
|---|---|---|
| A | Gateway | Remote |
| B | PST NETWORK (hop-off) | Remote |
| C | Gateway | Local |
| D | PST NETWORK (hop-off) | Local |

FIGS. 15–18 depict certain components of a caller gateway network 4 and a called gateway network 104 which support the respective scenarios of hop-on to VoIP. Connections between the components are not shown in order to simplify the FIGS. All four hop-on to VoIP scenarios are initiated with a common set of steps. The steps common to all four hop-on to VoIP scenarios will be described with respect to FIG. 15.

Figure 15:
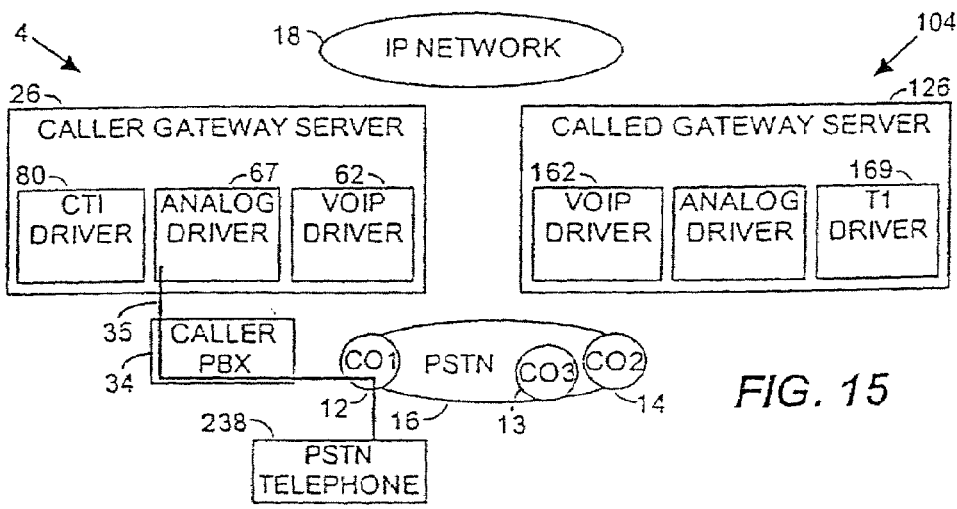
FIG. 15 illustrates the operation of an embodiment of an integrated voice gateway system of the invention in a common method for setting up a hop-on to VoIP call.
Figure 16:
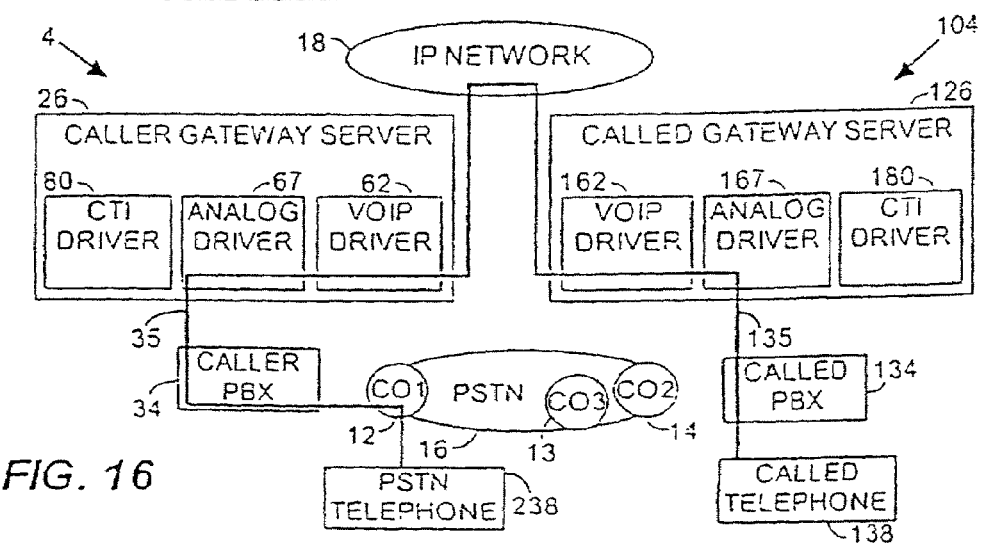
FIG. 16 illustrates the operation of an embodiment of an integrated voice gateway system of the invention in a first scenario for setting up a hop-on to VoIP call.
Figure 17:
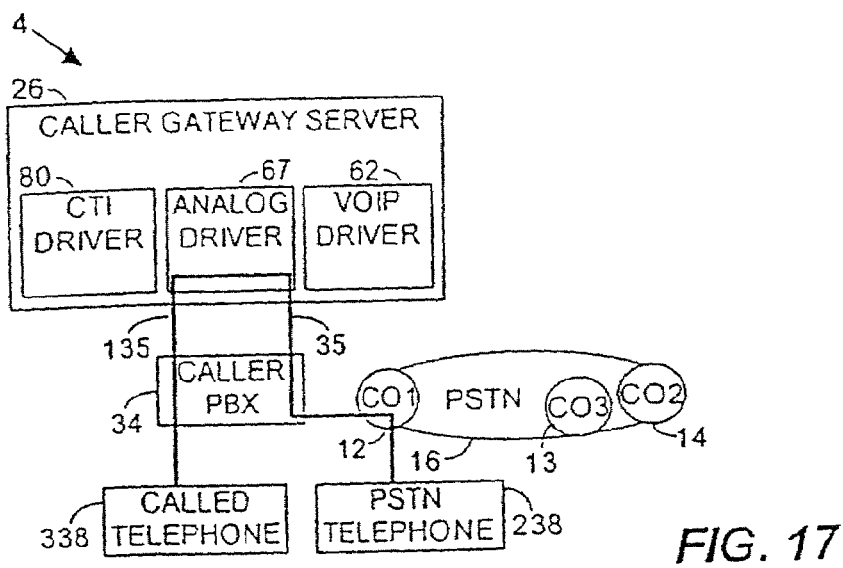
FIG. 17 illustrates the operation of an embodiment of an integrated voice gateway system of the invention in a third scenario for setting up a hop-on to VoIP call.
Figure 18:
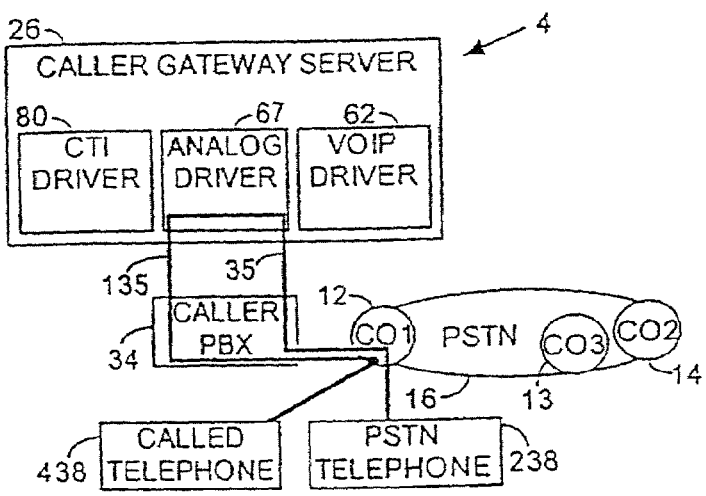
FIG. 18 illustrates the operation of an embodiment of an integrated voice gateway system of the invention in a fourth scenario for setting up a hop-on to VoIP call.

Referring to FIG. 15, a caller (not illustrated) at a PST NETWORK telephone 238 lifts the handset and dials a "Remote Access" telephone number for the local caller gateway network 4. The call is received at CO1 12 which alerts the caller PBX 34 with the call. The caller PBX 34 routes the call to the caller gateway server 26. The caller gateway server 26 answers the call and interacts with the caller via interactive voice response (IVR). Using dual tone multi-frequency (DTMF) touch tones, the caller responds to voice prompts which may include the caller's ID, password, etc. The caller gateway server 26 then authenticates the caller against information in the gateway database image of the NDS directory information. If the caller gateway server 26 is able to authenticate the caller, the caller gateway server 26 then provides the caller with a dial tone. The caller then dials the telephone number of the desired called telephone. Based on the dialed telephone number, the caller gateway server selects a destination.

In hop-on to VoIP scenario "A", the called telephone is a gateway telephone in a remote gateway network. Scenario "A" will be described with reference to FIG. 16. The remaining steps are the same as the corresponding steps for a basic VoIP call described above. The caller gateway server 26 selects the called gateway server 126. The caller gateway VoIP driver 62 transmits packets addressed to the IP address of the called gateway network 126 via the IP network 18. The caller gateway server 26 and called gateway server 126 communicate via the IP network 18 to establish a duplex H.323 call. The called gateway server 126 then selects a telephone trunk 135 to deliver the call to the called PBX 134. The called gateway server 126 transmits the called telephone number to the called PBX 134. The called PBX 134 interprets the received telephone number to select a called telephone 138 to ring. The called telephone 138 rings and is answered by the called party (not illustrated).

In hop-on to VoIP scenario "B", the called telephone is a PST NETWORK telephone located near a remote gateway network. As indicated above for the steps common to all three hop-on to VoIP scenarios, the caller gateway server 26 searches the caller gateway routing table to select a destination gateway network, and selects the called gateway network 126. The remainder of the call setup may employ any one of the three hop-off to PST NETWORK scenarios described above.

In hop-on to VoIP scenario "C", the called telephone is a gateway telephone coupled to the caller gateway network 4. Scenario "C" will be described with reference to FIG. 17. The caller gateway server 26 (which is also the called gateway server) selects a telephone trunk 135 to deliver the call to the caller PBX 34 and transmits the called telephone number to the caller PBX 34. The caller gateway server 26 couples the inbound caller's trunk 35 with the trunk 135 for the called telephone 338. The caller PBX 34 interprets the telephone number to select a telephone to ring. The called telephone 338 rings and is answered by the called user (not illustrated).

In hop-on to VoIP scenario "D", the called telephone is a PST NETWORK telephone located near the caller gateway network 4. Scenario "D" will be described with respect to FIG. 18. The caller gateway server 26 (which is also the called gateway server) selects a telephone trunk 135 to deliver the call to the caller PBX 34 and transmits the called telephone number to the caller PBX 34. The caller gateway server 26 couples the inbound caller's trunk 35 with the trunk 135 for the called telephone 438. The caller PBX 34 interprets the telephone number and determines that the call is for a local PST NETWORK telephone. The caller PBX 34 selects an external trunk coupled to CO1 12 and dials the destination telephone number. CO1 12 routes the call to the called telephone 438. The called telephone 438 rings and is answered by the called user (not illustrated).

Fallback to PST NETWORK

In a preferred embodiment, the gateway server constantly monitors the quality of service (QoS) during VoIP network calls using the standard realtime transport control protocol (RTCP). The QoS may be specified in terms of end-to-end delay, IP packet loss and jitter. If the QoS falls below a predetermined level set by a system administrator, the gateway server sets up an alternate connection over the PST NETWORK and switches the call to the PST NETWORK connection.

The caller can also initiate a fallback to PST NETWORK if the caller decides that the quality of the voice transmission has deteriorated to an unacceptable level. The caller can initiate a fallback to PST NETWORK by entering a specified DTMF key sequence on the telephone, e.g. a combination of the "star" (*) and "pound sign" (#) keys. A system administrator can configure a gateway server to allow or disallow caller-initiated fallback to PST NETWORK.

In preferred embodiments of the invention, there are several different methods in which fallback to PST NETWORK may be implemented. The different methods take into consideration variations in the configurations of gateway networks at different installations, e.g. PBX configuration and capability, CTI capabilities, additional hardware availability and voice channel capacity. In addition, some of the methods allow fallback to PST NETWORK to be transparent to the user, while other methods do not provide transparent fallback to PST NETWORK. In the case of transparent fallback to PST NETWORK, the users will simply perceive that the quality of voice suddenly improves. In the case of non-transparent fallback to PST NETWORK, the conversation will be interrupted by the gateway server while the fallback to PST NETWORK takes place.

Table 12 identifies differences in the configuration for methods of fallback to PST NETWORK in preferred embodiments of the invention.

TABLE 12

Fallback to PST NETWORK Methods

| Method | Transparent | CTI support | T1 Trunk channels per fallback call (at each end of call) | Analog station ports per fallback call (at each end of call) | PBX support |
| --- | --- | --- | --- | --- | --- |
| A | Transparent | No | 1 | 1 | Hunt group for gateway network analog lines |
| B | Transparent | No | 2 | 1 (only during setup) | PST NETWORK trunk to tie trunk transfer; Hunt group for gateway network analog lines |
| C | Transparent | No | 2 | 0 | Trunk to trunk call |
| D | Non-Transparent | Yes | 0 | 0 | None (except CTI support) |
| E | Non-Transparent | Yes | 0 | 1 (only during setup) | Hunt group for gateway network analog lines (in addition to CTI) |

Fallback to PST NETWORK will be described with respect to FIGS. 19–43. FIGS. 19–43 depict certain components of a caller gateway network 4 and a called gateway network 104 which support the respective methods of fallback to PST NETWORK. Connections between the components are not shown in order to simplify the FIGS. An ongoing VoIP telephone call is represented by a heavy dashed line. The set up of the fallback and the resulting PST NETWORK call are depicted by a heavy solid line. Arrow heads at one end of a dashed line or solid line indicate the direction of data flow or call flow. A dashed line or solid line without an arrow head indicates the call or data flows in both directions.

Fallback to PST NETWORK method "A", listed in Table 12, implements a transparent fallback to PST NETWORK. One T1 channel and one analog station port are used at each end of the call during fallback to PST NETWORK and for the remainder of the call. The PBX includes a hunt group for the gateway network analog stations. Method "A" does not use CTI support.

Figure 19:
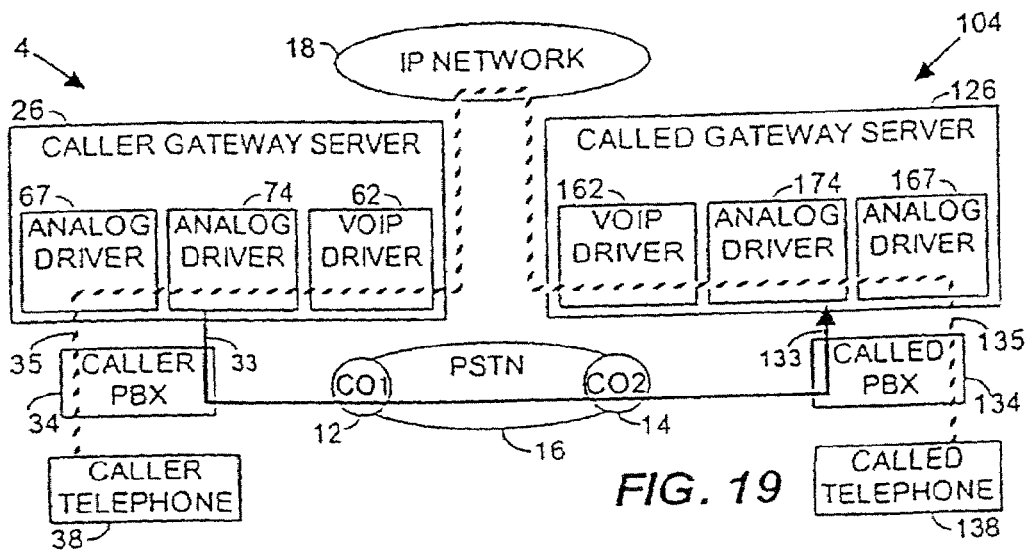
FIGS. 19–22 illustrate the operation of an embodiment of an integrated voice gateway system of the invention in a first method for setting up a fallback to PST NETWORK call.
Figure 20:
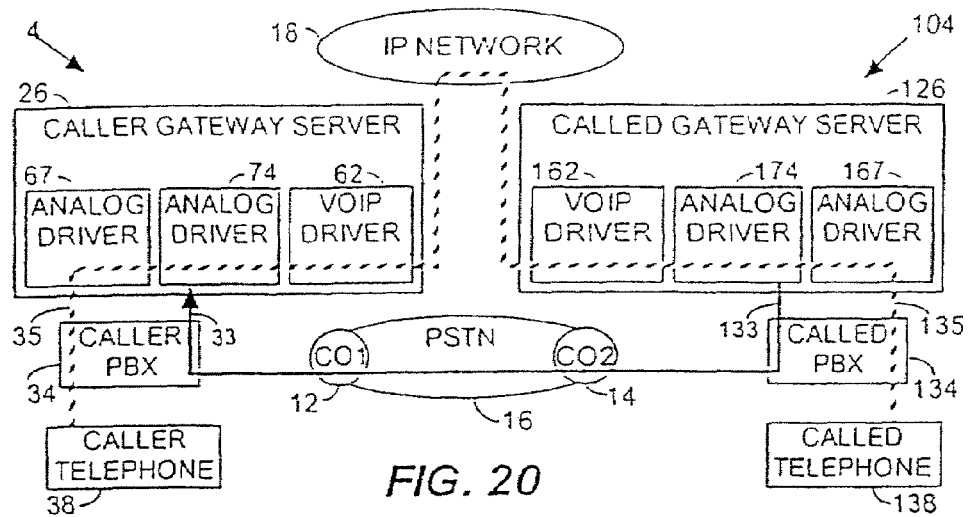
Figure 21:
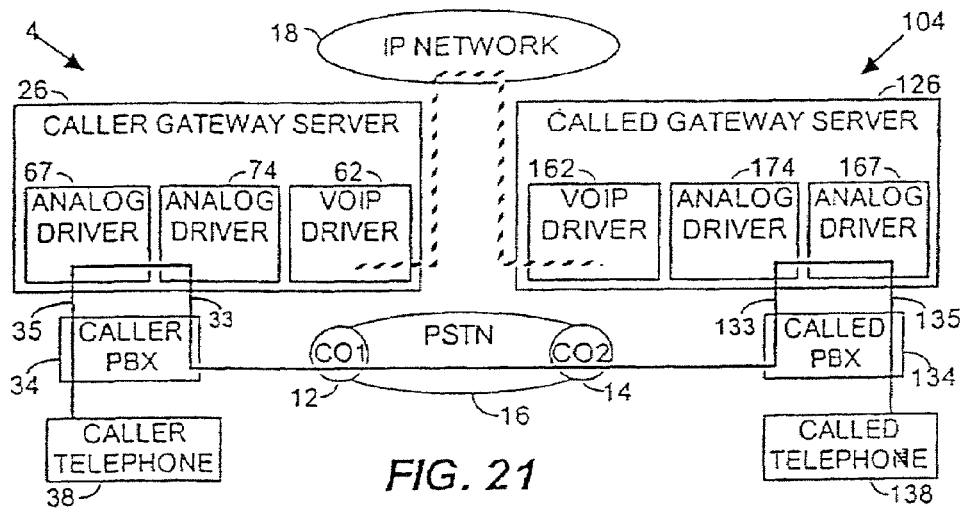
Figure 22:
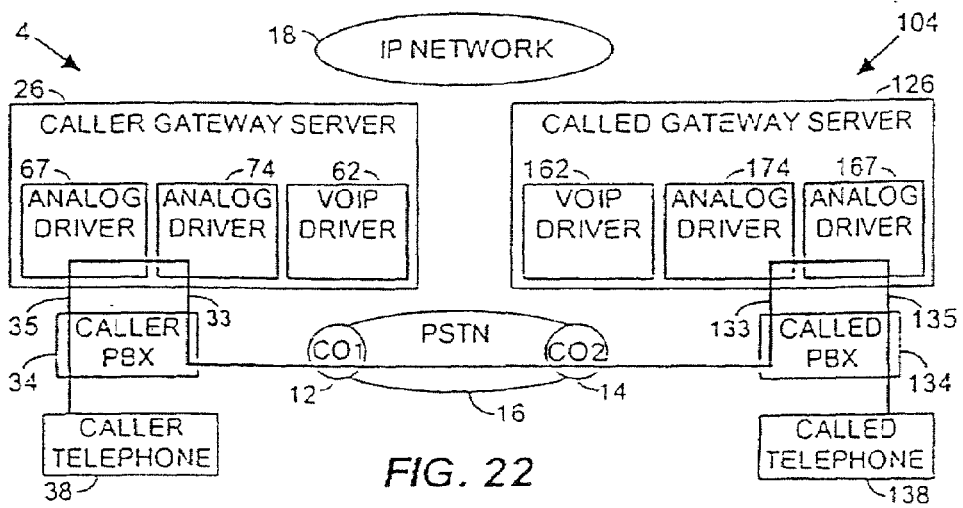

Fallback to PST NETWORK method "A" will be described with reference to FIGS. 19 to 22. Referring to FIG. 19, an ongoing VoIP call is routed between a caller telephone 38 and a called telephone 138 through the caller PBX 34 and called PBX 134, the caller gateway server 26 and the called gateway server 126, through the IP network 18. In fallback to PST NETWORK method "A", when the caller gateway server 26 determines that the QoS has fallen below the level specified by the system administrator, the caller gateway server 26 initiates a call from an analog station in the caller gateway server 26 to the hunt group of analog stations in the called gateway server 126. The call initiation, and subsequent signaling, is routed from the caller station analog driver 74 through the caller PBX 34, the PST NETWORK 16 (including the respective CO's 12,14), and the called PBX 134 to the called station analog driver 174 in the called gateway server 126. Referring to FIG. 20, the called gateway server 126 sends a "fallback ready" DTMF tone back to the caller gateway server 26. The DTMF tone is routed from the called gateway server 126 through the called PBX 134, the PST NETWORK 16 and the caller PBX 34 to the called gateway server 26. Referring again to FIG. 19, when the caller gateway server 26 receives the fallback ready DTMF tone, the caller gateway server 26 sends the original called telephone number to the called gateway server 126, and then waits for a short period, e.g. 200 milliseconds (msec), to allow the called gateway server 126 to receive the telephone number. Referring to FIG. 21, the caller gateway server 26 and the called gateway server 126 then connect the respective TDM bus 84 (FIG. 3) time-slots of the new PST NETWORK call with that of the respective T1 channels of the original VoIP call, thereby establishing the telephone call via the PST NETWORK 16. Referring to FIG. 22, the caller gateway server 26 and called gateway server 126 then disconnect the original VoIP call. Fallback to PST NETWORK method "B", listed in Table 12, implements a transparent fallback to PST NETWORK. Two T1 channels are used at each end of the call during fallback to PST NETWORK and for the remainder of the call. One analog station port is used at each end only during fallback to PST NETWORK. The PBX includes trunk to trunk transfer capability, including both CO trunk to tie trunk and CO trunk to CO trunk. Method "B" does not use CTI support.

Figure 23:
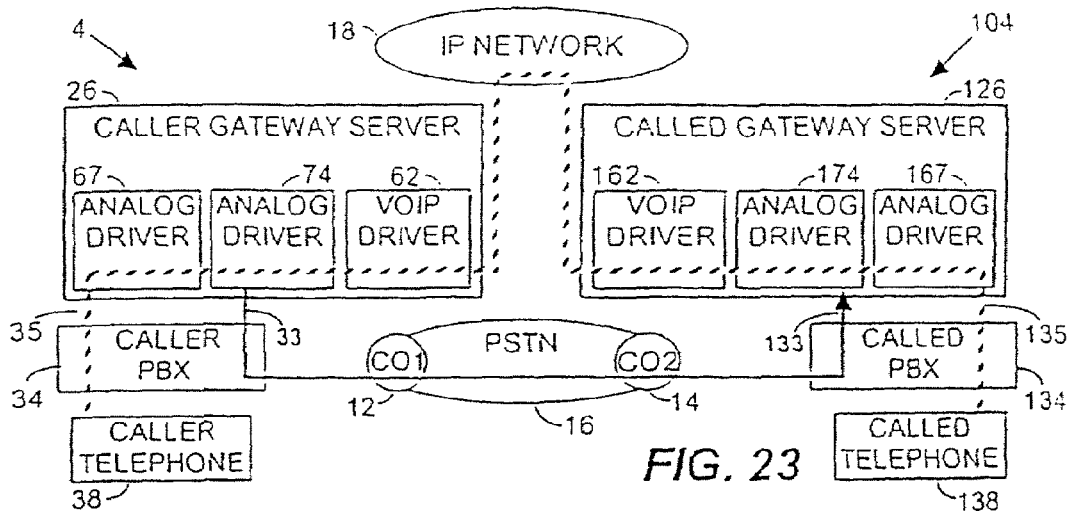
FIGS. 23–29 illustrate the operation of an embodiment of an integrated voice gateway system of the invention in a second method for setting up a fallback to PST NETWORK call.
Figure 24:
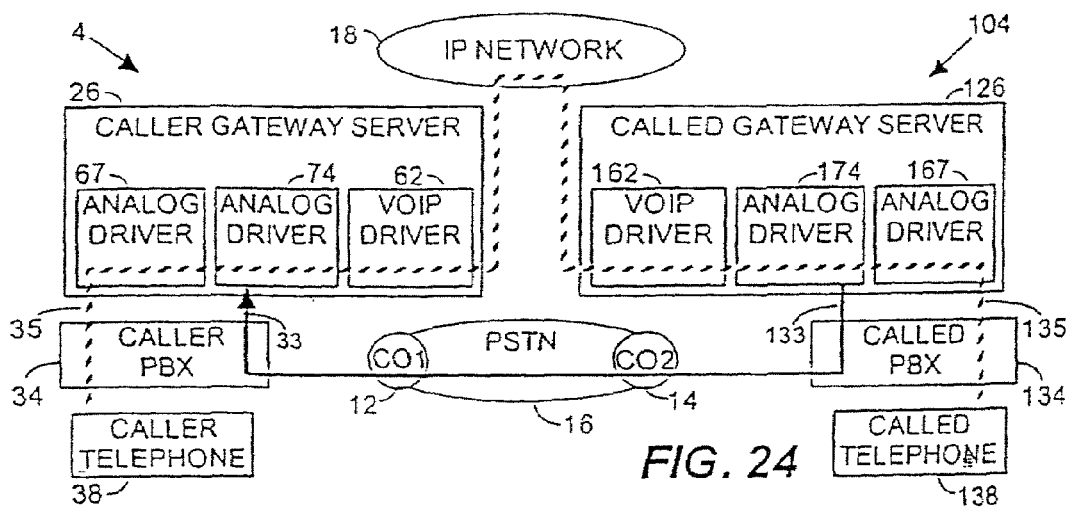
Figure 25:
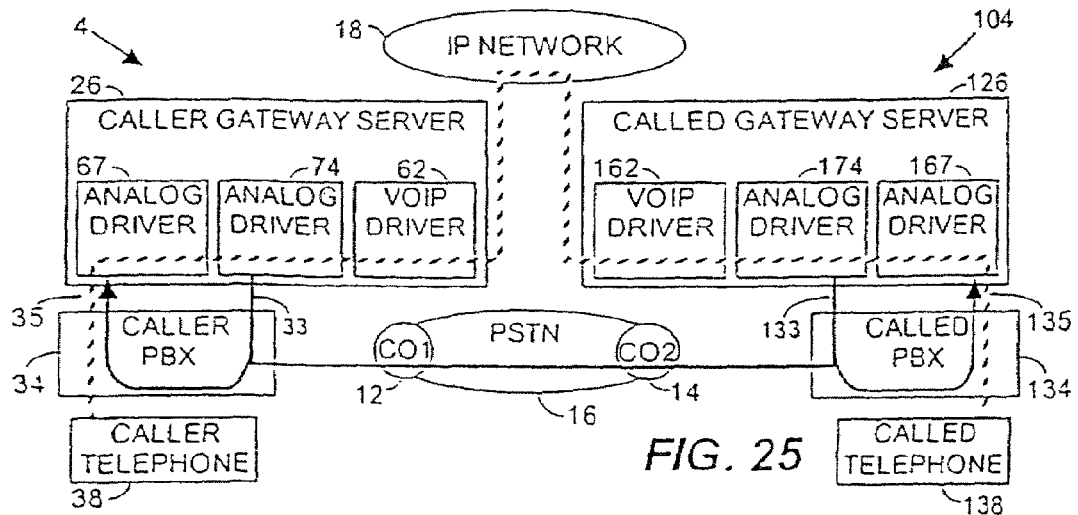
Figure 26:
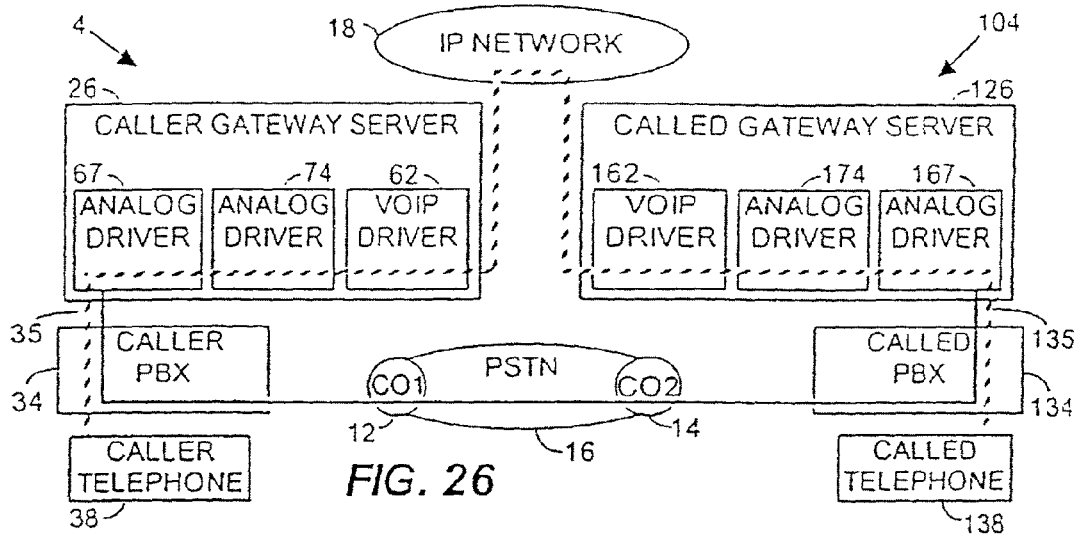
Figure 27:
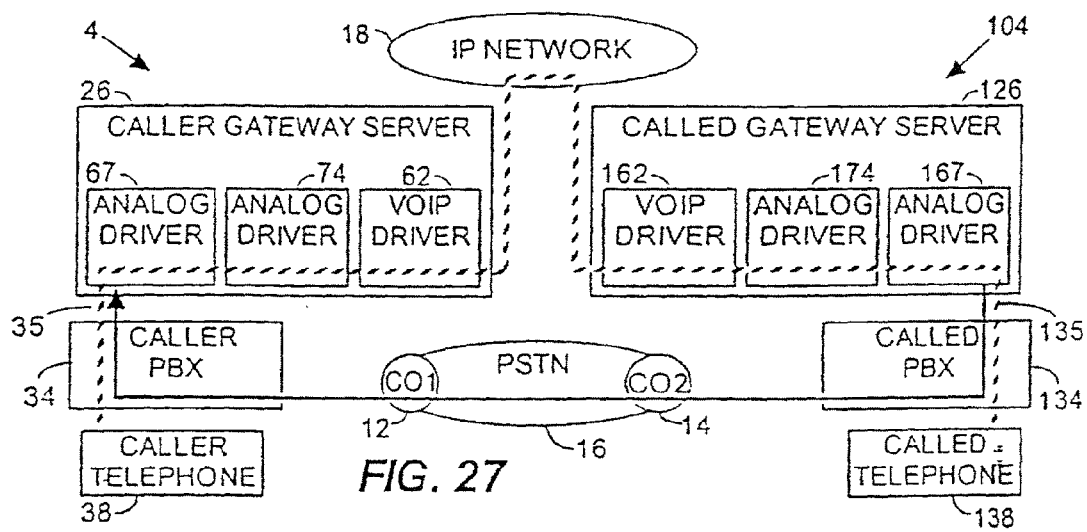
Figure 28:
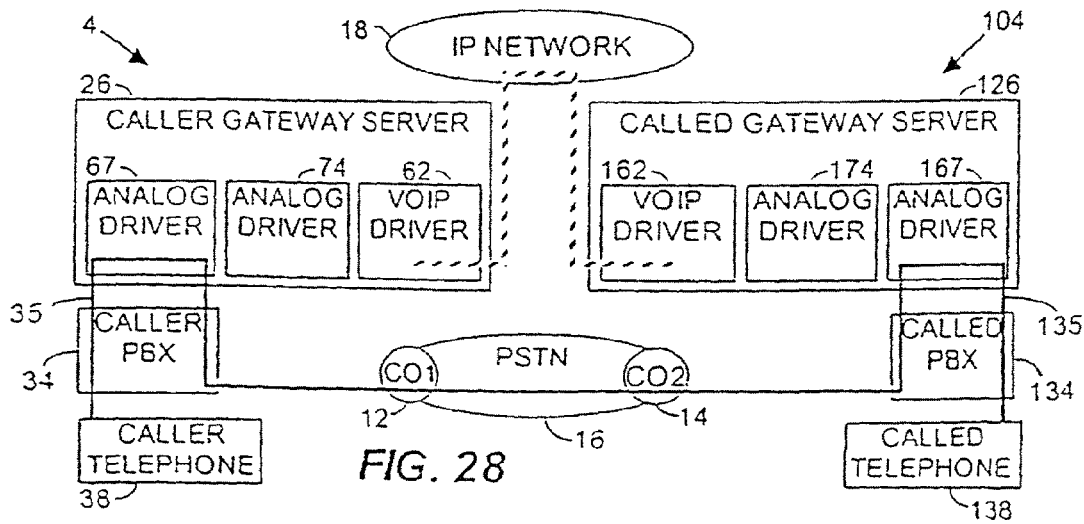
Figure 29:
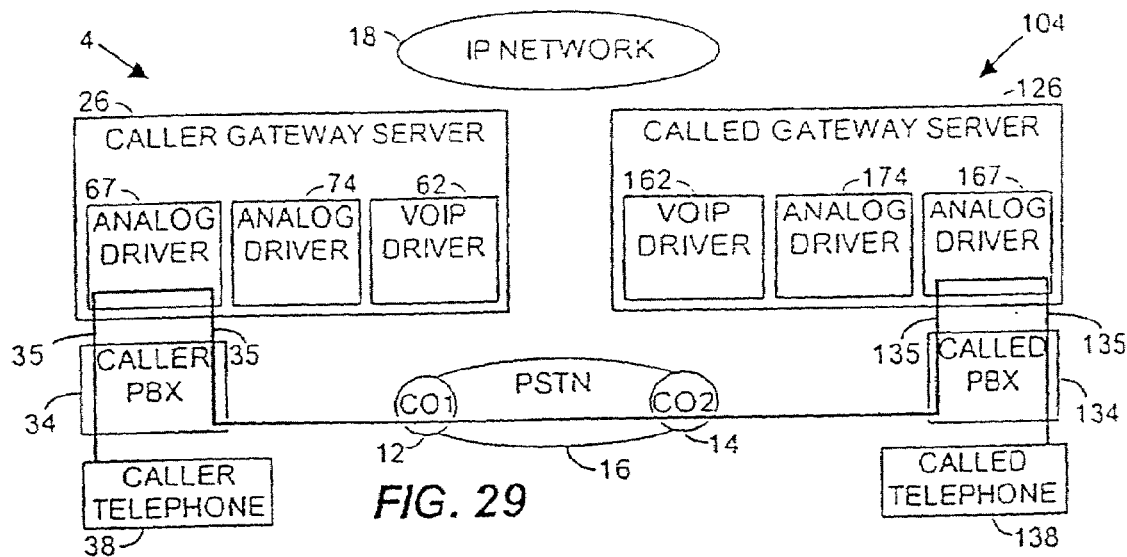

Fallback to PST NETWORK method "B" will be described with reference to FIGS. 23 to 29. Referring to FIG. 23, an ongoing VoIP call is routed between a caller telephone 38 and a called telephone 138 through the caller PBX 34 and called PBX 134, the caller gateway server 26 and the called gateway server 126, through the IP network 18. In fallback to PST NETWORK method "B", when the caller gateway server 26 determines that the QoS has fallen below the level specified by the system administrator, the caller gateway server 26 initiates a call from an analog station 73 in the caller gateway server 26 to the hunt group of analog stations in the called gateway server 126. The call initiation, and subsequent signaling, is routed from the caller station analog driver 74 in the caller gateway server 26 through the caller PBX 34, the PST NETWORK 16 (including the respective CO's 12,14), and the called PBX 134 to the called station analog driver 174 in the called gateway server 126. Referring to FIG. 24, the called gateway server 126 sends a "fallback confirm" DTMF tone back to the caller gateway server 26. The DTMF tone is routed from the caller gateway server 126 through the called PBX 134, the PST NETWORK 16 and the caller PBX 34 to the called gateway server 26. Referring again to FIG. 23, when the caller gateway server 26 receives the fallback confirm DTMF tone, the caller gateway server 26 sends the original caller and called telephone numbers to the called gateway server 126. Referring to FIG. 25, both the caller gateway server 26 and the called gateway server 126 place a hook-flash transfer to the respective caller gateway network trunk 35 and called gateway network trunk 135, respectively, by dialing a "fallback to gateway network trunk" number. Continuing to refer to FIG. 25, both the caller gateway server 26 and called gateway server 126 answer the call at the respective gateway network trunks 67, 167 and recognize the call as a fallback call. Referring to FIG. 26, both the caller gateway server 26 and called gateway server 126 then hang up the respective analog stations 74, 174. Referring to FIG. 27, the called gateway server 126 sends a "fallback ready" DTMF tone to a new trunk channel for the PST NETWORK call, and then waits for a short period, e.g. 200 msec, to allow the caller gateway server 26 to receive the DTMF tone. Referring to FIG. 28, the caller gateway server 26 and the called gateway server 126 then connect the respective TDM bus 84 (FIG. 3) time-slot of the new trunk 35 channel with that of the T1 channel of the original VoIP call, thereby establishing the telephone call via the PST NETWORK 16. Referring to FIG. 29, the caller gateway server 26 and called gateway server 126 then disconnect the original VoIP call.

Fallback to PST NETWORK method "C", listed in Table 11, implements a transparent fallback to PST NETWORK. Two T1 channels are used at each end of the call during fallback to PST NETWORK and for the remainder of the call. No analog station ports are used. The PBX uses trunk to trunk call capability, i.e. tie trunk to CO trunk on the caller gateway server side, and CO trunk to tie trunk on the called gateway server side. The PBX is configured to enable a trunk to trunk call.

Figure 30:
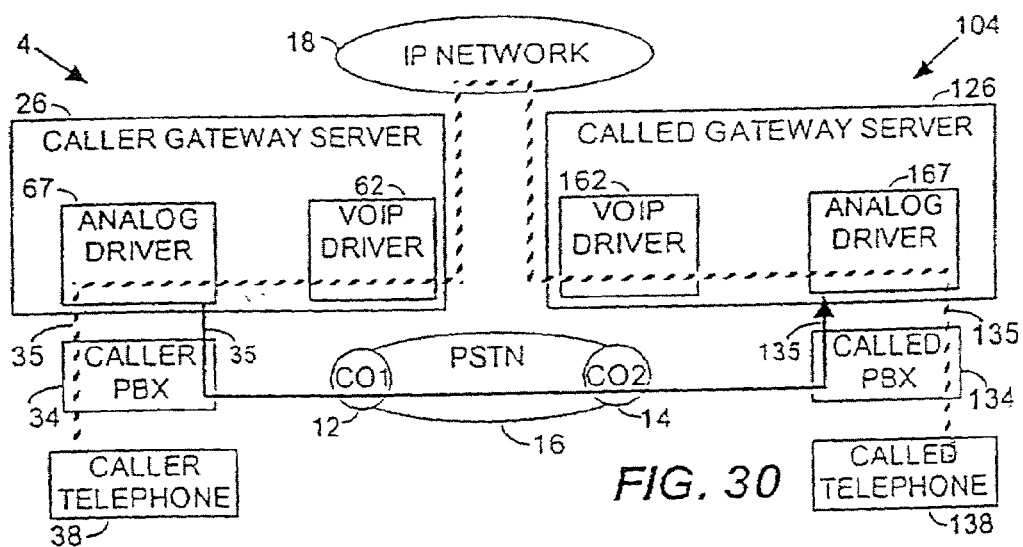
FIGS. 30–33 illustrate the operation of an embodiment of an integrated voice gateway system of the invention in a third method for setting up a fallback to PST NETWORK call.
Figure 31:
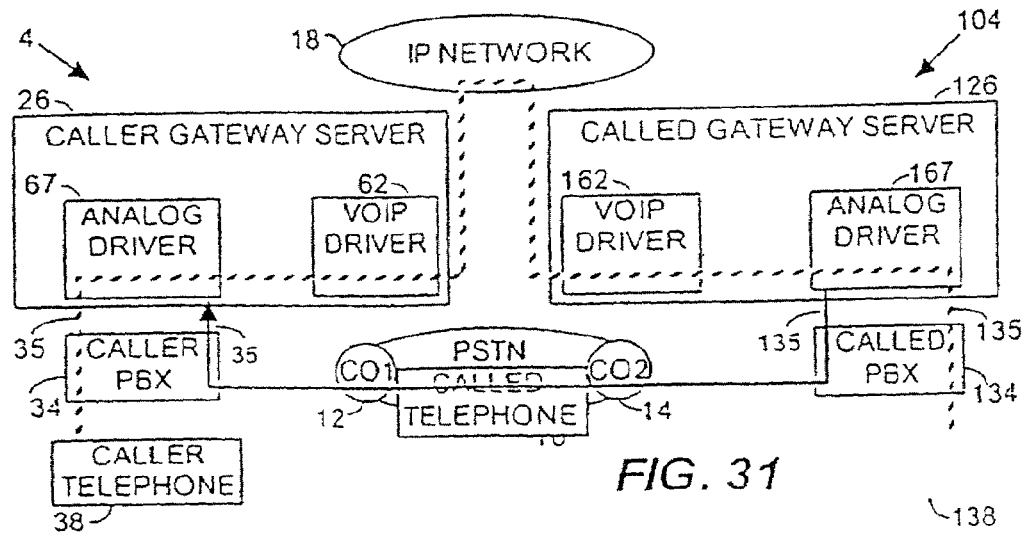
Figure 32:
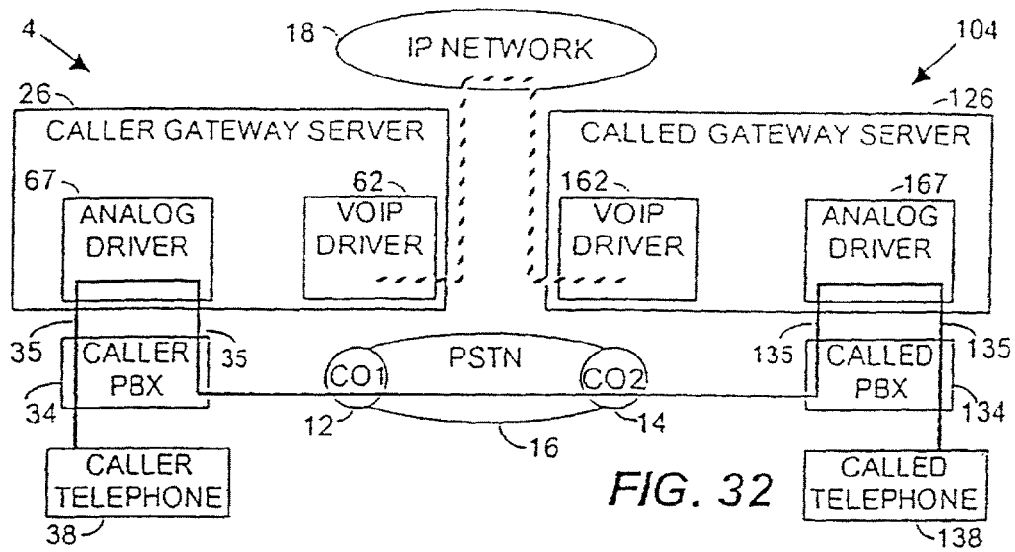
Figure 33:
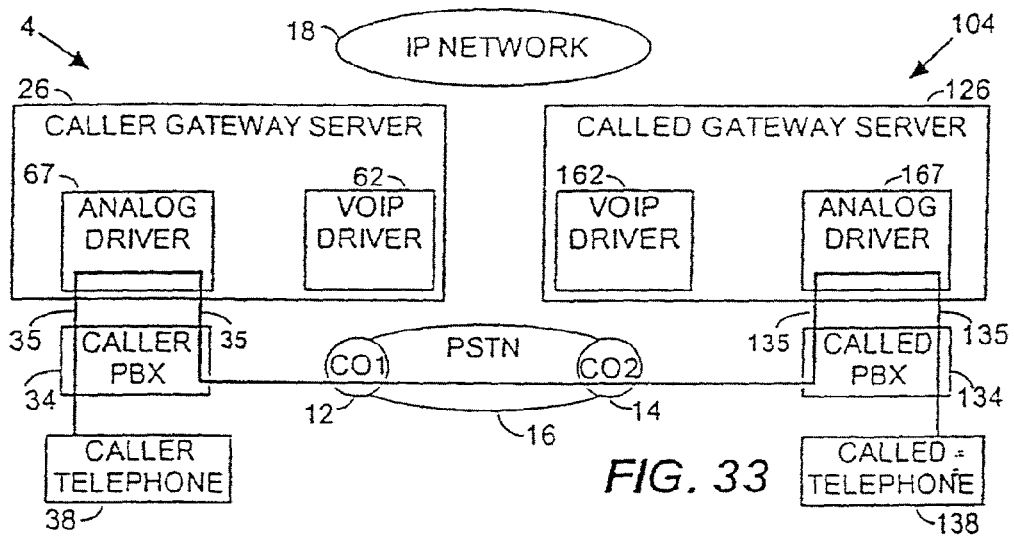

Fallback to PST NETWORK method "C" will be described with reference to FIGS. 30 to 33. Referring to FIG. 30, an ongoing VoIP call is routed between a caller telephone 38 and a called telephone 138 through the caller PBX 34 and called PBX 134, the caller gateway server 26 and the called gateway server 126, through the IP network 18. In fallback to PST NETWORK method "C", when the caller gateway server 26 determines that the QoS has fallen below the level specified by the system administrator, the caller gateway server 26 initiates a call from a tie trunk channel to the tie trunk channel of the called gateway server 126. The call is initiated by dialing a specified telephone number. This step may be a multi-step process, and the implementation may be PBX specific. After initiating the call, the caller gateway server 26 waits to receive a "fallback ready" DTMF tone. Referring to FIG. 31, after the called gateway server receives the tie-trunk call, the called gateway server 126 sends the "fallback ready" DTMF tone to the caller gateway server 26. Referring again to FIG. 30, the caller gateway server 26 sends the original called telephone number to the called gateway server 126, and then waits for a short period, e.g. 200 msec. Referring to FIG. 32, the caller gateway server 26 and the called gateway server 126 then connect the respective TDM bus 84 time-slot of the new trunk channel with that of the T1 channel of the original VoIP call, thereby establishing the telephone call via the PST NETWORK 16. Referring to FIG. 33, the caller gateway server 26 and called gateway server 126 then disconnect the original VoIP call.

Fallback to PST NETWORK method "D", listed in Table 11, implements a non-transparent fallback to PST NETWORK. No T1 channels are used for the PST NETWORK call after the fallback process. No analog station ports are used. The PBX uses CTI. The gateway servers exchange proprietary messages among themselves using IP sessions which are separate from those used for the voice call. Fallback to PST NETWORK method "D" may be used if the IP connection between the caller gateway server and called gateway server is still good enough to support transmission of data messages. If the IP connection is not adequate for the caller gateway server and called gateway server to exchange data messages, the respective gateway servers may fallback to a PST NETWORK call using method "E" which will be described below.

Figure 34:
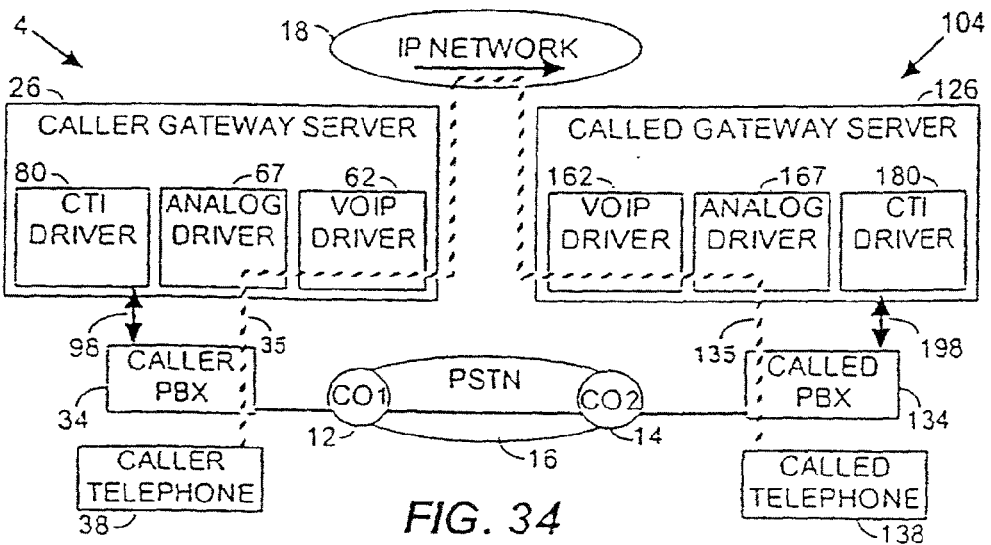
FIGS. 34–38 illustrate the operation of an embodiment of an integrated voice gateway system of the invention in a fourth method for setting up a fallback to PST NETWORK call.
Figure 35:
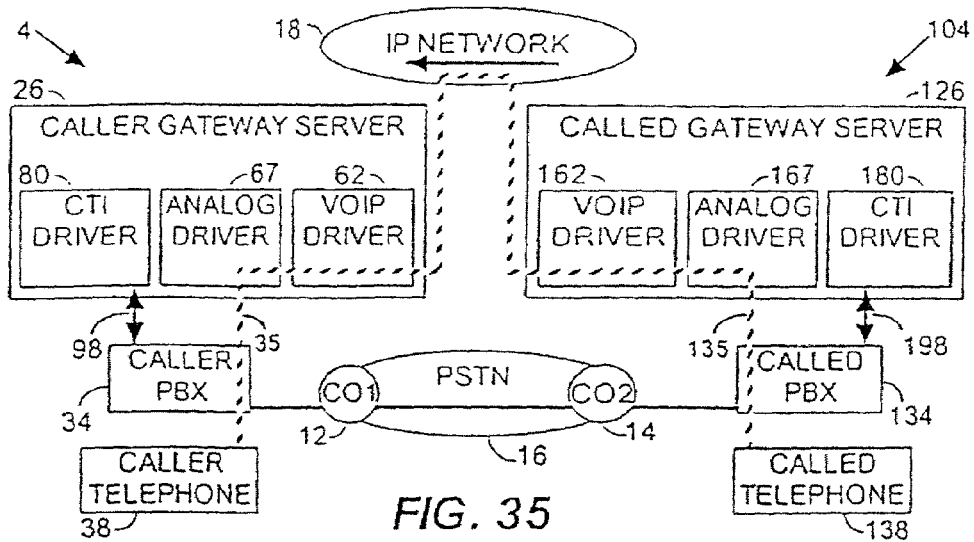
Figure 36:
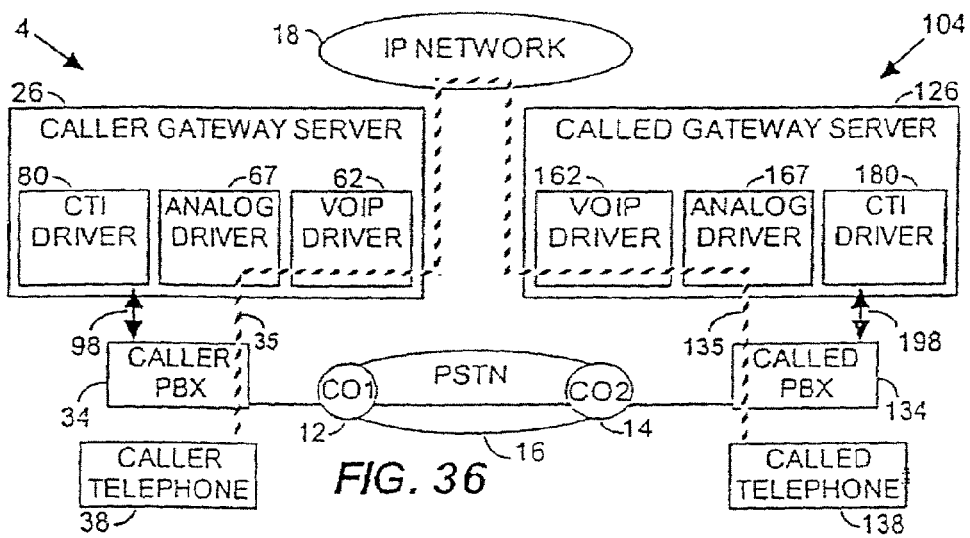
Figure 37:
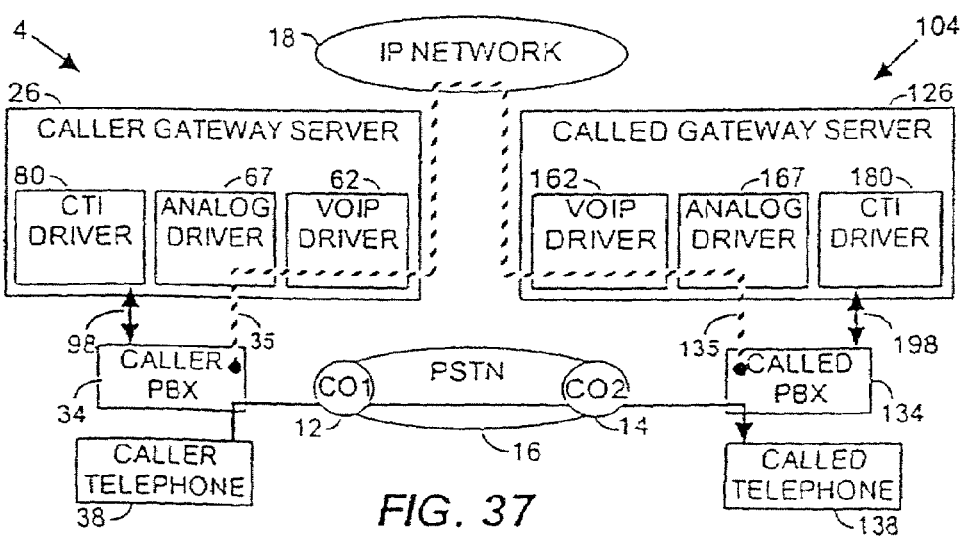
Figure 38:
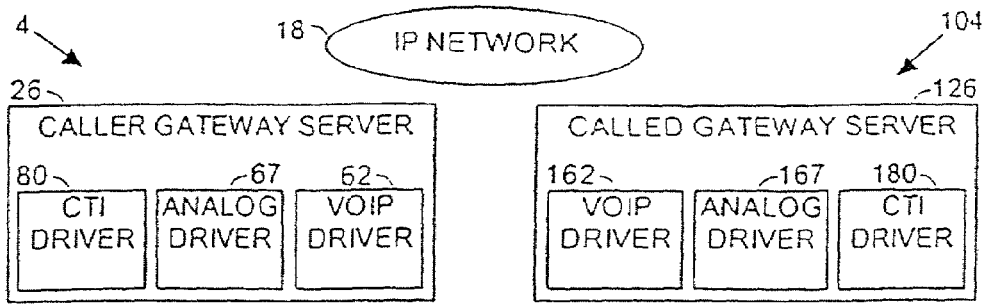

Fallback to PST NETWORK method "D" will be described with reference to FIGS. 34 to 38. Referring to FIG. 34, an ongoing VoIP call is routed between a caller telephone 38 and a called telephone 138 through the caller PBX 34 and called PBX 134, the caller gateway server 26 and the called gateway server 126, through the IP network 18. In fallback to PST NETWORK method "D", when the caller gateway server 26 determines that the QoS has fallen below the level specified by the system administrator, the caller gateway server 26 initiates a "fallback request" message over the IP network 18. The "fallback request" message contains the caller and called telephone numbers. The caller gateway server waits to receive a "fallback ready" message. Referring to FIG. 35, after receiving the "fallback request" from the caller gateway server 26, the called gateway server 126 sends a "fallback ready" message to the caller gateway server 26 over the IP network 18. Referring to FIG. 36, the caller gateway server 26 manages the TDM bus 84 time slots to announce the fallback to both the caller and called parties. Referring to FIG. 37, the caller gateway server 26 uses the CTI link to place the current VoIP call on hold. The caller gateway server 26 then uses the CTI link to make a PST NETWORK call from the caller telephone 38 to the called telephone 138. The called gateway server 126 detects the incoming call and uses the CTI link to place the VoIP call on hold and to pick up the PST NETWORK call. Referring to FIG. 38, the caller gateway server 26 and called gateway server 126 then disconnect the original VoIP call.

In fallback to PST NETWORK method "E", listed in Table 11, no T1 channels are used for the PST NETWORK call after the fallback process. One analog station port is used during the fallback to PST NETWORK process. The PBX includes CTI and has a hunt group for the gateway network analog stations.

Figure 39:
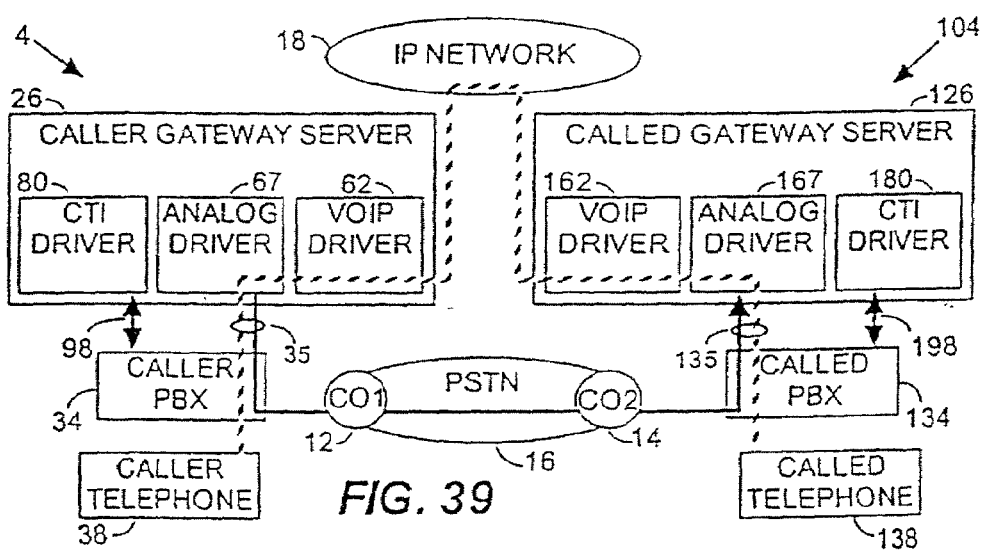
FIGS. 39–46 illustrate the operation of an embodiment of an integrated voice gateway system of the invention in a fifth method for setting up a fallback to PST NETWORK call.
Figure 40:
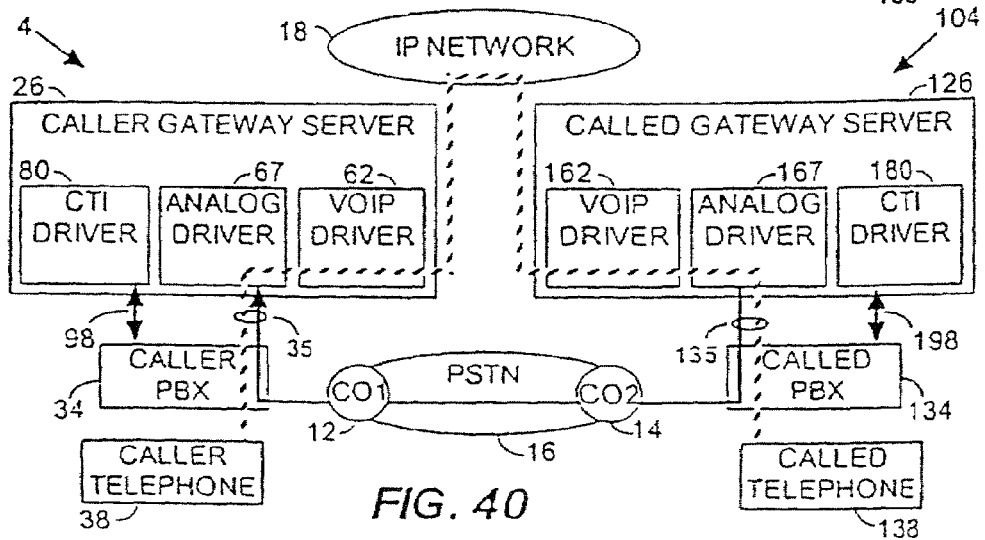
Figure 41:
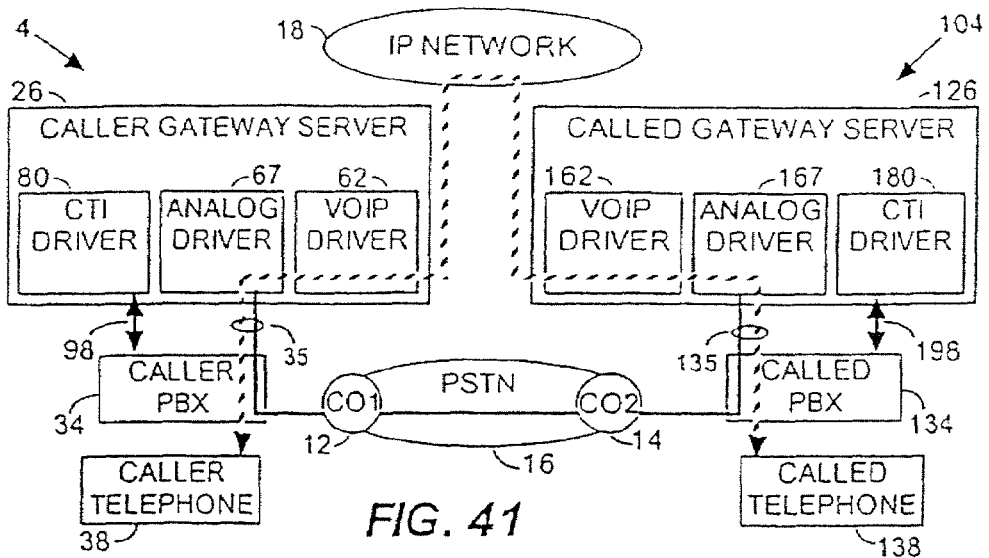
Figure 42:
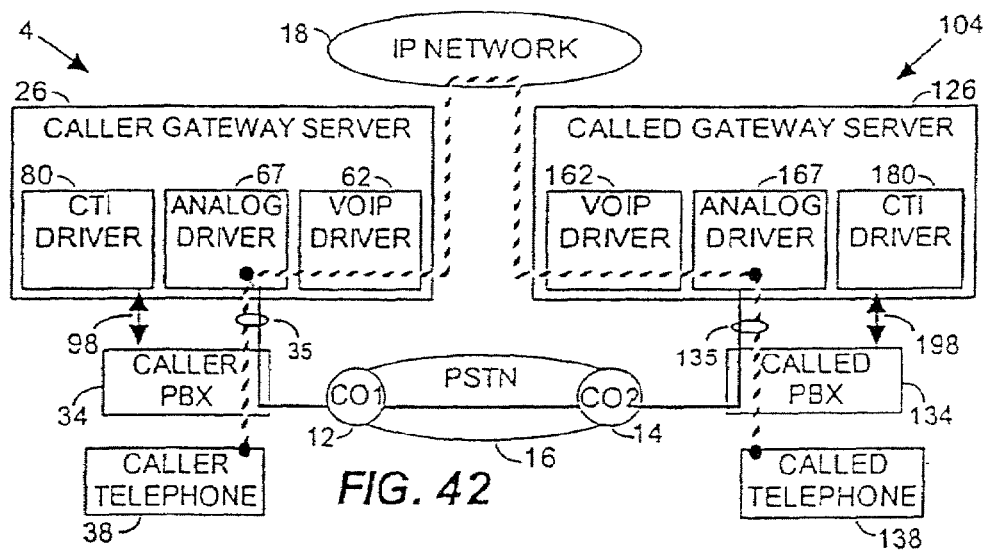
Figure 43:
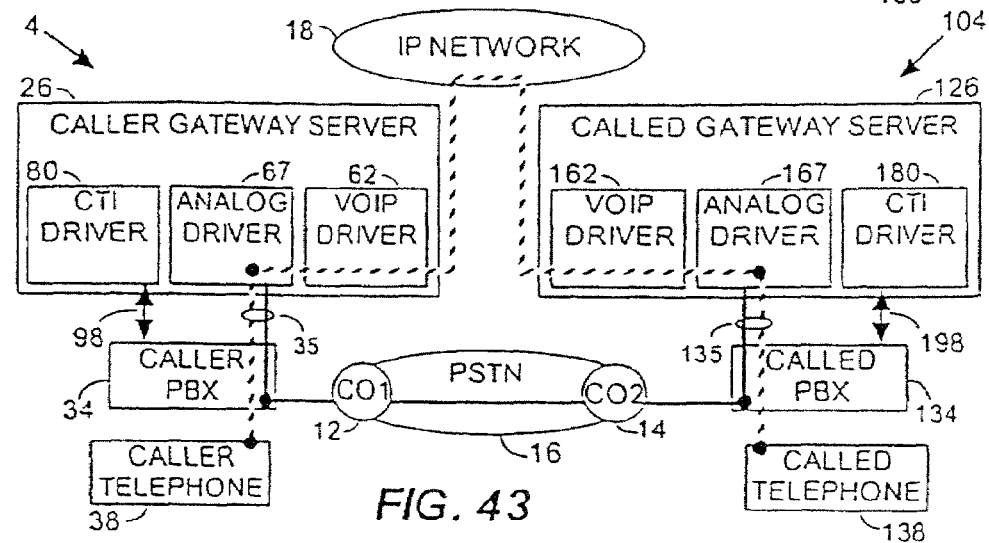
Figure 44:
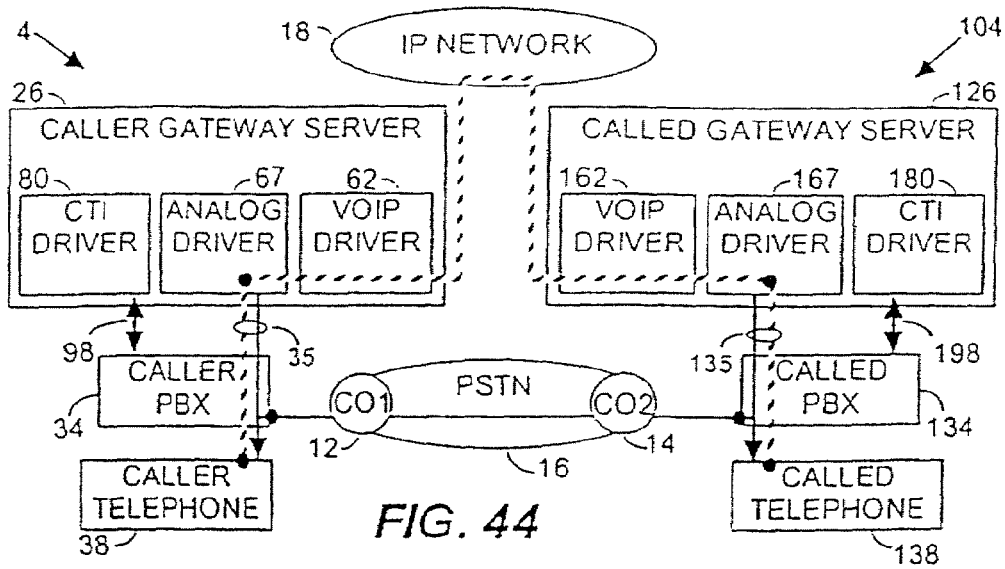
Figure 45:
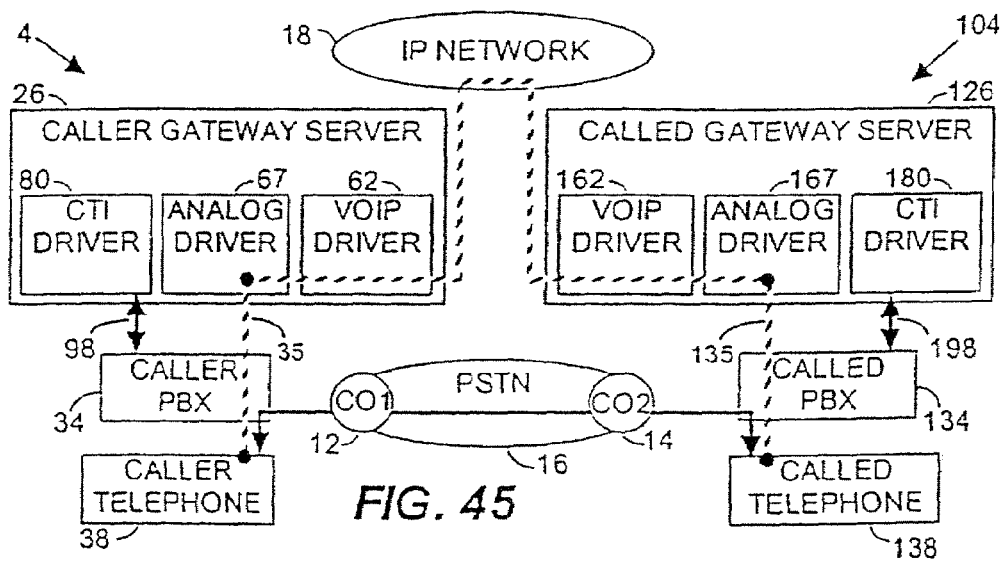
Figure 46:
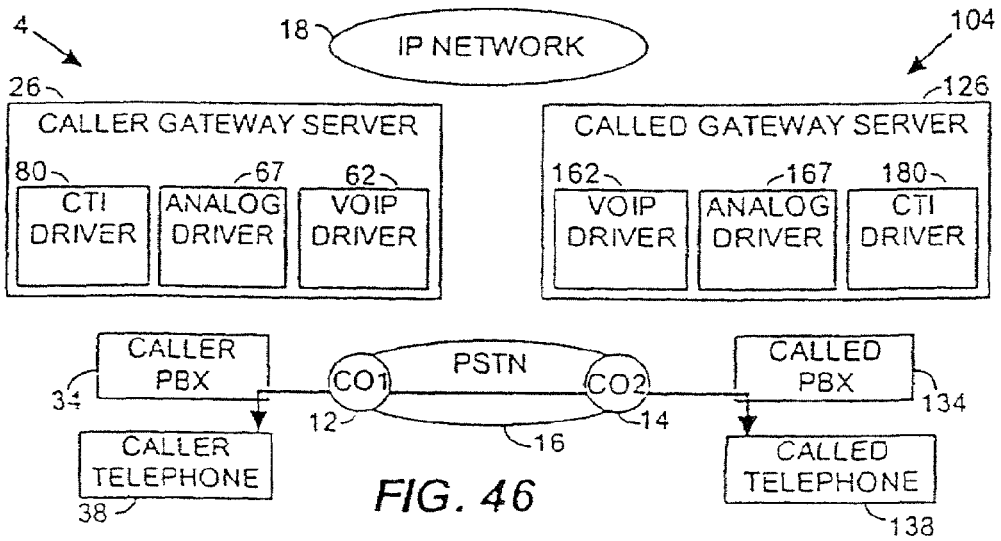

Fallback to PST NETWORK method "E" will be described with reference to FIGS. 39 to 46. Referring to FIG. 39, an ongoing VoIP call is routed between a caller telephone 38 and a called telephone 138 through the caller PBX 34 and called PBX 134, the caller gateway server 26 and the called gateway server 126, through the IP network 18. In fallback to PST NETWORK method "E", when the caller gateway server 26 determines that the QoS has fallen below the level specified by the system administrator, the caller gateway server 26 initiates a telephone call from an analog station in the caller gateway server 26 to the hunt group of analog stations in the called gateway server 126. Referring to FIG. 40, the called gateway server 126 sends a "fallback confirm" DTMF tone to the caller gateway server 26. Referring again to FIG. 39, the caller gateway server 26 sends the caller and called telephone numbers to the called gateway server 126. Referring to FIG. 41, both the caller gateway server 26 and the called gateway server 126 manage the TDM bus 84 time slots to announce the fallback to PST NETWORK to the caller and called parties, respectively. Referring to FIGS. 42–45, the caller gateway server 26 and called gateway server 126 use CTI to put the current VoIP call on hold (FIG. 42); then to put the new PST NETWORK call on hold (FIG. 43); and then to make a call from the analog station in the respective gateway networks to the caller (FIG. 44), and answer the call for the caller (FIG. 45). Referring to FIG. 46, the caller gateway server 26 and called gateway server 126 then hang up on the respective analog stations, and disconnect the original VoIP call.

Fallback to PST NETWORK During Call Setup

In addition to providing the capability to fallback to PST NETWORK during a VoIP call, the gateway server provides the capability to fallback to the PST NETWORK during setup of a call if the call cannot be connected through the called gateway server. Fallback to PST NETWORK during call setup may employ any of the five methods described above for fallback to PST NETWORK during a call. The method employed will depend on the configuration of the particular caller gateway network, e.g. PBX configuration and capability, CTI capabilities, additional hardware availability and voice channel capacity. However, in each of the five methods described above, fallback to PST NETWORK during call setup does not include the steps which keep the VoIP call connected until the PST NETWORK call is completed, since there is no current VoIP call to maintain.

The fallback to PST NETWORK during call setup capability provided by the gateway server of the invention is an improvement over current systems. In many current systems, if a caller gateway placing a call to a remote gateway cannot access the remote gateway, the caller gateway will "busy out" all of its trunks, or at least a group of trunks allocated to the remote destination. Then, as succeeding gateways find either the remote gateway or the initial caller gateway inaccessible, they will "busy out" their own respective trunks. This "domino" effect can lead to the entire network being brought down because an individual segment of the network is down. However, the gateway server avoids this problem by simply setting up the call to be routed back through the PBX. In the gateway network of the invention, there is no need for the caller gateway to busy itself out merely because the caller gateway found a remote called gateway to be inaccessible.

Path Replacement

The gateway server supports redirection of an incoming call from a first PBX, and its associated gateway server, to a second PBX, and its associated gateway server, as a result of a call forward (including call transfer, or follow-me). If both the call before (the initial call) and the call after (the final call) a call forward are VoIP calls, the final call can take a direct path between the caller gateway server and called (transfer) gateway server. This "path replacement" feature eliminates unnecessary loops after a call forward.

VoIP is sensitive to tandem compression, i.e., when a call is converted to and from a VoIP call twice in series during the call's transmission. Tandem compression results in a substantial drop in voice quality, often to unacceptable quality levels. In a preferred embodiment, the gateway server of the invention provides a path replacement feature which substantially improves the quality of voice transmission in a call forwarded call, and improves the utilization of gateway network resources. The quality of voice is substantially improved, because path replacement eliminates the tandem VoIP calls after a call forward. The utilization of gateway network resources is substantially improved because an unnecessary loop is avoided. After a call forward, there are two PBX's and their respective gateway servers involved in the call instead of three PBX's and gateway servers.

Path replacement is best described with an example: A call from Boston to Los Angeles is transferred by the Los Angeles party to a New York destination. In current systems, there would be two calls coupled in the Los Angeles PBX, i.e. a call between Boston and Los Angeles and a call between New York and Los Angeles. With IP telephony, this would result in an unacceptable tandem compression arrangement. However the gateway server recognizes that a direct and shorter path exists, namely direct communication between Boston and New York gateway networks. The gateway server replaces the routing path to place one call following the direct and shorter path, and with a single compression path.

In implementing a path replacement, the gateway servers exchange messages to communicate with each other. The gateway servers use CTI to set up a path replacement.

Path Replacement for Call Transfer

A gateway network user can transfer an incoming call to another gateway network telephone. If an incoming call is a VoIP call, and if the call is transferred to a remote gateway user via VoIP, the gateway server will implement path replacement to eliminate the intermediate PBX loop back. As a result, there will be one direct VoIP link in the transferred call.

In the path replacement for call transfer methods describes below, the original call is placed from the caller telephone at the caller gateway network to the called telephone at the called gateway network, and is then transferred to the transfer telephone at the transfer gateway network. The call transfer may be either unsupervised or supervised, and may be initiated by the called user from a web browser CTI application or from the telephone.

Unsupervised Call Transfer from the Browser

To initiate an unsupervised call transfer, the called user clicks an "unsupervised transfer" button displayed on a browser menu. The called gateway server receives the unsupervised call transfer request, and sends a call transfer message to the caller gateway server. The caller gateway server receives the call transfer request message and sets up a VoIP call to the transfer telephone at the transfer gateway network. The caller gateway server then disconnects the original call to the called telephone.

Supervised Call Transfer from the Browser

To initiate a supervised call transfer, the called user clicks a "supervised transfer" button displayed on a browser menu. The called gateway server receives the supervised call transfer request, uses CTI to place the call on hold, and places a call from the called gateway server to the transfer telephone at the transfer gateway server. After the call to the transfer telephone is connected, the called user clicks a "transfer" menu entry to complete the supervised call transfer. The called gateway server receives the transfer request and sends a call transfer message to the caller gateway server. The caller gateway server sets up a VoIP call to the transfer telephone. The caller gateway server and transfer gateway server manage the TDM bus time slots to connect the caller telephone and transfer telephone via the new direct VoIP call. The caller gateway server and transfer gateway server disconnect the original call from the called gateway server.

Call Transfer from the Telephone

The called user may initiate a call transfer, with path replacement, using the DTMF buttons on the telephone. The called user initiates the call transfer by entering a transfer code or pressing a transfer button on the telephone, depending on the PBX configuration, and then dials the transfer telephone number. The called PBX places the current call on hold and sends the call to the called gateway server. The called gateway server receives the call from the PBX and initiates the VoIP call to the transfer telephone. The called user enters a supervised or unsupervised transfer DTMF sequence, again PBX dependent. The called gateway server receives a transferred CTI event and sends a call transfer message to the caller gateway server. The caller gateway server receives the transfer message and sets up a VoIP call to the transfer telephone. The caller gateway server manages the TDM bus time slots to connect the caller telephone to the new VoIP call to the transfer telephone. The caller gateway server then disconnects the original call to the called telephone.

Path Replacement for Call Forward

The gateway network users can set up a call forward, with path replacement, from a web browser CTI application or from the telephone. In either case, call forward is a PBX feature, and the operation can be carried out by the PBX alone without the gateway server's involvement. However, if the incoming call is via VoIP and is forwarded to a remote site also via VoIP, the gateway server will provide call forward with path replacement so that the intermediate PBX loop back is eliminated. As a result, there will be just one direct VoIP link in the forwarded call.

Upon receiving an H.323 call setup message, the called gateway server checks to determine if the called user has call forward set up. The called gateway server uses CTI to send an inquiry to the PBX. If the user has call forward set up, and if the call forward destination is at a remote gateway network PBX, the called gateway server sends a "gateway call reroute" message back to the caller gateway server. Upon receiving the call reroute message, the caller gateway server sets up the original call to the transfer gateway server and transfer telephone.

Path Replacement for Follow-me

The gateway server allows users to redirect incoming telephone calls to any telephone, cellular phone, pager, etc., at other locations, e.g. conference room, home, etc. Users may also set up filters so that only calls from selected caller(s) are redirected. The gateway server can implement the follow me capability with path replacement.

Upon receiving an H.323 call setup message, the called gateway server checks the gateway database to determine if the user has follow me set up. If the called user has follow me set up, and if the destination is at a remote gateway server or other H.323 telephone, the called gateway server sends a "gateway call reroute" message back to the caller gateway server. The caller gateway server sets up the original call directly to the remote gateway server or H.323 telephone. The follow me feature of the integrated voice gateway system of the invention is described below.

Real-time Fax over the IP Network

The gateway server supports real-time fax transmission over the IP network (FoIP). The caller gateway server forwards the fax signals from the caller fax machine immediately across the IP network to the called gateway server. The called gateway server, in turn sends the signals to the called fax machine. The caller gateway server sends signals from the called fax machine back to the caller gateway server via the IP network. The caller gateway server send the signals to the caller fax machine. Real-time fax transmission over the IP network is provided the same immediacy of delivery that users are used to with fax transmission over the PST NETWORK.

Inter-PBX Toll Bypass for Real-Time Fax

In a preferred embodiment, the integrated voice gateway system of the invention supports the routing of a fax call from a stand-alone fax machine (or fax server) over the IP network. This feature is basically the same as "Inter-PBX Toll Bypass for Real-Time Voice", i.e. the basic VoIP call described above with reference to FIG. 5. The gateway engine 50 (FIG. 3) provides automatic fax detection. Fax calls can be routed to a gateway server automatically by the configuration of the PBX ARS table in the same manner as is done for voice calls. A PBX trunk coupled to a gateway server can be dynamically shared between voice and fax calls.

This feature can be provided independent of Inter-PBX Toll Bypass for voice calls. If a company decides that the quality of voice over IP is not acceptable for its purposes, the integrated voice gateway system of the invention can still provide for FoIP. In this case, the PBX stations for the fax machines are assigned a special "Class of Service", and calls originating from these stations are routed by the caller PBX to the caller gateway server.

When FoIP is supported in conjunction with VoIP, the gateway server can also be configured so that VoIP calls are routed via the company's intranet, and fax calls are routed via the Internet to take advantage of free bandwidth on the Internet.

Hop-off to PST NETWORK for Real-time Fax

In a preferred embodiment, the integrated voice gateway system of the invention supports a fax call from within the company to an outside PST NETWORK fax machine via the IP network and the PST NETWORK. A user in the company, can send a fax to an outside fax machine. The fax call is carried via the IP network to the gateway server which is the closest to the called fax machine, and from there a PST NETWORK connection is made from the called gateway server to the called fax machine.

Supported hop-off destinations are determined by the system administrator of the destination gateway servers. Both hop-off via local PST NETWORK call and hop-off via long distance PST NETWORK call are supported. The ARS table (or routing table by other names) of the originating PBX needs to be configured accordingly for the hop-off calls to be routed to the gateway server.

Hop-off to PST NETWORK methods are listed in Table 10. and described above with reference to FIGS. 6–14.

Redirection of Incoming Fax to Printer

In a preferred embodiment, the integrated voice gateway system of the invention supports the use of laser printers as fax machines. A pseudo fax number can be defined for a printer by the administrator. Once a printer is assigned a pseudo fax number, the printer can receive faxes sent to that pseudo number just like a fax machine. The fax gateway 54 (FIG. 3) in the called gateway server 126 converts the received fax into a printable form before sending the received fax to the print queue. This feature allows the simultaneous transmission and receipt of faxes between company sites without busy signals. It also supports the use of plain paper for printing faxes.

Fax Multi-Cast

In a preferred embodiment, the integrated voice gateway system of the invention supports the multi-cast of a fax to a group of recipients. A pseudo fax number representing a group of recipients (i.e. fax distribution list) can be defined by the administrator or a user. A fax sent to a "pseudo fax number" which represents a group is multi-casted to all recipients in the group.

Fax multi-cast saves users' time, and reduces the traffic load in the company's network. When more than one recipient of a multi-cast group is on the same called gateway server, the caller gateway server sends only one copy of the fax to the called gateway server. The called gateway server then fans out the fax to each of the recipients.

PC Call Control

The invention provides the user with desktop CTI capabilities. The user may dial, answer, hang-up, transfer, conference, forward, place a call on hold, unhold, and drop a call from the desktop workstation. The user can dial touch tone digits, e.g. in response to IVR commands. The user can also set the DND indicator for all calls or selected calls, and manage multiple call appearances, e.g. select one call to answer and select another call to go to voicemail. The white pages and the individual frequent contact lists from the enterprise directory are available for the user to select destinations for dialing, transfers and conferencing. The call log is also available at the desktop workstation. The PC call control interface is delivered as a Java applet through the web browser.

Current CTI applications only provide the user a personal telephone book or an application specific directory. Current CTI applications do not provide the user with access to the enterprise directory. In the integrated voice gateway system of the invention, the PC call control capability is integrated with the IP telephone voice gateway, and provides the user with a white pages directory, based upon the enterprise directory, to serve as a phone book directory, and integrated with a CTI application.

Figures 47, 48:
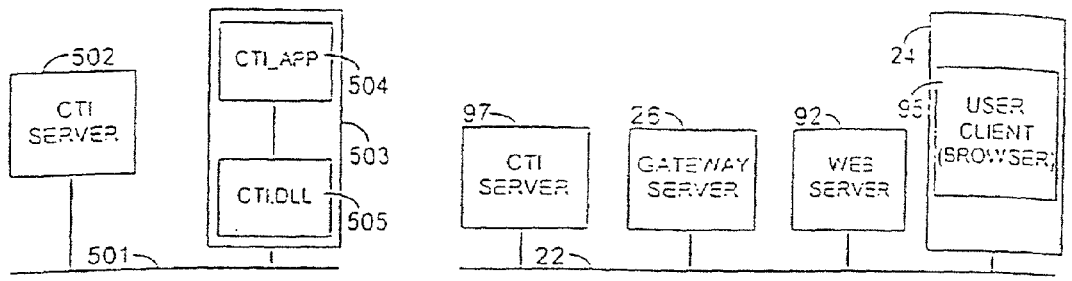
FIG. 47 is a block diagram illustrating a prior art approach to providing a CTI-workstation interface.
FIG. 48 is a block diagram illustrating the computer architecture supporting a PC Call Control feature in an embodiment of an integrated voice gateway system of the invention.

Since the PC call control feature is browser based, there is no desktop application to install, and the PC call control capability is compatible with multiple computers and operating systems. This is illustrated in FIGS. 47 and 48. FIG. 47 illustrates a current system in which a CTI server 502 and a workstation 503 are coupled via a LAN 501. The CTI application CTI_APP 504 and CTI dynamic link library (dll) CTI.dll 505. The CTI_APP 504 and CTI.dll 505 are both installed in the workstation 503. This can be very expensive, and present a complex logistical problem in a large organization to install, maintain and update the CTI_APP 504 and CTI.dll 505 as required for new features, bug fixes, operating system upgrades and the like. In the integrated voice gateway system of the invention, as illustrated in FIG. 48, there is no need to install applications, dlls, and the like in all the users' workstations. The CTI server 97, gateway server 26, web server 92 and workstation 24 are all coupled via the company's LAN 22. The user client 95 is a commercially available web browser-based GUI application. There is no need to install special applications, dlls, or the like, as all PC call control capabilities are provided via the web browser user client 95. Installation, maintenance and upgrade of the call control application is accomplished as necessary only on the respective servers. The user begins by logging in via a browser screen. Once the user is logged in, the user can receive "screen pops" from the gateway server 26. Screen pops are windows and dialog boxes which, for example, identify the calling and called parties, and provide other information to the user as is described below.

Virtual Desktop

Figure 49:
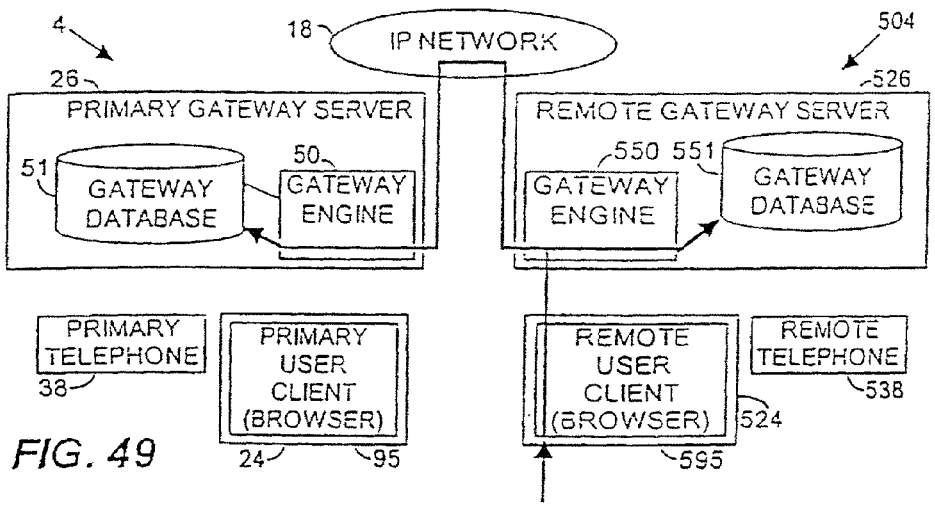
FIG. 49 illustrates the operation of a virtual desktop feature in an embodiment of an integrated voice gateway system of the invention.

The integrated voice gateway system of the invention provides a virtual desktop which allows a computer browser and a telephone at a location other than a user's regular office, e.g. an "alternate office" or a "virtual office", to be logically associated with the user. As used herein, an alternate office may be another office within the company, and a virtual office may be at a location off the company's premises. An alternate office within the company is any location that has access to both a gateway telephone, and a desktop workstation having a browser, the workstation coupled to the company's data network. Reference FIG. 49, the integrated voice gateway system of the invention supports a user working in an alternate office by providing the user the capability to: redirect desired inbound calls to the telephone in the alternate office, and receive caller ID screen pops on the desktop workstation identifying that the call is for that user; place calls from the telephone in the alternate office and have the user's own caller ID sent to the call's destination; and, have access to the full set of browser based desktop call control (e.g., white pages, transfer) that are available at the user's regular desk. As illustrated in FIG. 49, the user first logs in at the remote workstation 524 via the user client 595 browser interface in the alternate office. The login information includes the telephone number of the remote telephone 538. The gateway engine 550 in the remote gateway server 526 causes the information to be stored in the gateway database 551 in the remote gateway server 526 and to be sent to the user's primary gateway server 26 to be stored in the gateway database 51 in the primary gateway server 26. The information stored in the gateway database 51 in the primary gateway server may include a filter set up by the user to limit the users whose calls are forwarded to the alternate office. Operation of the follow me feature of the integrated voice gateway system of the invention is described below.

Traveling Class of Service

The class of service is a set of user attributes which indicate the capabilities that are available to a user. The attributes include both licensing levels and feature activation. The class of service attributes are referenced at different points during operation of the gateway server, and include, for example, when a user logs in—to determine which client to deliver via the web browse; at an originating gateway server—to determine which features are available to a user; and to be transported with a call to a called gateway server—so that feature access may also be addressed at the destination.

As indicated above in the description of the Virtual Desktop feature, the class of service available to a user follows the user when the user logs in at an alternate office.

Virtual PBX Features

The integrated voice gateway system of the invention couples the PBX's in an enterprise in one single Virtual PBX (VPBX). This enables the system of the invention to provide several useful end-user features which are collectively referred to herein as VPBX features. This set of VPBX features is an important set of features which set has not previously been available in IP telephony systems. The gateway server relies on the CTI connection to the PBX to provide most of the VPBX features. The integration of the gateway server with the enterprise directory services systems enables the gateway server to provide the full range of VPBX features described herein. As an alternative to CTI, the gateway server can also obtain much of the information needed to provide VPBX features via PRI and QSIG interfaces. Table 13 shows the VPBX features which can be supported depending on the interfaces which are available. It can be seen that all of the features can be supported in a system having a CTI link between the PBX and the gateway server, and either a T1/E1 tie trunk or an analog CO trunk. In a configuration having a QSIG interface with no CTI link, all the features can be provided except for dynamic caller ID for calls which originate from the PST NETWORK or if the caller and called telephones are both coupled to the same PBX. The remaining configurations, not having a CTI link between the PBX and the gateway server do not support path replacement, callback on busy or call alert, and only a configuration having a PRI CO trunk or T1/E1 in-band signaling, without a CTI link, can support dynamic caller ID for calls placed from a caller telephone to a called telephone with both telephones "on net".

TABLE 13

VPBX Feature Support

| | CTI and T1/E1 Tie-Trunk or Analog CO Trunk | No CTI and QSIG | No CTI and PRI CO Trunk or T1/E1 with In-Band ANI Signaling | No CTI and T1/E1 Tie Trunk or Analog CO Trunk |
|---|---|---|---|---|
| Toll Bypass | X | X | X | X |
| Hop-Off to PST NETWORK | X | X | X | X |
| Hop-On from PST NETWORK | X | X | X | X |
| Fallback to PST NETWORK | X | X | X | X |
| Fail-Safe Operation | X | X | X | X |
| Path Replacement | X | X | — | — |
| Dynamic Caller ID (on net calls) | X | X | X | — |
| Dynamic Caller ID (off-net calls, i.e. PST NETWORK and intra-PBX calls) | X | | | |
| Callback on Busy | X | X | — | — |
| Call Alert on Busy | X | X | — | — |

Table 14 shows the features for forwarding calls to alternate telephone numbers which can be supported from a user client depending on the interfaces which are available. It can be seen that all of the features can be supported in a system having a CTI link between the PBX and the gateway server, and either a T1/E1 tie trunk or an analog CO trunk. In a configuration having a QSIG interface with no CTI link, all the features can be provided except for follow-me for calls which originate off-net. The remaining configurations, not having a CTI link between the PBX and the gateway server also do not support filtered follow-me for on-net or off-net calls.

TABLE 14

Follow-me Feature Support

|  | CTI and T1/E1 Tie-Trunk or Analog CO Trunk | No CTI and QSIG or PRI CO Trunk | No CTI and T1/E1 Tie Trunk or Analog CO Trunk |
|---|---|---|---|
| Intelligent Follow-me |  |  |  |
| Follow-me (on-net calls) | X | X | X |
| Follow-me (off-net calls) | X |  |  |
| Scheduling via Browser | X | X | X |
| Turn on/off via any phone | X | X | X |
| Voice Mail Coverage | X | X | X |
| Filtered Follow-me (on-net calls) | X | X |  |
| Filtered Follow-me (off-net calls) | X | — | — |
| Alternate Office: |  |  |  |
| Alternate Office: Identify User Calls | X | X | X |
| Remote H.323 User |  |  |  |
| NetMeeting Integration | X | X | X |

Table 15 shows advanced features which can be supported from a user client depending on the interfaces which are available. It can be seen that all of the features can be supported in a system having a CTI link between the PBX and the gateway server, and either a T1/E1 tie trunk or an analog CO trunk. In a configuration having no CTI link available, only the enterprises and personal directories are supported, and the call log for on-net calls.

TABLE 15

Advanced Feature Support

|  | CTI and T1/E1 Tie-Trunk or Analog CO Trunk | No CTI and QSIG or PRI CO Trunk or T1/E1 Tie Trunk or Analog CO Trunk |
|---|---|---|
| Directory |  |  |
| Enterprise Directory | X | X |
| Personal Directory | X | X |
| Call Log |  |  |
| Call Log for On-net calls | X | X |
| Call Log for Off-net calls | X | — |
| Desktop Call Control | X | — |
| Make Call | X | — |
| Answer Call | X | — |
| Hang Up Call | X | — |
| Hold Call | X | — |
| Transfer Call | X | — |
| Forward Call | X | — |
| Display of Active Calls | X | — |
| Do Not Disturb | X | — |

The provision of a screen-pop to a user's desktop workstation is a useful interface for most of the VPBX features. Screen-pops may be accompanied by audible sounds and alerts to provide additional emphasis or information to the user. If the user does not have a desktop workstation, or if the user does not log into the gateway server, then the gateway server may provide IVR as the user interface for the VPBX features.

VPBX features provided by the integrated voice gateway system of the invention may include: Dynamic Caller ID, Call Log, Callback on Busy, Call Alert, Call Alert via Must Answer Station, Follow Me, and Virtual Desktop, each of which will be described below. The invention also supports conventional PBX features, e.g. Ring Through, etc.

Dynamic Caller ID

The integrated voice gateway system of the invention provides the capability to display the caller ID to the called party by a screen-pop on the desktop workstation at the same time the telephone rings.

For many large corporate desktop users, current systems provide caller ID only when a fellow employee calls from within the same PBX system. Calls from employees at other corporate locations only provide the trunk number of the remote location, not the calling telephone number or name. Providing caller ID (including name, telephone number, and other relevant information about the caller) allows the desktop worker to interrupt work, or, for users with multiple telephone lines, to interrupt a current conversation, to answer important calls without answering every call. On PBX networks where caller ID is provided on the telephone display via proprietary channel signaling, a current limitation is that in a time sharing office environment, the caller ID cannot be dynamically changed. In a typical office environment, a telephone is assigned to an employee. In this case, the caller name is the name of the employee to whom the caller telephone is assigned. In a time sharing office situation, different employees use the office and the telephone at different times. Additional limitations in current systems are that the PBXs must be from the same vendor, and the PBXs must be connected by leased lines, and the PBX data base of caller names must be entered at each site.

Figure 50:
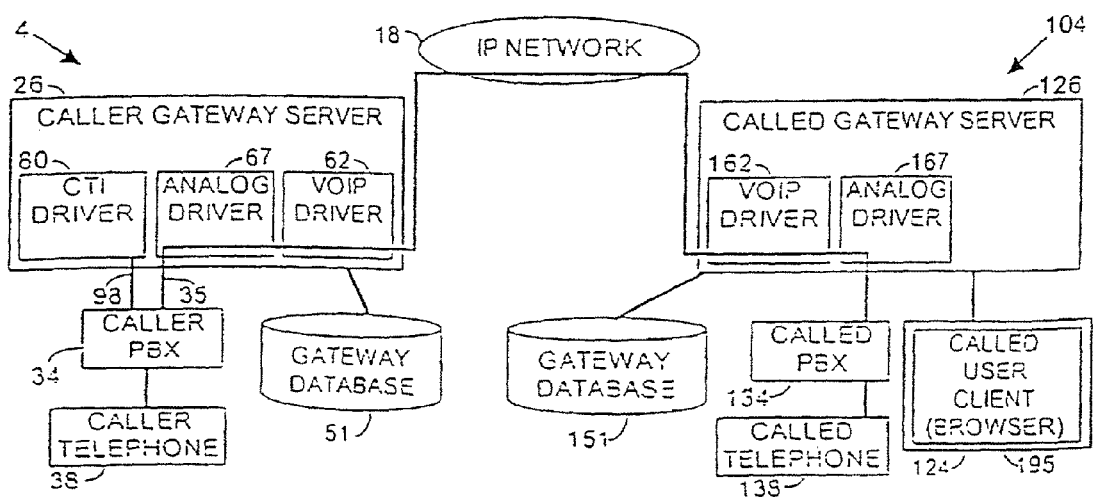
FIG. 50 illustrates the operation of a caller name display feature in an embodiment of an integrated voice gateway system of the invention.

Reference FIG. 50, the gateway server provides dynamic caller ID, i.e. the telephone number with the correct caller name, based on who is logged on from the office desktop workstation at the time the call is made. If there is no user logged on at the time a call is made, the default information for that telephone is used. If the desktop worker's telephone is being forwarded to another extension, and a CTI event is generated with the forwarding, then the caller ID screen pop will appear with the ringing call at the forwarded extension. In addition, the original called party ID will also be displayed on the screen pop of the forwarded call.

The caller ID feature can support calls between gateway telephones, i.e. between two telephones coupled to the same PBX in a gateway network, or between telephones coupled to two PBXs in different gateway networks. For calls originating from telephones outside a gateway network (e.g. PST NETWORK telephone, internet telephone), the caller ID feature can provide the caller ID to the gateway server by the PBX, through CTI (if caller ID is transmitted by the PST NETWORK and by the PBX to the CTI link), or by a VoIP connection.

The caller ID feature relies on CTI or inband ANI, PRI or QSIG trunk types at the caller gateway server to provide the caller's telephone number. The caller ID feature also relies on the desktop workstation display at the called party's desktop. The enterprise directory provides the caller name and associated information (e.g. title, department, etc.) with the calling number.

FIG. 50 illustrates how the caller ID is obtained at the caller gateway server. The caller (not illustrated) picks up the handset on the caller telephone and dials the desired telephone number. The caller PBX accesses a trunk 35 to the caller gateway server 26, and dials the call. The caller gateway server receives the telephone number from the caller PBX on a PRI trunk or over the CTI link.

The caller gateway PBX 34 delivers the call to the caller gateway server 26, and, as the call is delivered, the caller PBX 34 also passes the caller ID (i.e. the caller's telephone number) to the caller gateway server 26 via an inband ANI, PRI, QSIG or CTI link. In the case of an ISDN PRI link, the caller PBX 34 may use a call setup message to initiate the call. The caller ID can be transmitted as part of the call setup message. The caller gateway server 26 receives the caller ID as part of the setup message, and the caller PBX 34 and caller gateway server 26 continue to set up the call. In the case of a QSIG link, the PBX uses a call setup message to initiate a call on the QSIG link. The caller ID information is transmitted as part of the call setup message. The caller gateway server 26 receives the caller ID as part of the setup message, and the caller PBX 34 and caller gateway server 26 continues to establish the call. The CTI link 98 is a separate link from the trunks. To pass the caller ID via the CTI link, the PBX places a call to the caller gateway server 26 using a trunk. While the trunk call is being initiated, the CTI link 98 transmits an event message indicating the call. The event message includes the trunk ID, the called telephone number, and the caller's caller ID. The caller gateway server 26 associates the call being received on the trunk with the CTI link 98 message, and associates the caller ID with the trunk. Using the CTI link 98 to pass the caller ID supports instances in which analog or T1 trunks are used which do not provide caller ID information from the caller PBX 34.

The caller gateway server 26 uses the caller's telephone number to access additional caller ID information in the gateway database, i.e. the local image of the enterprise directory data. The caller gateway server 26 initiates an H.323 VoIP call with the called gateway server 126 over the IP network 18. As the call is placed, the caller gateway server 26 sends the caller ID information to the called gateway server 126 using an H.323 extension, e.g. User Information Extension (UIE).

The called gateway server 126 sets up the call with the called PBX 134, and may include the caller ID for the called PBX to pass to the called telephone 138. The called PBX rings the called telephone 138, and, if the called telephone 138 has a caller ID display, the called PBX 134 may include the caller ID for display at the called telephone. The called gateway server 126 checks its gateway database 151 to determine if the called party has a browser logged on to the called gateway server 126, and if that browser is logically associated with the called telephone 138. If the called gateway server 126 determines that the called party has a browser logged on, and is associated with the called telephone 138, then the called gateway server 126 delivers the caller ID information to the called desktop workstation via a browser applet. The browser applet results in a screen pop in the browser window at the called desktop workstation. Both the caller gateway server 26 and called gateway server 126 log the calls, and include the caller ID information in the call logs. A description of the Call Log feature follows below.

Call Log

The call log provides a log of outgoing calls and incoming calls including answered calls, abandoned calls and ring through calls for a desktop user. The call log includes the time of call, name and telephone number of the caller, and the result of the call, e.g. forwarded to voice mail, hang-up, inbound/outbound, etc. The call log may be sorted by time. The desktop user can access the call log via a gateway server client or a browser. As is the case with all screen pops, the call log is available to users only when they are logged in to the gateway network. Users can make a return call by clicking any inbound call entry in the call log. The entries in the call log can be imported into a user's personal phone book. The call log is maintained on the gateway server and will continue to log calls even if the user does not log on to the gateway network. Entries in the call log can be deleted, individually and as a group. A user may click a "details" button to access the detailed NDS information for users who are parties to incoming and outgoing calls.

Figure 51:
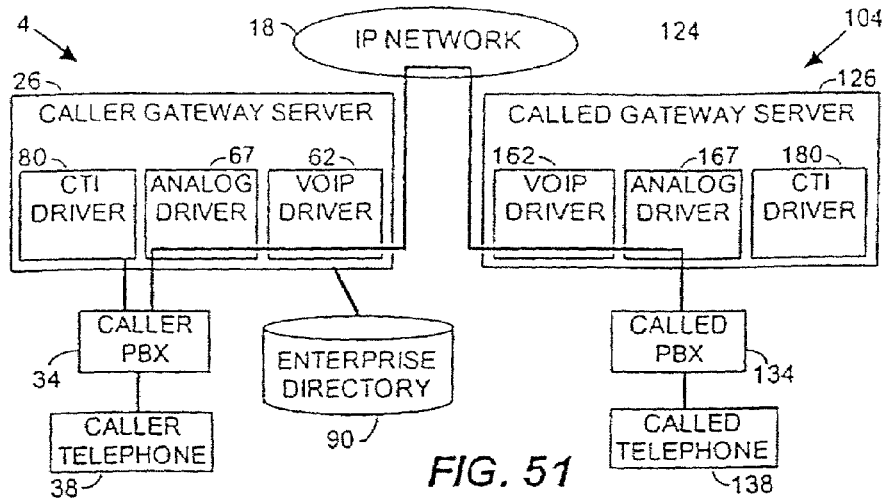
FIG. 51 illustrates the operation of a call log feature in an embodiment of an integrated voice gateway system of the invention.

Reference FIG. 51, When the caller makes a call from the caller telephone 38, the caller gateway server 26 opens a call log record for the caller. Caller ID information is obtained from the enterprise directory 90 for both the caller and called parties and is inserted into the call log record. When the call arrives at the called gateway server 126, a call log record is opened for the called party. Caller ID information for both the caller and called parties is inserted in the call log record in the called gateway server 126. When the call is over, or if for some reason the call is not completed, e.g. caller is busy, additional information (e.g. result, duration, etc.) is inserted in the call log records at both the caller gateway server 26 and called gateway server 126.

Destination Busy

The integrated voice gateway system of the invention provides several options for a caller at a gateway telephone attempting to call a party at another gateway telephone which is currently busy. The caller may elect to cancel the call or may select one of the options which include: Callback on Busy, Call Alert and Ring Through. These options will be described below. Common to each option is first the determination that a called gateway telephone is busy.

Figure 52:
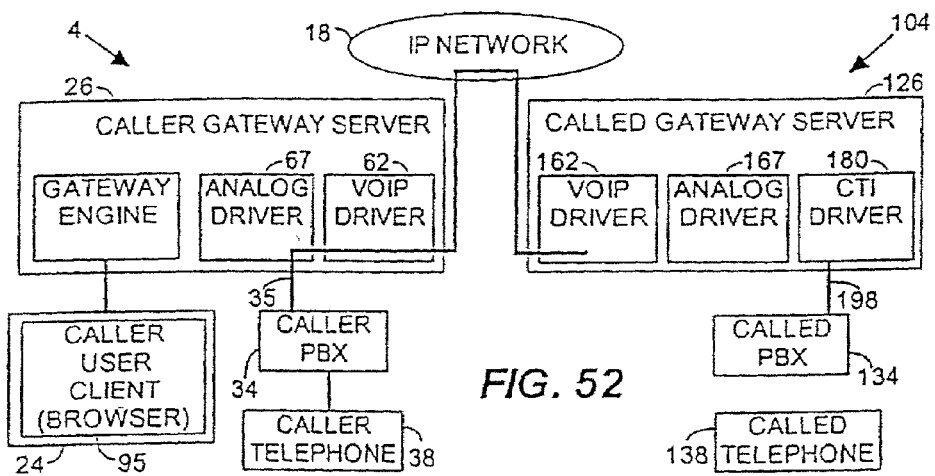
FIG. 52 illustrates the operation of an embodiment of an integrated voice gateway system of the invention when a called telephone is busy.

Referring to FIG. 52, a normal call is propagated within the integrated voice gateway system, either within a single gateway network, or as a VoIP call between two gateway networks. FIG. 52 illustrates such a call as a VoIP call between two gateway networks. As part of its normal processing function, the caller gateway server 126 uses the called CTI link 198 to the called PBX 134 to maintain the idle/busy status of telephones on the called PBX 134. When the called gateway server 126 receives the call from the caller gateway server 26, the called gateway server 126 checks the status of the called telephone 138. The called gateway server 126, on determining that the called telephone 138 is busy, notifies the caller gateway server 26 of the busy status. The called gateway server 26 receives the busy notice and checks its user logon data to determine if the caller at the caller telephone 38 is currently logged in from a browser. If the caller is logged in, the caller gateway server 126 sends information to the caller's browser 95 to inform the caller that the called telephone 138 is busy. The caller's browser 95 provides a screen pop to the caller indicating that the called telephone 126 is busy. The screen pop also provides the caller with several options from which to choose. The options may include: cancel the call, request a callback, request a call alert or request a ring through. If the caller is not logged in from a browser, the caller may be provided similar options via an IVR interface.

Callback on Busy

The integrated voice gateway system of the invention provides the capability for a caller, if the called telephone is busy, to request that a callback be automatically set up when the called telephone is no longer busy. This feature is not available to most desktop users of current systems since telephone calls are typically immediately forwarded to voice mail systems when a called telephone is busy. Some PBXs offer delayed call forward on busy to allow callers to set callback before the call is forwarded to voice-mail, and some voice mail systems offer callers an option to select callback before taking a message. However, these options require that the PBXs be upgraded, and a requested callback may be canceled if the caller telephone is used before the callback is completed. If callback on busy is provided across a network by PBX vendors, the callback option will only work if both the caller and called telephone systems are from the same vendor. The integrated computer telephone system of the invention provides a callback on busy capability which works across networks of mixed telephone systems.

Figure 53:
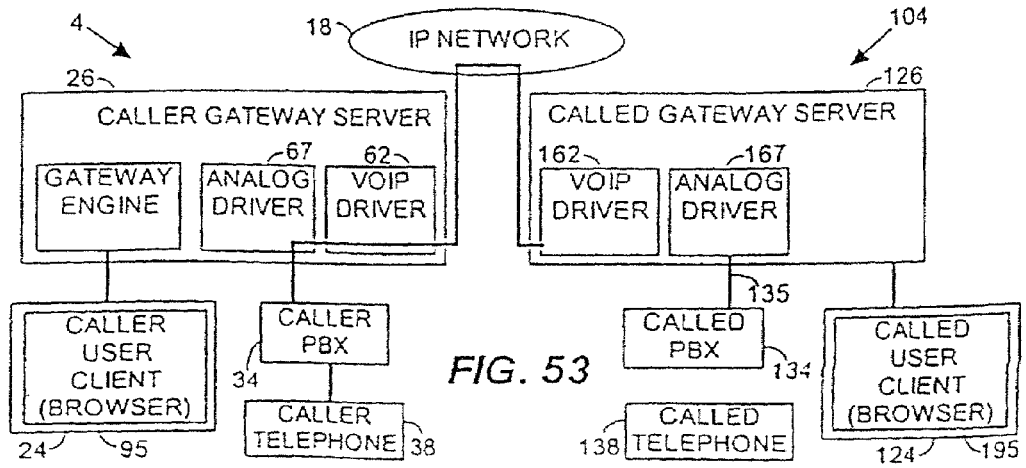
FIG. 53 illustrates the operation of a callback on busy feature in an embodiment of an integrated voice gateway system of the invention.

Reference FIG. 53, the callback option may be provided to the caller via IVR or via a screen pop. If the caller requests a callback be set up, then the gateway servers 4, 104 will automatically set up the call when the called party hangs up the current call.

When the callback call takes place, both the caller and called parties will be provided with the other party's caller ID. In the caller ID screen pop, it is also noted that the call is a callback call.

If, when the gateway servers set up the callback call, the original caller telephone is busy, the original caller will receive a screen-pop to the effect that the callback is taking place. The caller will have the option to hang up or place the current call on hold to initiate the callback call, or ignore the callback notification. If the caller ignores the callback notification, i.e. continues the current call for more than a specified time, e.g. 15 seconds, the callback will be canceled.

If a called party has multiple callback requests pending, then the callbacks may be serviced on a first-in-first-out (FIFO) basis, or on a priority basis, e.g. based on class of service of the caller, urgency, etc.

Call Alert

The integrated voice gateway system of the invention provides the capability for a caller to request a call alert if the called telephone is busy. For current desktop users, there is no capability to send a call waiting signal to a busy party since telephone calls are typically immediately forwarded to voice mail systems when a called telephone is busy. The ability of the integrated computer telephone system of the invention to provide caller ID on all intra-company calls regardless of location is an important part of the call alert feature. In addition, the unique ability of the integrated voice gateway system of the invention to allow remote users to send messages to describe their urgent need to talk to a busy party is a significant advance in desktop to desktop communication.

The call alert option may be provided to the caller via IVR or via a screen pop. If the caller chooses to request the alert via a screen pop, the caller may include an optional message, e.g. to inform the called party of the purpose of the call. The optional message may be selected from a set of pre-established messages, or may be a message created by the caller.

The call alert is delivered to the called party in a screen-pop on the called party's desktop workstation. The caller ID and optional message from the caller will be displayed. The called party can then take the call by hanging up or placing the current call on hold, acknowledge the call alert, or ignore the call alert by continuing the current call for more than a specified time, e.g. 15 seconds. If the called party ignores the call alert, the caller may be given the option to either ring through or set up a callback. The option to ring through or call back may be provided via IVR or screen pop. If the called party has multiple lines, then a call alert will be activated only if all lines are busy.

The call alert feature requires that both the caller and called telephones are gateway telephones, and the called party is logged on to the gateway server via the browser interface. The call alert feature uses CTI on both the caller gateway server and called gateway server for on/off hook status and to determine if the called party hangs up or places the current call on hold. The call alert feature also relies on the directory to provide caller ID for a call alert screen pop presented to the called party. The privilege to use call alert may be configurable by the system administrator on a user by user basis.

If a user prefers not to be disturbed by call alert messages, the user can set a Do not Disturb (DND) indicator on the user's telephone. The DND indicator may be set via a screen pop provided on the user's desktop workstation.

Figure 54:
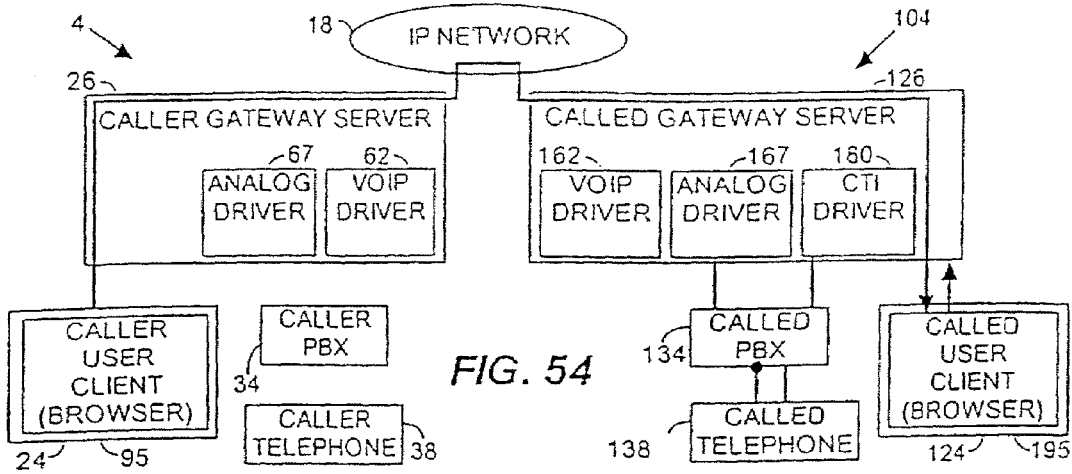
FIGS. 54–55 illustrate the operation of a call alert feature in an embodiment of an integrated voice gateway system of the invention.
Figure 55:
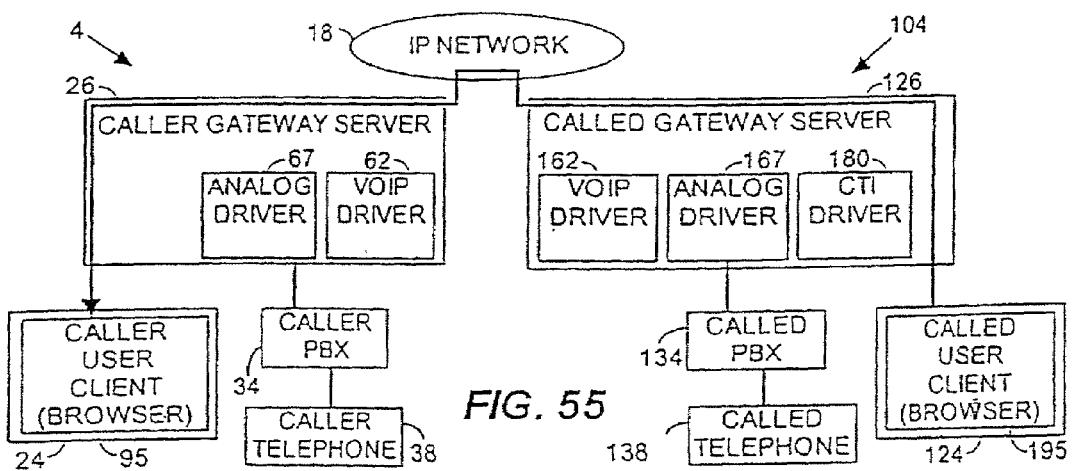
Figure 56:
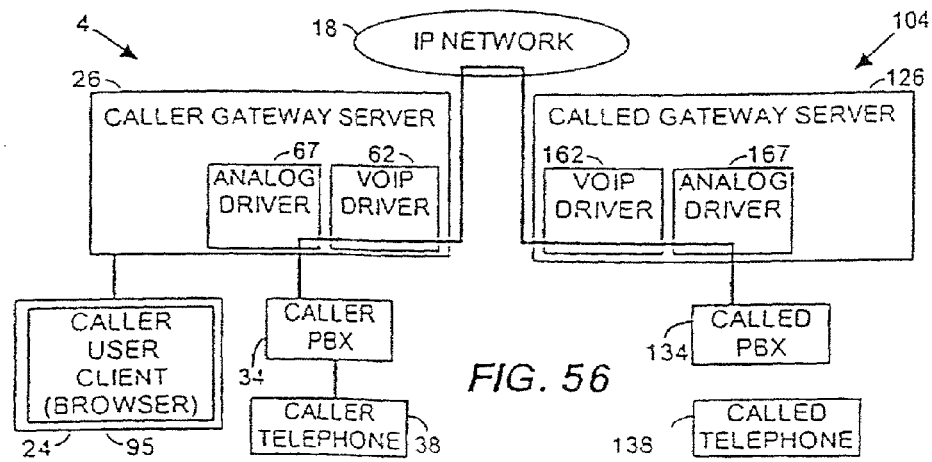
FIG. 56 illustrates the operation of a ring through feature in an embodiment of an integrated voice gateway system of the invention.

FIGS. 54 and 55 illustrate a call alert scenario using the browser client and screen pops. Referring to FIG. 54, the caller types a message and clicks a call alert button in the caller user client 95. The call alert message is passed to the caller gateway server 26, and then over the IP network 18 to the called gateway server 126. The called gateway server 126 passes the call alert message to the called user client 195. The call alert message appears via a screen pop in the called user client 195. The called user may elect to accept or reject the call alert by clicking an appropriate button in the call alert screen pop. If the called user accepts the call alert, a message is passed to the called gateway server 126. The called CTI driver 180 passes a message to the called PBX 134 to place the current call on hold. The called analog driver 167 delivers the new call to the called PBX 134. The called PBX 134 rings the called telephone 138.

Referring to FIG. 55, if the called user rejects the call alert, the rejection message is passed to the called gateway server 126 and the called user client 195 closes the screen pop. If the called user takes no action, and the call alert times out, the called gateway server 126 passes a message to the called user client 195 to close the call alert screen pop.

If the call alert times out or is rejected, after closing the screen pop, the called gateway server 126 sends a call alert rejected message to the caller gateway server 26 via the IP network 18. The caller gateway server 26 passes the call alert rejection message to the caller user client 95. The rejection message includes applicable options for the caller to select.

Ring Through

The integrated voice gateway system of the invention provides the capability for a caller to request a ring through if the called telephone is busy. The ring through option follows normal PBX call coverage options which may typically forward calls to a user's voice mail or a Must Answer Station. The ring through option will be described with reference to FIG. 56.

The description of Destination Busy above concluded with the caller being provided several options, via browser or IVR, including ring through. If the caller is logged on via a browser, the caller would select the ring through option in the browser window at the caller workstation. The browser passes the selection to the caller gateway server. If the caller is not logged on, the caller would select the ring through option by pressing a designated key on the telephone. The caller gateway server 26 detects the DTMF tone selecting the ring through option. The caller gateway server 26 then notifies the called gateway server 126 that the caller has requested to ring through. The called gateway server 126 places an inbound call to the called PBX 134 for the called telephone 138. Since the called telephone 138 is busy, the called PBX 134 follows the normal process set up for the PBXs in the system, e.g. voice mail, must-answer station, etc.

Call Alert Via Must-Answer Station

The integrated voice gateway system of the invention provides the capability for a caller to request a call alert if the called telephone is busy and the caller is not using a gateway telephone. In current systems, a caller typically forwards a call to a designated (e.g. "must answer") station, e.g. by pressing "0" after being forwarded to voice mail. In a large company, the attendant at a must-answer station is typically located remotely from the called party and hence cannot walk over to the called party and slip a notice that the caller needs to urgently talk to the called party. When a caller from outside a gateway network, e.g. a PST NETWORK telephone, places a call to a gateway telephone, and the called gateway telephone is busy, the caller may elect to transfer to a must-answer station. An attendant at the must-answer station can assist the caller by providing a call alert, for the outside caller, on the co-located workstation of the busy gateway telephone.

Follow Me

The integrated computer telephone system of the invention provides the capability for users to redirect incoming telephone calls arriving at their regular PBX station to any telephone or internet phone. The system of the invention also provides users with the capability to set up filters so that only calls from selected callers are redirected. Calls not forwarded can be sent to the normal PBX call coverage options, e.g. voice-mail.

In current PBX systems, users can program the PBX to call forward all calls to an inside-the-PBX or outside-the-PBX location. However, this generally needs to be done from the user's desktop telephone. In order to program the PBX from an outside location, expensive equipment for telecommuting must generally be attached to the PBX. These current systems offer only an IVR interface, but no browser interface. In current PBX systems there is no way to link caller ID to call forwarding. Hence, filtered call forwarding is not possible in the current systems. The telephone to which the calls are redirected may be another gateway telephone (coupled to the same or a different PBX as the user's telephone), or a PST NETWORK telephone (e.g. remote telephone 338), etc. The redirection can be set up as a one-time event or a recurring (e.g., daily) event. However, at any point in time, only one redirection may be in effect.

Figure 57:
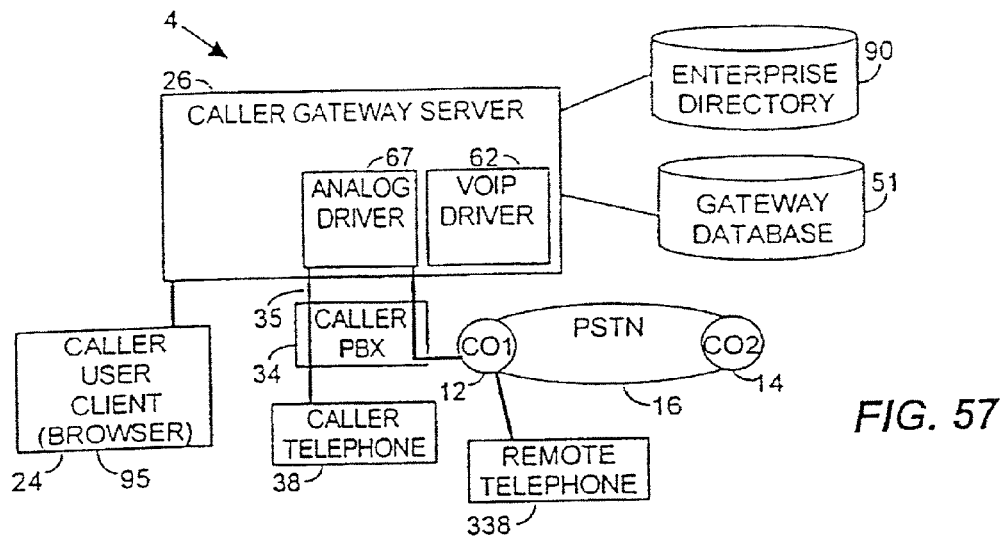
FIGS. 57–58 illustrate the setup and operation of a follow me feature in an embodiment of an integrated voice gateway system of the invention.

Follow me setup and operation will be described with reference to FIGS. 57–58. Referring to FIG. 57, the follow me feature may be setup via the browser or and IVR interface. If a browser is available, the user accesses follow me setup screens via the browser, reviews current options, and may make changes to the configuration. The browser and gateway server exchange data during the interaction.

If a browser is not available, for example, if the user is setting up the follow me feature from a PST NETWORK telephone, the user may set up follow me by calling a specified telephone number and interacting through an IVR interface. If the user calls from a remote telephone, the system may first authenticate the user's identity. For real time call processing, the user's follow me data is stored in the gateway server's local database. The user's follow me settings are stored in the enterprise directory as part of that user's data.

The follow me setup may include several options. For example, the user may schedule follow me periods as one time or periodic recurring events with a different destination telephone number selected for each event (e.g., car phone during the commute home, and home telephone in the evening). The user may set up numerous scheduled events. The user may also use an override option to use an unscheduled alternate destination. The users may configure the system to filter calls based on caller ID, and forward only calls from a list of callers selected by the user. The user may assemble a list of callers from the enterprise white pages and a frequent contact list. The user may create a different filter for each scheduled follow me period.

Referring to FIG. 58, an incoming call to a called telephone 138 coupled to a called PBX 134, may come via a VoIP call from a caller telephone 38 coupled to a caller PBX 34; via a PST NETWORK call from a caller telephone 438 coupled to the PST NETWORK 16; or from a caller telephone 538 coupled to the called PBX 134. In the case of a local PBX or PST NETWORK call, the called PBX 134 sends a CTI event to the called gateway server 126. The called gateway server 126 checks whether follow me is active for the called party, and, if a filter is active, if the caller matches the filter. If no filter is active, all calls are forwarded. If the caller does not match an active filter, the call not forwarded, and is simply delivered to the called telephone 138. If a match is found, the called gateway server 126 initiates a call to the follow me destination telephone. If the original call was an internal PBX call or a call from a PST NETWORK telephone, the gateway server uses the CTI link to redirect the call to the called gateway server 126. If the original call is a VoIP call, the call is normally directed to the called gateway server 126, and the called gateway server 126 can redirect the call.

The called gateway server 126 plays a message for the caller indicating that the call is being forwarded. When the forwarded call is answered, the gateway server offers a greeting to the answering party. The answering party replies with an accept code, e.g. DTMF tones, thereby authenticating the answering party. The caller and called party are then connected. If the call forwarded to the destination is not answered, or if the correct accept code is not provided, the caller is provided a message and the call is re-routed to the original called telephone to go through normal PBX coverage options, e.g. voice-mail.

While various embodiments and features of the invention have been described, those skilled in the art will recognize that variations and additions to those features and functions can be made within the scope of the invention. The invention is therefore intended to be limited only by the scope of the appended claims.

We claim:

1. A communication system, comprising, a public switched telephone (PST) network;
    an Internet protocol (IP) network;
    a plurality of private branch exchanges (PBXs) at a plurality of locations, the PBXs coupled to the PST network for routing telephone calls over the PST network;
    a plurality of telephones coupled to the plurality of PBXs;
    a plurality of voice gateways, each voice gateway coupled to one of the plurality of PBXs through a call status-call control link and coupled to the IP network for routing telephone calls over the IP network; and
    feature networking means for providing voice communication features among the plurality of locations over the IP network; wherein the feature networking means comprises callback on busy means to automatically setup a call between a calling party and a called party after the calling party attempts to call the called party while the called party's telephone is busy, the call being setup when the called party hangs in, and said communication system further comprising, coupled to a plurality of voice gateways, a respective plurality of desktop workstations, wherein the callback on busy means comprises means to display a message on the calling party's desktop workstation if the calling party's telephone is busy when the called party hangs up.

* * * * *